(12) United States Patent
Kobayashi

(10) Patent No.: US 12,233,923 B2
(45) Date of Patent: Feb. 25, 2025

(54) MEASUREMENT METHOD, MEASUREMENT DEVICE, MEASUREMENT SYSTEM, AND MEASUREMENT PROGRAM

(71) Applicant: SEIKO EPSON CORPORATION, Tokyo (JP)

(72) Inventor: Yoshihiro Kobayashi, Komagane (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/853,187

(22) Filed: Jun. 29, 2022

(65) Prior Publication Data

US 2023/0001967 A1  Jan. 5, 2023

(30) Foreign Application Priority Data

Jun. 30, 2021  (JP) ................. 2021-108745

(51) Int. Cl.
| | | |
|---|---|---|
| *B61L 25/02* | (2006.01) | |
| *E01D 22/00* | (2006.01) | |
| *G01H 17/00* | (2006.01) | |

(52) U.S. Cl.
CPC ........... *B61L 25/021* (2013.01); *B61L 25/028* (2013.01); *E01D 22/00* (2013.01); *G01H 17/00* (2013.01)

(58) Field of Classification Search
CPC ...... B61L 25/021; B61L 25/028; B61L 27/53; E01D 22/00; G01H 17/00; G01H 1/08;
(Continued)

(56) References Cited

U.S. PATENT DOCUMENTS 4,480,480 A * 11/1984 Scott ................... G01M 5/0033
702/41
6,098,022 A   8/2000 Sonnichsen et al.
(Continued)

FOREIGN PATENT DOCUMENTS

| JP | 2017-020172 A | 1/2017 |
| JP | 2018-031676 A | 3/2018 |
| JP | 2018031189 A | 3/2018 |

*Primary Examiner* — Sizo B Vilakazi
(74) *Attorney, Agent, or Firm* — Harness, Dickey & Pierce, P.L.C.

(57) ABSTRACT

A measurement method includes: generating second measurement data by performing filter processing on first measurement data; calculating a first deflection amount based on an approximate equation of deflection of a structure; calculating a second deflection amount by performing filter processing on the first deflection amount; calculating a third deflection amount based on the second deflection amount and a first-order coefficient and a zero-order coefficient which are calculated based on the second measurement data and the second deflection amount; calculating an offset based on the zero-order coefficient, the second deflection amount, and the third deflection amount; calculating a static response by adding the offset and a product of the first-order coefficient and the first deflection amount; calculating a first dynamic response by subtracting the static response from the first measurement data; calculating a second dynamic response by attenuating an unnecessary signal from the first dynamic response; and calculating an attenuation rate of the second dynamic response based on an envelope amplitude of the second dynamic response.

14 Claims, 24 Drawing Sheets

(58) Field of Classification Search
CPC ....... G01H 5/00; G01H 13/00; G01M 5/0008; G01M 5/0066
See application file for complete search history.

(56) References Cited

U.S. PATENT DOCUMENTS

| | | | |
|---|---|---|---|
| 6,240,783 B1* | 6/2001 | McGugin | G01H 9/00 73/594 |
| 7,895,015 B2* | 2/2011 | Parker | G01C 15/002 250/203.2 |
| 8,209,134 B2* | 6/2012 | Parker | G01C 15/002 250/203.2 |
| 9,354,043 B2* | 5/2016 | Parker | G01C 15/002 |
| 10,203,268 B2* | 2/2019 | Parker | G01B 11/14 |
| 10,746,625 B2* | 8/2020 | Santra | G01S 13/88 |
| 2001/0044688 A1 | 11/2001 | Okita et al. | |
| 2018/0164093 A1* | 6/2018 | Westcott | G01M 5/0008 |
| 2018/0238820 A1 | 8/2018 | Ghods et al. | |
| 2019/0195728 A1* | 6/2019 | Santra | G01M 5/0091 |
| 2020/0249118 A1* | 8/2020 | Pal | G06V 10/82 |
| 2022/0291078 A1 | 9/2022 | Kobayashi | |
| 2023/0043292 A1* | 2/2023 | Schwaiger | B61L 1/04 |
| 2023/0049699 A1* | 2/2023 | Cavanaugh | G01N 3/18 |

\* cited by examiner

MEASUREMENT METHOD, MEASUREMENT DEVICE, MEASUREMENT SYSTEM, AND MEASUREMENT PROGRAM

The present application is based on, and claims priority from JP Application Serial Number 2021-108745, filed Jun. 30, 2021, the disclosure of which is hereby incorporated by reference herein in its entirety.

BACKGROUND

1. Technical Field

The present disclosure relates to a measurement method, a measurement device, a measurement system, and a measurement program.

2. Related Art

JP-A-2017-20172 describes a railway bridge dynamic response evaluation method in which accelerometers for measuring vertical accelerations are respectively provided in a leading vehicle and a rearmost vehicle of a train, the vertical accelerations of the leading vehicle and the rearmost vehicle are measured during traveling, measurement data of the accelerometers when the leading vehicle and the rearmost vehicle pass through a bridge is extracted, an acceleration amplification coefficient is calculated by dividing a feature amount of the vertical acceleration measured by the accelerometer of the rearmost vehicle by a feature amount of the vertical acceleration measured in the leading vehicle, and an impact coefficient (dynamic response component) of the bridge is calculated by applying the acceleration amplification coefficient to a relation equation between an impact coefficient of the bridge and the acceleration amplification coefficient, which is obtained in advance. The dynamic response evaluation method focuses on that a dynamic response hardly occurs in the bridge when the leading vehicle passes and a static response and a dynamic response occur in the bridge when the rearmost vehicle passes, it is possible to easily and comprehensively obtain the impact coefficient (dynamic response component) of the bridge based on the vertical accelerations measured by the accelerometers respectively provided in the leading vehicle and the rearmost vehicle of the train.

However, in the dynamic response evaluation method described in JP-A-2017-20172, the acceleration amplification coefficient obtained by dividing the feature amount of the vertical acceleration measured by the accelerometer of the rearmost vehicle by the feature amount of the vertical acceleration measured by the leading vehicle cannot sufficiently separate the static response and the dynamic response from each other, the accuracy of the relation equation between the impact coefficient of the bridge and the acceleration amplification coefficient is not sufficient, and the calculation accuracy of the dynamic response is not sufficient due to factors such as errors caused by measurement positions of the vertical accelerations or vehicle vibration. Therefore, in the dynamic response evaluation method described in JP-A-2017-20172, it is difficult to accurately calculate an attenuation rate of the dynamic response.

SUMMARY

A measurement method according to an aspect of the present disclosure includes: a first measurement data generation step of generating, based on observation data output from an observation device configured to observe an observation point of a structure, first measurement data based on a physical quantity which is a response to actions of a plurality of parts of a moving object moving on the structure on the observation point; a second measurement data generation step of generating second measurement data in which a vibration component is reduced by performing filter processing on the first measurement data; an observation information generation step of generating observation information including an entry time point and an exit time point of the moving object with respect to the structure; an average velocity calculation step of calculating an average velocity of the moving object based on the observation information and environment information which is created in advance and includes a dimension of the moving object and a dimension of the structure; a first deflection amount calculation step of calculating, based on an approximate equation of deflection of the structure, the observation information, the environment information, and the average velocity, a first deflection amount of the structure caused by the moving object; a second deflection amount calculation step of calculating a second deflection amount in which a vibration component is reduced by performing filter processing on the first deflection amount; a coefficient calculation step of approximating the second measurement data with a linear function of the second deflection amount to calculate a first-order coefficient and a zero-order coefficient of the linear function; a third deflection amount calculation step of calculating a third deflection amount based on the first-order coefficient, the zero-order coefficient, and the second deflection amount; an offset calculation step of calculating an offset based on the zero-order coefficient, the second deflection amount, and the third deflection amount; a static response calculation step of calculating a static response by adding the offset and a product of the first-order coefficient and the first deflection amount; a first dynamic response calculation step of calculating a first dynamic response by subtracting the static response from the first measurement data; a second dynamic response calculation step of calculating a second dynamic response by performing filter processing for attenuating an unnecessary signal from the first dynamic response; an envelope amplitude calculation step of calculating an envelope amplitude of the second dynamic response; and an attenuation rate calculation step of calculating, based on the envelope amplitude, an attenuation rate of a vibration component included in the second dynamic response.

A measurement device according to an aspect of the present disclosure includes: a first measurement data generation unit configured to generate, based on observation data output from an observation device configured to observe an observation point of a structure, first measurement data based on a physical quantity which is a response to actions of a plurality of parts of a moving object moving on the structure on the observation point; a second measurement data generation unit configured to generate second measurement data in which a vibration component is reduced by performing filter processing on the first measurement data; an observation information generation unit configured to generate observation information including an entry time point and an exit time point of the moving object with respect to the structure; an average velocity calculation unit configured to calculate an average velocity of the moving object based on the observation information and environment information which is created in advance and includes a dimension of the moving object and a dimension of the structure; a first deflection amount calculation unit configured to calculate, based on an approximate equation of deflection of the structure, the observation information, the environment information, and the average velocity, a first deflection amount of the structure caused by the moving object; a second deflection amount calculation unit configured to calculate a second deflection amount in which a vibration component is reduced by performing filter processing on the first deflection amount; a coefficient calculation unit configured to approximate the second measurement data with a linear function of the second deflection amount to calculate a first-order coefficient and a zero-order coefficient of the linear function; a third deflection amount calculation unit configured to calculate a third deflection amount based on the first-order coefficient, the zero-order coefficient, and the second deflection amount; an offset calculation unit configured to calculate an offset based on the zero-order coefficient, the second deflection amount, and the third deflection amount; a static response calculation unit configured to calculate a static response by adding the offset and a product of the first-order coefficient and the first deflection amount; a first dynamic response calculation unit configured to calculate a first dynamic response by subtracting the static response from the first measurement data; a second dynamic response calculation unit configured to calculate a second dynamic response by performing filter processing for attenuating an unnecessary signal from the first dynamic response; an envelope amplitude calculation unit configured to calculate an envelope amplitude of the second dynamic response; and an attenuation rate calculation unit configured to calculate, based on the envelope amplitude, an attenuation rate of a vibration component included in the second dynamic response.

A measurement system according to an aspect of the present disclosure includes: the measurement device according to the above aspect; and the observation device.

A non-transitory computer-readable storage medium according to an aspect of the present disclosure stores a measurement program, and the measurement program causes a computer to execute: a first measurement data generation step of generating, based on observation data output from an observation device configured to observe an observation point of a structure, first measurement data based on a physical quantity which is a response to actions of a plurality of parts of a moving object moving on the structure on the observation point; a second measurement data generation step of generating second measurement data in which a vibration component is reduced by performing filter processing on the first measurement data; an observation information generation step of generating observation information including an entry time point and an exit time point of the moving object with respect to the structure; an average velocity calculation step of calculating an average velocity of the moving object based on the observation information and environment information which is created in advance and includes a dimension of the moving object and a dimension of the structure; a first deflection amount calculation step of calculating, based on an approximate equation of deflection of the structure, the observation information, the environment information, and the average velocity, a first deflection amount of the structure caused by the moving object; a second deflection amount calculation step of calculating a second deflection amount in which a vibration component is reduced by performing filter processing on the first deflection amount; a coefficient calculation step of approximating the second measurement data with a linear function of the second deflection amount to calculate a first-order coefficient and a zero-order coefficient of the linear function; a third deflection amount calculation step of calculating a third deflection amount based on the first-order coefficient, the zero-order coefficient, and the second deflection amount; an offset calculation step of calculating an offset based on the zero-order coefficient, the second deflection amount, and the third deflection amount; a static response calculation step of calculating a static response by adding the offset and a product of the first-order coefficient and the first deflection amount; a first dynamic response calculation step of calculating a first dynamic response by subtracting the static response from the first measurement data; a second dynamic response calculation step of calculating a second dynamic response by performing filter processing for attenuating an unnecessary signal from the first dynamic response; an envelope amplitude calculation step of calculating an envelope amplitude of the second dynamic response; and an attenuation rate calculation step of calculating, based on the envelope amplitude, an attenuation rate of a vibration component included in the second dynamic response.

DESCRIPTION OF EXEMPLARY EMBODIMENTS

Hereinafter, preferred embodiments of the present disclosure will be described in detail with reference to the drawings. The embodiments described below do not in any way limit contents of the present disclosure described in the claims. Not all configurations to be described below are necessarily essential components of the present disclosure.

1. Configuration of Measurement System

A moving object passing through a superstructure of a bridge that is a structure according to a first embodiment is a vehicle, a railway vehicle, or the like that has a large weight and can be measured by BWIM. The BWIM is an abbreviation of bridge weigh in motion, and is a technology in which a bridge is regarded as a "scale", deformation of the bridge is measured, and thereby a weight and the number of axles of the moving object passing through the bridge are measured. The superstructure of the bridge, which enables analysis of the weight of the moving object passing through the bridge, based on a response such as deformation or strain, is a structure in which the BWIM functions. The BWIM system, which applies a physical process between an action on the superstructure of the bridge and the response, enables the measurement of the weight of the moving object that travels on the bridge. Hereinafter, a measurement system for implementing a measurement method according to the present embodiment will be described by taking a case where the moving object is a railway vehicle as an example.

Figure 1:
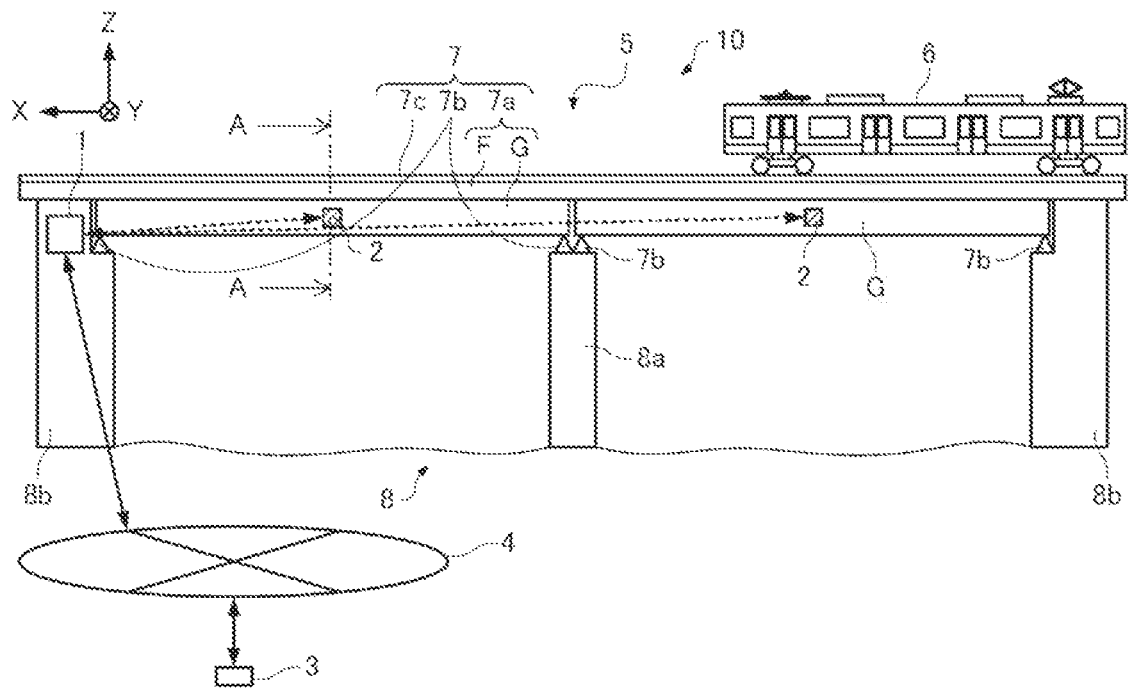
FIG. 1 is a diagram showing a configuration example of a measurement system.

FIG. 1 is a diagram showing an example of the measurement system according to the present embodiment. As shown in FIG. 1, a measurement system 10 according to the present embodiment includes a measurement device 1, and at least one sensor 2 provided on a superstructure 7 of a bridge 5. The measurement system 10 may include a monitoring device 3.

Figure 2:
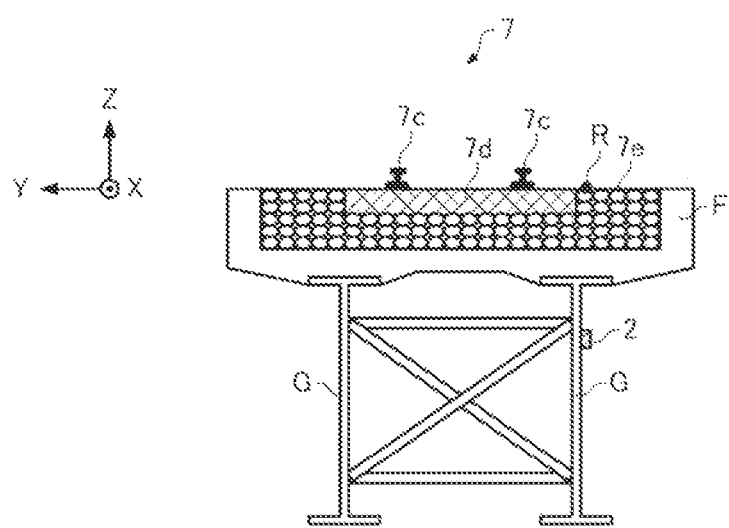
FIG. 2 is a cross-sectional view of a superstructure of FIG. 1 taken along line A-A.

The bridge 5 includes the superstructure 7 and a substructure 8. FIG. 2 is a cross-sectional view of the superstructure 7 taken along line A-A of FIG. 1. As shown in FIGS. 1 and 2, the superstructure 7 includes a bridge floor 7a, a support 7b, rails 7c, ties 7d, and a ballast 7e, and the bridge floor 7a includes a floor plate F, a main girder G, a cross girder (not shown), and the like. As shown in FIG. 1, the substructure 8 includes bridge piers 8a and bridge abutments 8b. The superstructure 7 is a structure across any one of the bridge abutment 8b and the bridge pier 8a adjacent to each other, two adjacent bridge abutments 8b, and two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a.

When a railway vehicle 6 enters the superstructure 7, the superstructure 7 is bent due to a load of the railway vehicle 6. Since the railway vehicle 6 includes a plurality of vehicles coupled to each other, a phenomenon occurs in which the bending of the superstructure 7 is periodically repeated as the vehicles pass through the superstructure 7. This phenomenon is called a static response. On the other hand, as a structure, the superstructure 7 has a natural vibration frequency, and therefore, natural vibration of the superstructure 7 may be excited when the railway vehicle 6 passes through the superstructure 7. When the natural vibration of the superstructure 7 is excited, a phenomenon occurs in which the bending of the superstructure 7 is periodically repeated. This phenomenon is called a dynamic response.

The measurement device 1 and the sensors 2 are coupled by, for example, a cable (not shown) and communicate with each other via a communication network such as a CAN. CAN is an abbreviation for controller area network. Alternatively, the measurement device 1 and the sensors 2 may communicate with each other via a wireless network.

Each sensor 2 outputs data used to calculate an attenuation rate of a dynamic response when the railway vehicle 6, which is a moving object, moves on the superstructure 7 which is a structure. In the present embodiment, each sensor 2 is an acceleration sensor, and may be, for example, a crystal acceleration sensor or a MEMS acceleration sensor. MEMS is an abbreviation for micro electro mechanical systems.

In the present embodiment, each sensor 2 is installed at a central portion of the superstructure 7 in a longitudinal direction, specifically, at a central portion of the main girder G in the longitudinal direction. However, each sensor 2 is not limited to being installed at the central portion of the superstructure 7 as long as each sensor 2 can detect an acceleration for calculating the attenuation rate of the dynamic response. When each sensor 2 is provided on the floor plate F of the superstructure 7, the sensor 2 may be damaged due to traveling of the railway vehicle 6, and the measurement accuracy may be affected by local deformation of the bridge floor 7a, so that in the example of FIGS. 1 and 2, each sensor 2 is provided at the main girder G of the superstructure 7.

The floor plate F, the main girder G, and the like of the superstructure 7 are bent in a vertical direction due to a load of the railway vehicle 6 passing through the superstructure 7. Each sensor 2 detects an acceleration of the bending of the floor plate F or the main girder G caused by the load of the railway vehicle 6 passing through the superstructure 7.

The measurement device 1 calculates the attenuation rate of the dynamic response when the railway vehicle 6 passes through the superstructure 7 based on acceleration data output from each sensor 2. The measurement device 1 is installed on, for example, the bridge abutment 8b.

The measurement device 1 and the monitoring device can communicate with each other via, for example, a wireless network of a mobile phone and a communication network 4 such as the Internet. The measurement device 1 transmits measurement data including the attenuation rate of the dynamic response when the railway vehicle 6 passes through the superstructure 7 to the monitoring device 3. The monitoring device 3 may store the information in a storage device (not shown), and may perform, for example, processing such as monitoring of the railway vehicle 6 and abnormality determination of the superstructure 7 based on the information.

In the present embodiment, the bridge 5 is a railway bridge, and is, for example, a steel bridge, a girder bridge, or an RC bridge. RC is an abbreviation for reinforced-concrete.

As shown in FIG. 2, in the present embodiment, an observation point R is set in association with the sensor 2. In the example of FIG. 2, the observation point R is set at a position on a surface of the superstructure 7 located vertically above the sensor 2 provided at the main girder G. That is, the sensor 2 is an observation device that observes the observation point R. The sensor 2 detects a physical quantity which is a response to actions of a plurality of parts of the railway vehicle 6 moving on the superstructure 7, which is a structure, on the observation point R, and outputs data including the detected physical quantity. For example, each of the plurality of parts of the railway vehicle 6 is an axle or a wheel, and is hereinafter assumed to be an axle. In the present embodiment, each sensor 2 is an acceleration sensor and detects an acceleration as the physical quantity. The sensor 2 may be provided at a position where the acceleration generated at the observation point R due to the traveling of the railway vehicle 6 can be detected, but the sensor 2 is preferably provided at a position close to the observation point R in the vertical direction.

The number and installation positions of the sensors 2 are not limited to the example shown in FIGS. 1 and 2, and various modifications can be made.

The measurement device 1 acquires, based on the acceleration data output from the sensor 2, an acceleration in a direction intersecting a surface of the superstructure 7 on which the railway vehicle 6 moves. The surface of the superstructure 7 on which the railway vehicle 6 moves is defined by a direction in which the railway vehicle 6 moves, that is, an X direction which is the longitudinal direction of the superstructure 7, and a direction orthogonal to the direction in which the railway vehicle 6 moves, that is, a Y direction which is a width direction of the superstructure 7. Since the observation point R is bent in a direction orthogonal to the X direction and the Y direction due to the traveling of the railway vehicle 6, the measurement device 1 preferably acquires an acceleration in the direction orthogonal to the X direction and the Y direction, that is, a Z direction which is a normal direction of the floor plate F, in order to accurately calculate a magnitude of the acceleration of the bending.

Figure 3:
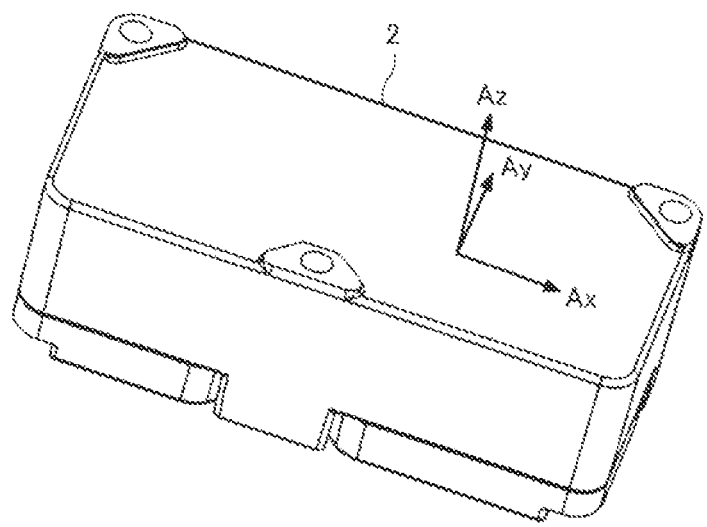
FIG. 3 is a diagram illustrating an acceleration detected by an acceleration sensor.

FIG. 3 is a diagram showing the acceleration detected by the sensor 2. The sensor 2 is an acceleration sensor that detects accelerations generated in three axes orthogonal to one another.

In order to detect the acceleration of the bending at the observation point R caused by the traveling of the railway vehicle 6, the sensor 2 is installed such that one of three detection axes thereof, which are the x axis, the y axis, and the z axis, is in a direction intersecting the X direction and the Y direction. In FIGS. 1 and 2, the sensor 2 is installed such that one axis thereof is in a direction intersecting the X direction and the Y direction. The observation point R is bent in the direction orthogonal to the X direction and the Y direction. Therefore, in order to accurately detect the acceleration of the bending, ideally, the sensor 2 is installed such that one axis thereof is aligned with the direction orthogonal to the X direction and the Y direction, that is, the normal direction of the floor plate F.

However, when the sensor 2 is installed on the superstructure 7, an installation location may be inclined. In the measurement device 1, even if one of the three detection axes of the sensor 2 is not installed in alignment with the normal direction of the floor plate F, since the one axis is substantially oriented in the normal direction, an error is small and thus can be ignored. The measurement device 1 can correct a detection error due to inclination of the sensor 2 based on a three-axis combined acceleration obtained by combining the accelerations in the x axis, the y axis, and the z axis even if one of the three detection axes of the sensor 2 is not installed in alignment with the normal direction of the floor plate F. Further, the sensor 2 may be a one-axis acceleration sensor that detects an acceleration generated at least in a direction substantially parallel to the vertical direction or an acceleration in the normal direction of the floor plate F.

Hereinafter, details of the measurement method according to the present embodiment executed by the measurement device 1 will be described.

2. Details of Measurement Method

First, the measurement device 1 integrates acceleration data a(k) output from the sensor 2, which is an acceleration sensor, to generate velocity data v(k) as in Equation (1), and further integrates the velocity data v(k) to generate measurement data u(k) as in Equation (2). The acceleration data a(k) is data of an acceleration change excluding an acceleration bias unnecessary for calculating a displacement change when the railway vehicle 6 passes through the bridge 5. For example, the acceleration directly before the railway vehicle 6 passes through the bridge 5 may be set to 0, and the subsequent acceleration change may be set as the acceleration data a(k). In Equation (1) and Equation (2), k is a sample number, and $\Delta T$ is a time interval of samples. The measurement data u(k) is data of the displacement of the observation point R due to the traveling of the railway vehicle 6.

$$v(k)=a(k)\Delta T+v(k-1) \quad (1)$$

$$u(k)=v(k)\Delta T+u(k-1) \quad (2)$$

Figure 4:
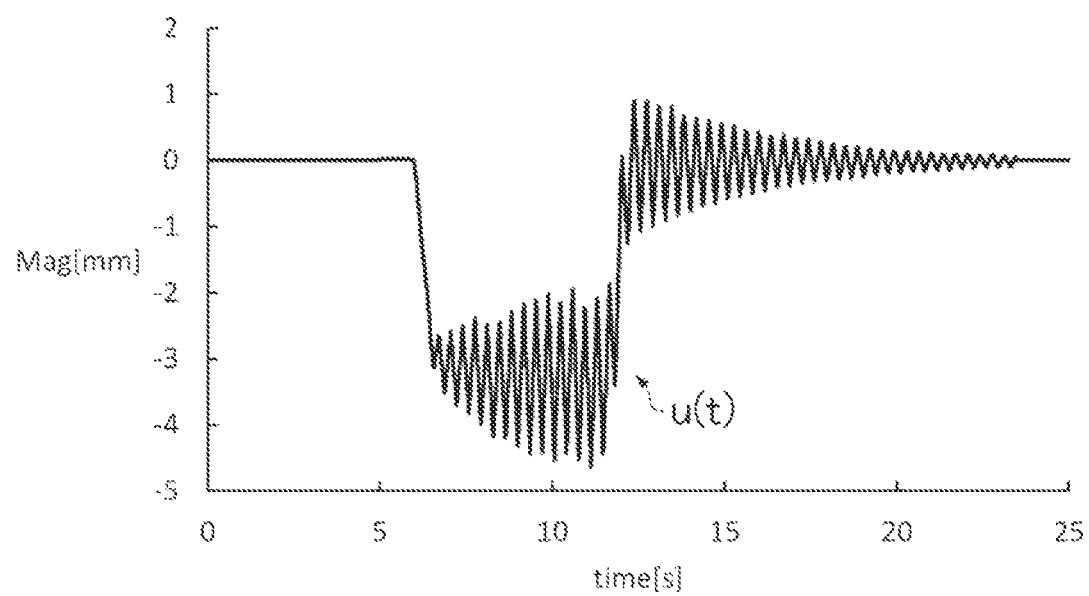
FIG. 4 is a diagram showing an example of measurement data $u(t)$.

The measurement data u(k) having the sample number k as a variable is converted into measurement data u(t) having the time point t as a variable at the time point t=k$\Delta$T. FIG. 4 shows an example of the measurement data u(t). Since the measurement data u(t) is generated based on the acceleration data a(t) output from the sensor 2 that observes the observation point R, the measurement data u(t) is data based on the acceleration that is a response to the actions of a plurality of parts of the railway vehicle 6 moving on the superstructure 7 on the observation point R.

Next, the measurement device 1 generates measurement data $u_{lp}$(t) obtained by performing filter processing on the measurement data u(t) in order to reduce a vibration component having a fundamental frequency $F_f$ included in the measurement data u(t) and a harmonic of the vibration component. The filter processing may be, for example, low-pass filter processing or band-pass filter processing.

Figure 5:
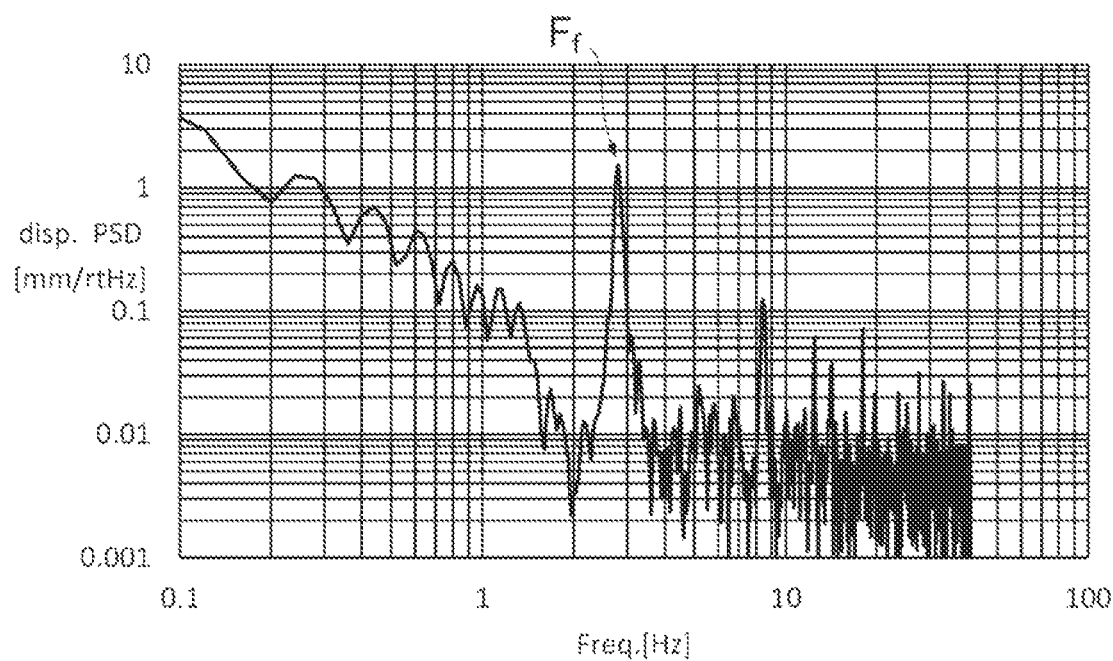
FIG. 5 is a diagram showing a power spectrum density of the measurement data $u(t)$.

Specifically, first, the measurement device 1 calculates a power spectrum density by performing fast Fourier transform processing on the measurement data u(t), and calculates a peak of the power spectrum density as the fundamental frequency $F_f$. FIG. 5 shows the power spectrum density obtained by performing fast Fourier transform processing on the measurement data u(t) of FIG. 4. In the example of FIG. 5, the fundamental frequency $F_f$ is calculated as about 3 Hz. Then, the measurement device 1 calculates a basic cycle $T_f$ based on the fundamental frequency $F_f$ according to Equation (3), and calculates a moving average interval $k_{mf}$ adjusted to a time resolution of the data by dividing the basic cycle $T_f$ by $\Delta T$ as in Equation (4). The basic cycle $T_f$ is a cycle corresponding to the fundamental frequency $F_f$, and $T_f>2\Delta T$.

$$T_f = \frac{1}{F_f} \quad (3)$$

$$k_{mf} = 2\left\lfloor \frac{T_f}{2\Delta T} \right\rfloor + 1 \quad (4)$$

Figure 6:
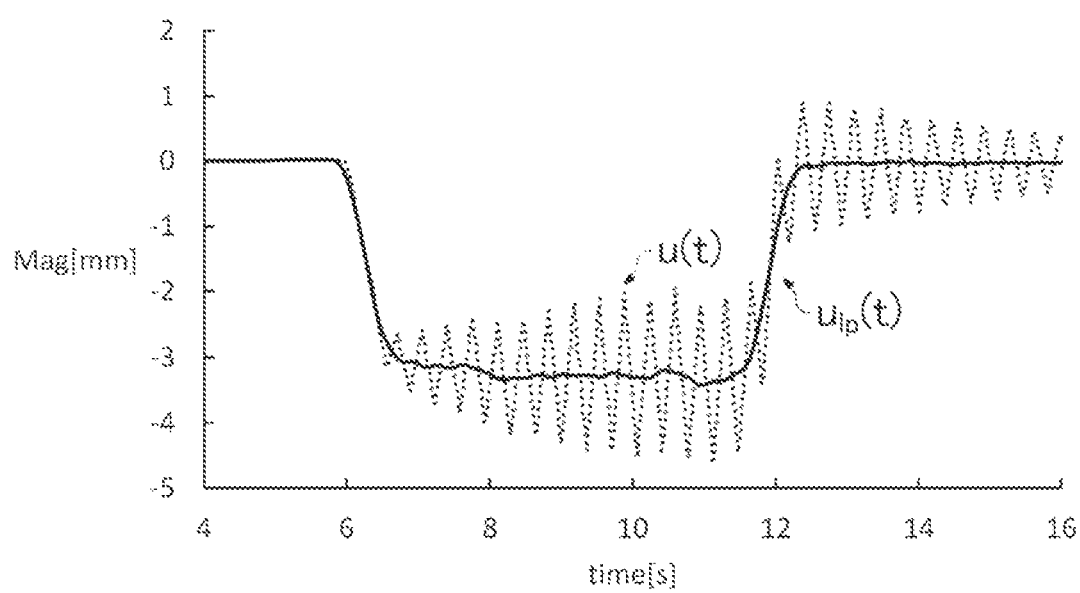
FIG. 6 is a diagram showing an example of measurement data $u_{lp}(t)$.

Then, the measurement device 1 performs, as the filter processing, moving average processing on the measurement data u(t) in the basic cycle Tf according to Equation (5) to generate the measurement data $u_{lp}$(t) in which the vibration component included in the measurement data u(t) is reduced. In the moving average processing, not only the necessary calculation amount is small, but also an attenuation amount of a signal component of the fundamental frequency $F_f$ and a harmonic component of the signal component is very large, so that the measurement data $u_{lp}$(t) in which the vibration component is effectively reduced is obtained. FIG. 6 shows an example of the measurement data $u_{lp}$(t). As shown in FIG. 6, the measurement data $u_{lp}$(t) from which the vibration component included in the measurement data u(t) is almost removed is obtained.

$$u_{lp}(k) = \frac{1}{k_{mf}} \sum_{n=k-\frac{k_{mf}-1}{2}}^{k+\frac{k_{mf}-1}{2}} u(n) \quad (5)$$

The measurement device 1 may generate the measurement data $u_{lp}$(t) by performing, as the filter processing, FIR filter processing for attenuating a signal component having a frequency equal to or higher than the fundamental frequency $F_f$ on the measurement data u(t). FIR is an abbreviation of finite impulse response. In the FIR filter processing, although a calculation amount is larger than that of the moving average processing, all signal components having a frequency equal to or higher than the fundamental frequency $F_f$ can be attenuated.

Next, the measurement device 1 calculates two time points at which an amplitude of the measurement data $u_{lp}$(t) matches a threshold $C_L u_a$ which is a product of a predetermined coefficient $C_L$ and an amplitude $u_a$ calculated based on the measurement data $u_{lp}$(t), or two times at which the amplitude of the measurement data $u_{lp}$(t) exceeds the threshold $C_L u_a$, as an entry time point $t_i$ and an exit time point $t_o$ of the railway vehicle 6 with respect to the superstructure 7. However, 0<$C_L$<1, and the amplitude $u_a$ is calculated as, for example, an average value in an interval from a time point $t_1$ to a time point $t_2$ in which the amplitude of the measurement data $u_{lp}$(t) is shifted, according to Equation (6).

$$u_a = \frac{1}{t_2 - t_1} \sum_{t=t_1}^{t_2} u_{lp}(t) \quad (6)$$

Figure 7:
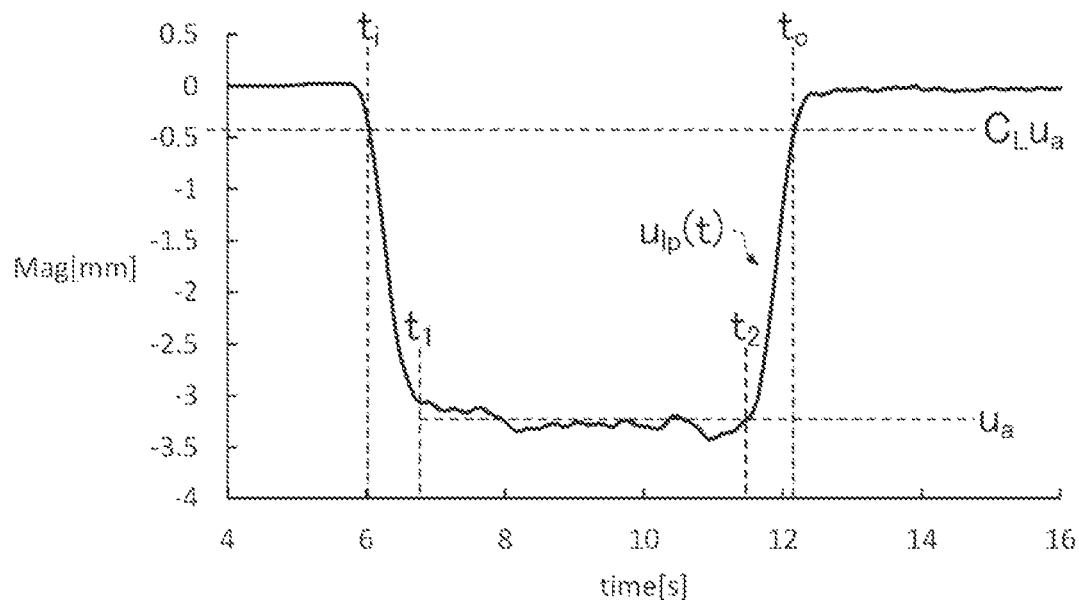
FIG. 7 is a diagram showing an example of a relation between the measurement data $u_{lp}(t)$, an entry time point $t_i$, and an exit time point $t_o$.

The entry time point $t_i$ is a time point at which a leading axle of the plurality of axles of the railway vehicle 6 passes through an entry end of the superstructure 7. The exit time point $t_o$ is a time point at which a rearmost axle of the plurality of axles of the railway vehicle 6 passes through an exit end of the superstructure 7. FIG. 7 shows an example of a relation between the measurement data $u_{lp}$(t), the entry time point $t_i$, and the exit time point $t_o$.

Next, the measurement device 1 calculates a difference between the exit time point $t_o$ and the entry time point $t_i$, as a passing time $t_s$ during which the railway vehicle 6 passes through the superstructure 7 of the bridge 5 according to Equation (7).

$$t_s = t_o - t_i \quad (7)$$

The measurement device 1 calculates, as the number of vehicles $C_T$ of the railway vehicle 6, a maximum integer less than or equal to a number obtained by subtracting 1 from a product of the passing time $t_s$ and the fundamental frequency $F_f$, according to Equation (8).

$$C_T = \lfloor t_s F_f - 1 \rfloor = \text{floor}(t_s F_f - 1) = \{t_s F_f - 1\} \quad (8)$$

The measurement device 1 stores observation information including the entry time point $t_i$, the exit time point $t_o$, the passing time $t_s$, and the number of vehicles CT in a storage unit (not shown). In the example of FIG. 7, the entry time point $t_i$ is at 7.155 second, the exit time point $t_o$ is at 12.845 second, the passing time $t_s$ is 5.69 seconds, and the number of vehicles CT is 16.

Then, the measurement device 1 performs the following processing based on the observation information and environment information which is created in advance and includes dimensions of the railway vehicle 6 and dimensions of the superstructure 7.

Figure 8:
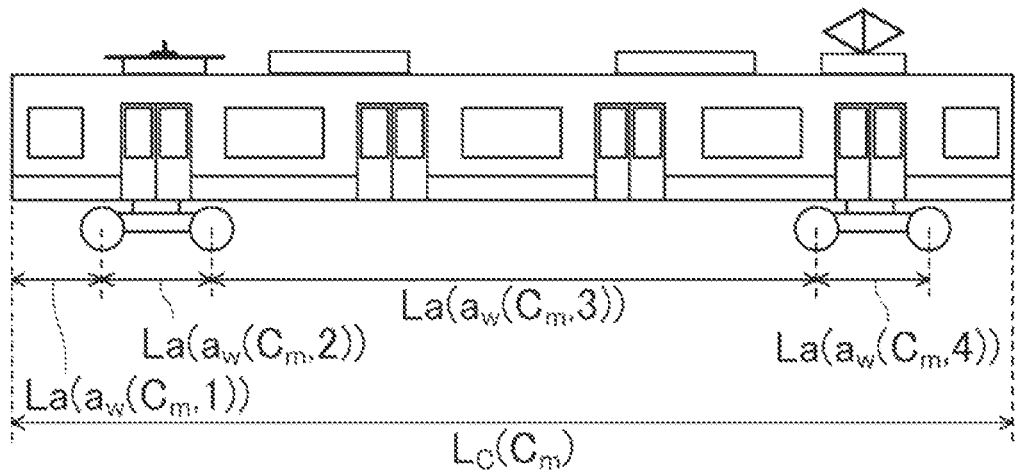
FIG. 8 is a diagram showing an example of a length $L_C(C_m)$ of a vehicle and a distance $La(a_w(C_m,n))$ between axles.

The environment information includes, for example, a length $L_B$ of the superstructure 7 and a position $L_x$ of the observation point R as the dimensions of the superstructure 7. The length $L_B$ of the superstructure 7 is a distance between the entry end and the exit end of the superstructure 7. The position $L_x$ of the observation point R is a distance from the entry end of the superstructure 7 to the observation point R. The environment information includes, for example, a length $L_C(C_m)$ of each vehicle of the railway vehicle 6, the number of axles $a_T(C_m)$ of each vehicle, and a distance $La(a_w(C_m,n))$ between axles of each vehicle, as the dimensions of the railway vehicle 6. $C_m$ is a vehicle number, and the length $L_C(C_m)$ of each vehicle is a distance between two ends of a $C_m$-th vehicle. The number of axles $a_T(C_m)$ of each vehicle is the number of axles of the $C_m$-th vehicle, n is an axle number of each vehicle, and $1 \leq n \leq a_T(C_m)$. The distance $La(a_w(C_m,n))$ between axles of each vehicle is a distance between a front end of the $C_m$-th vehicle and a first axle when n=1, and is a distance between the (n−1)-th axle and the n-th axle when n≥2. FIG. 8 shows an example of the length $L_C(C_m)$ of the $C_m$-th vehicle of the railway vehicle 6 and the distance $La(a_w(C_m,n))$ between the axles. The dimensions of the railway vehicle 6 and the dimensions of the superstructure 7 can be measured by a known method. A database of the dimensions of the railway vehicle 6 passing through the bridge 5 may be created in advance, and the dimensions of a corresponding vehicle may be referred to according to the passing time point.

When it is assumed that the railway vehicle 6 in which any number of vehicles having the same dimensions are coupled to each other travels on the superstructure 7 of the bridge 5, the environment information may include the length $L_C(C_m)$ of the vehicle, the number of axles $a_T(C_m)$ of the vehicle, and the distance $La(a_w(C_m,n))$ between the axles, which are related to one vehicle.

A total number of axles $Ta_T$ of the railway vehicle 6 is calculated according to Equation (9) using the number of vehicles $C_T$ included in the observation information and the number of axles $a_T(C_m)$ of each vehicle included in the environment information.

$$Ta_T = \sum_{C_m=1}^{C_T} a_T(C_m) \tag{9}$$

A distance $D_{wa}(a_w(C_m,n))$ from the leading axle to the n-th axle of the $C_m$-th vehicle of the railway vehicle 6 is calculated according to Equation (10) using the length $L_C(C_m)$ of each vehicle, the number of axles $a_T(C_m)$ of each vehicle, and the distance $La(a_w(C_m,n))$ between axles of each vehicle included in the environment information. In Equation (10), it is assumed that $L_C(C_m) = L_C(1)$.

$$D_{wa}(a_w(C_m, n)) = \sum_{y=1}^{C_m} L_C(y) + \sum_{x=1}^{n} La(a_w(C_m, x)) - \{L_C(1) + La(a_w(1,1))\} \tag{10}$$

The measurement device 1 calculates a distance $D_{was}(a_w(C_T, a_T(C_T)))$ from the leading axle to the rearmost axle of the rearmost vehicle of the railway vehicle 6 according to Equation (11) obtained by substituting $C_m = C_T$ and $n = a_T(C_T)$ into Equation (10).

$$D_{wa}(a_w(C_T, a_T(C_T))) = \tag{11}$$

$$\sum_{y=1}^{C_T} L_C(y) + \sum_{x=1}^{a_T(C_T)} La(a_w(C_T, x)) - \{L_C(1) + La(a_w(1,1))\}$$

An average velocity $v_a$ of the railway vehicle 6 is calculated according to Equation (12) using the length $L_B$ of the superstructure 7 included in the environment information, the passing time $t_s$ included in the observation information, and the calculated distance $D_{wa}(a_w(C_T, a_T(C_T)))$.

$$v_a = \frac{L_B}{t_s} + \frac{D_{wa}(a_w(C_T, a_T(C_T)))}{t_s} \tag{12}$$

The measurement device 1 calculates the average velocity $v_a$ of the railway vehicle 6 according to Equation (13) obtained by substituting Equation (11) into Equation (12).

$$v_a = \frac{L_B}{t_s} + \frac{1}{t_s}\left[\sum_{y=1}^{C_T} L_C(y) + \sum_{x=1}^{a_T(C_T)} La(a_w(C_T, x)) - \{L_C(1) + La(a_w(1,1))\}\right] \tag{13}$$

Next, the measurement device 1 calculates a deflection amount of the superstructure 7 caused by the traveling of the railway vehicle 6 in the following manner.

Figure 9:
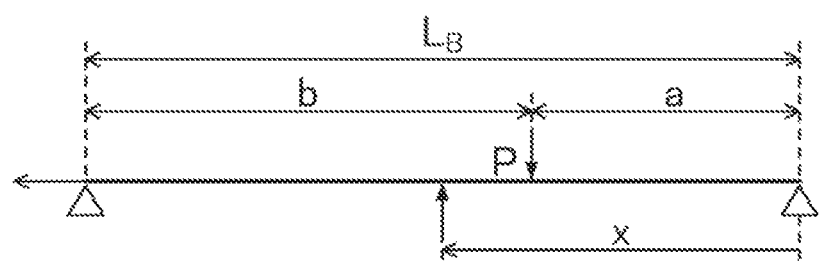
FIG. 9 is a diagram illustrating a structural model of a superstructure of a bridge.

In the present embodiment, considering that the superstructure 7 of the bridge 5 has a configuration in which one or a plurality of bridge floors 7a including the floor plate F, the main girder G, and the like are continuously arranged, the measurement device 1 calculates a displacement of one bridge floor 7a as a displacement at the central portion in the longitudinal direction. The load applied to the superstructure 7 moves from one end to the other end of the superstructure 7. In this case, the deflection amount, which is the displacement of the central portion of the superstructure 7, can be expressed by a position of the load on the superstructure 7 and an amount of the load. In the present embodiment, in order to express the deflection deformation when the axles of the railway vehicle 6 moves on the superstructure 7 as a trajectory of the deflection amount caused by the movement on the bridge under one-point load, the structural model shown in FIG. 9 is considered, and the deflection amount at the central portion is calculated in the structural model. In FIG. 9, P is a load, a is a load position from the entry end of the superstructure 7 on a side where the railway vehicle 6 enters, and b is a load position from the exit end of the superstructure 7 on a side where the railway vehicle 6 exits. $L_B$ is the length of the superstructure 7, that is, the distance between two ends of the superstructure 7. The structural model shown in FIG. 9 is a simple beam in which two ends are supported with the two ends as fulcrums.

In the structural model shown in FIG. 9, when the position of the entry end of the superstructure 7 is zero and an observation position of the deflection amount is x, a bending moment M of the simple beam is expressed by Equation (14).

$$M = \frac{b}{L_B}Px - PH_a(x-a) \tag{14}$$

In Equation (14), a function $H_a$ is defined as Equation (15).

$$H_a = \begin{cases} 0 & (\text{if } x \le a) \\ 1 & (\text{if } x > a) \end{cases} \quad (15)$$

Equation (16) is obtained by transforming Equation (14).

$$-\frac{ML_B}{P} = -bx + H_a L_B(x-a) \quad (16)$$

Meanwhile, the bending moment M is expressed by Equation (17). In Equation (17), θ is an angle, I is a secondary moment, and E is a Young's modulus.

$$-M = EI\frac{d\theta}{dx} \quad (17)$$

Equation (18) is obtained by substituting Equation (17) into Equation (16).

$$\frac{EIL_B}{P}\frac{d\theta}{dx} = -bx + H_a L_B(x-a) \quad (18)$$

Equation (20) is obtained by calculating Equation (19) which is obtained by integrating Equation (18) with respect to the observation position x. In Equation (20), $C_1$ is an integral constant.

$$\int \frac{EIL_B}{P}\frac{d\theta}{dx}dx = \int(-bx + H_a L_B(x-a))dx \quad (19)$$

$$\frac{EIL_B}{P}\theta = -\frac{bx^2}{2} + H_a \frac{L_B(x-a)^2}{2} + C_1 \quad (20)$$

Equation (22) is obtained by calculating Equation (21) which is obtained by integrating Equation (20) with respect to the observation position x. In Equation (22), $C_2$ is an integral constant.

$$\int \frac{EIL_B}{P}\theta dx = \int \left\{-\frac{bx^2}{2} + H_a \frac{L_B(x-a)^2}{2} + C_1\right\}dx \quad (21)$$

$$\frac{EIL_B}{P}\theta x = -\frac{bx^3}{6} + H_a \frac{L_B(x-a)^3}{6} + C_1 x + C_2 \quad (22)$$

In Equation (22), θx represents the deflection amount, and Equation (23) is obtained by replacing θx with a deflection amount w.

$$\frac{EIL_B}{P}w = -\frac{bx^3}{6} + H_a \frac{L_B(x-a)^3}{6} + C_1 x + C_2 \quad (23)$$

As shown in FIG. 9, since $b=L_B-a$, Equation (23) is transformed as in Equation (24).

$$\frac{EIL_B}{P}w = -\frac{(L_B-a)x^3}{6} + H_a \frac{L_B(x-a)^3}{6} + C_1 x + C_2 \quad (24)$$

When x=0 and the deflection amount w=0, $H_a=0$ as x≤a, and therefore, when x=w=$H_a$=0 is substituted into Equation (24), Equation (25) is obtained.

$$C_2 = 0 \quad (25)$$

When x=$L_B$ and the deflection amount w=0, $H_a=1$ as x>a, and therefore, when x=$L_B$, w=0, and $H_a=1$ are substituted into Equation (24), Equation (26) is obtained.

$$C_1 = \frac{a(L_B-a)(a+2(L_B-a))}{6} \quad (26)$$

Equation (27) is obtained by substituting $b=L_B-a$ into Equation (26).

$$C_1 = \frac{ab(a+2b)}{6} \quad (27)$$

Equation (28) is obtained by substituting an integral constant $C_1$ of Equation (25) and an integral constant $C_2$ of Equation (26) into Equation (23).

$$\frac{EIL_B}{P}w = -\frac{bx^3}{6} + H_a \frac{L_B(x-a)^3}{6} + \frac{ab(a+2b)}{6}x \quad (28)$$

Equation (28) is transformed, and the deflection amount w at the observation position x when the load P is applied to the position a is expressed by Equation (29).

$$w = \frac{P}{6EIL_B}\{-bx^3 + H_a L_B(x-a)^3 + ab(a+2b)x\} \quad (29)$$

A deflection amount $w_{0.5LB}$ at the observation position x at the center when the load P is at the center of the superstructure 7 is expressed by Equation (30), wherein x=0.5 LB, a=b=0.5 LB, and $H_a$=0. The deflection amount $w_{0.5LB}$ is a maximum amplitude of the deflection amount w.

$$w_{0.5L_B} = \frac{P}{48EI}L_B^3 \quad (30)$$

The deflection amount w at any observation position x is normalized by the deflection amount $w_{0.5LB}$. When the position a of the load P is on an entry end side of the observation position x, as x>a, Equation (31) is obtained by substituting $H_a=1$ is into Equation (30).

$$w = \frac{P}{6EIL_B}\{-bx^3 + L_B(x-a)^3 + ab(a+2b)x\} \quad (31)$$

When the position a of the load P is represented by $a=L_B r$, and $a=L_B r$, $b=L_B(1-r)$ is substituted into Equation (31), Equation (32) is obtained, and a deflection amount $w_{std}$ in which the deflection amount w is normalized is obtained according to Equation (32). r represents a ratio of the position a of the load P to the length $L_B$ of the superstructure 7.

$$w_{std} = \frac{8}{L_B}\left\{xr^3 + \left(\frac{x^3}{L_B^2} + 2x\right)r\right\} - \frac{8}{L_B}\left(L_B r^3 + \frac{3x^2}{L_B}r\right) \quad (32)$$

Similarly, when the position a of the load P is on an exit end side of the observation position x, as x≤a, Equation (33) is obtained by substituting $H_a=0$ into Equation (30).

$$w = \frac{P}{6EIL_B}\{-bx^3 + ab(L_B + b)x\} \quad (33)$$

When the position a of the load P is represented by $a=L_B r$, and $a=L_B r$ and $b=L_B(1-r)$ are substituted into Equation (33), Equation (34) is obtained, and the deflection amount $w_{std}$ in which the deflection amount w is normalized is obtained according to Equation (34).

$$w_{std} = \frac{8}{L_B}\left\{xr^3 + \left(\frac{x^3}{L_B^2} + 2x\right)r\right\} - \frac{8}{L_B}\left(3xr^2 + \frac{x^3}{L_B^2}\right) \quad (34)$$

Equation (32) and Equation (34) are combined, and a deflection amount $w_{std}(r)$ at any observation position $x=L_x$ is expressed by Equation (35). In Equation (35), a function R(r) is expressed by Equation (36). Equation (35) is an approximate equation of the deflection of the superstructure 7 which is a structure, and is an equation based on the structural model of the superstructure 7. Specifically, Equation (35) is an approximate equation normalized by the maximum amplitude of the deflection at the center position between the entry end and the exit end of the superstructure 7.

$$w_{std}(r) = \frac{8}{L_B}\left\{L_x r^3 + \left(\frac{L_x^3}{L_B^2} + 2L_x\right)r - R(r)\right\} \quad (35)$$

$$R(r) = \begin{cases} L_B r^3 + \frac{3L_x^2}{L_B}r & \text{(if } L_x > L_B r) \\ 3L_x r^2 + \frac{L_x^3}{L_B^2} & \text{(if } L_x \le L_B r) \end{cases} \quad (36)$$

In the present embodiment, the load P is a load of any axle of the railway vehicle 6. A time $t_{xn}$ required for a certain axle of the railway vehicle 6 to reach the position $L_x$ of the observation point R from the entry end of the superstructure 7 is calculated according to Equation (37) using the average velocity $v_a$ calculated according to Equation (12).

$$t_{xn} = \frac{L_x}{v_a} \quad (37)$$

A time $t_{ln}$ required for a certain axle of the railway vehicle 6 to pass through the superstructure 7 having the length $L_B$ is calculated according to Equation (38).

$$t_{ln} = \frac{L_B}{v_a} \quad (38)$$

A time point $t_0(C_m,n)$ at which the n-th axle of the $C_m$-th vehicle of the railway vehicle 6 reaches the entry end of the superstructure 7 is calculated according to Equation (39) using the entry time point $t_i$ included in the observation information, the distance $D_{wa}(a_w(C_m,n))$ calculated according to Equation (10), and the average velocity $v_a$ calculated according to Equation (12).

$$t_0(C_m, n) = t_i + \frac{1}{v_a}D_{wa}(a_w(C_m, n)) \quad (39)$$

Figure 10:
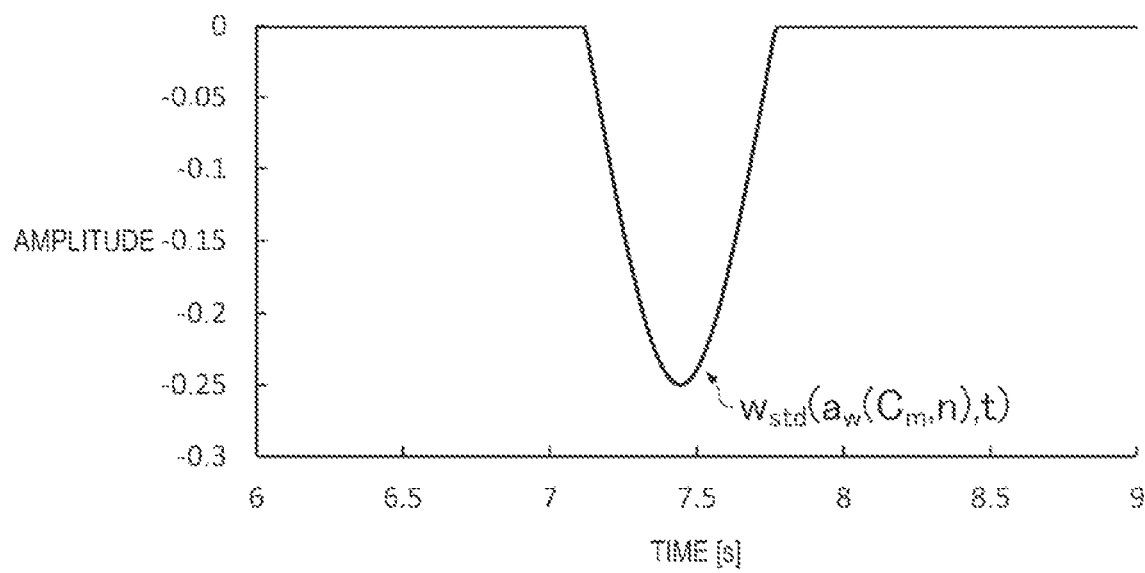
FIG. 10 is a diagram showing an example of a deflection amount $w_{std}(a_w(C_m,n),t)$.

Using Equation (37), Equation (38), and Equation (39), the measurement device 1 calculates, according to Equation (40), a deflection amount $w_{std}(a_w(C_m,n),t)$ obtained by replacing, with time, the deflection amount $w_{std}(r)$ caused by the n-th axle of the $C_m$-th vehicle and represented by Equation (35). In Equation (40), a function R(t) is expressed by Equation (41). FIG. 10 shows an example of the deflection amount $w_{std}(a_w(C_m,n),t)$.

$$w_{std}(a_w(C_m, n), t) = \begin{cases} 0 & \text{if } (t < t_0(C_m, n)) \\ \frac{8}{t_{ln}}\left\{t_{xn}\left(\frac{t-t_0(C_m,n)}{t_{ln}}\right)^3 + \right. \\ \left.\left(\frac{t_{xn}^3}{t_{ln}^2} + 2t_{xn}\right)\left(\frac{t-t_0(C_m,n)}{t_{ln}}\right) - R(t)\right\} & \text{if } (t_0(C_m, n) \le t \le t_0(C_m, n) + t_{ln}) \\ 0 & \text{if } (t_0(C_m, n) + t_{ln} < t) \end{cases} \quad (40)$$

$$R(t) = \begin{cases} 0 & \text{if } (t < t_0(C_m, n)) \\ t_{ln}\left(\frac{t-t_0(C_m,n)}{t_{ln}}\right)^3 + \\ \frac{3t_{xn}^2}{t_{ln}}\left(\frac{t-t_0(C_m,n)}{t_{ln}}\right) & \text{if } (t_0(C_m,n) \le t \le t_0(C_m,n)+t_{ln} \cap t_{xn} > t - t_0(C_m,n)) \\ 3t_{xn}\left(\frac{t-t_0(C_m,n)}{t_{ln}}\right)^2 + \frac{t_{xn}^3}{t_{ln}^2} & \text{if } (t_0(C_m,n) \le t \le t_0(C_m,n)+t_{ln} \cap t_{xn} \le t - t_0(C_m,n)) \\ 0 & \text{if } (t_0(C_m, n) + t_{ln} < t) \end{cases} \quad (41)$$

Figure 11:
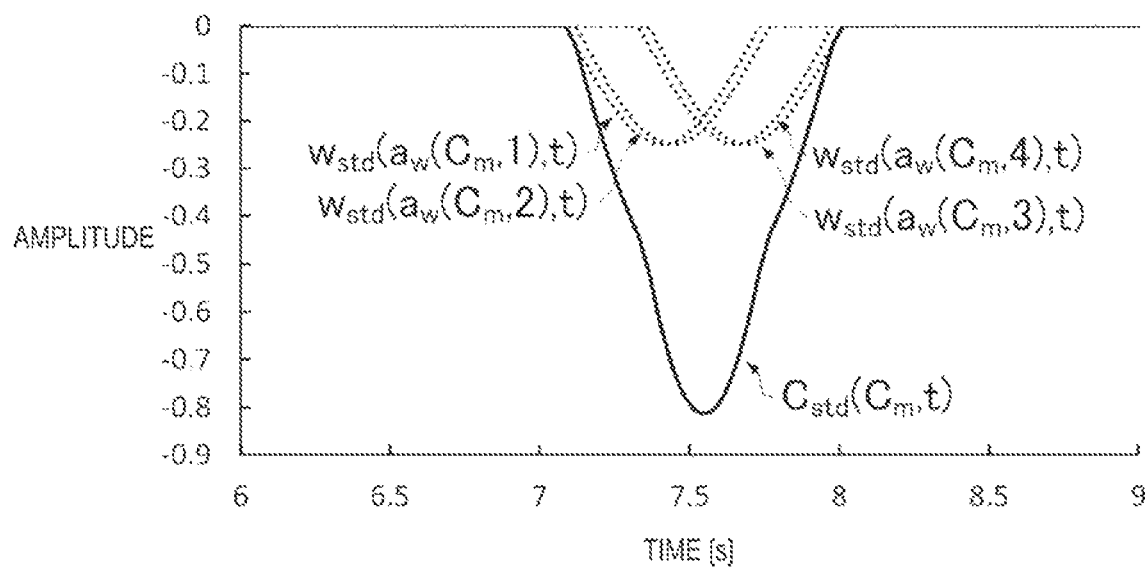
FIG. 11 is a diagram showing an example of a deflection amount $C_{std}(C_m,t)$.

The measurement device 1 calculates a deflection amount $C_{std}(C_m,t)$ caused by the $C_m$-th vehicle according to Equation (42). FIG. 11 shows an example of the deflection amount $C_{std}(C_m,t)$ caused by the $C_m$-th vehicle with the number of axles n=4.

$$C_{std}(C_m, t) = \sum_{n=1}^{a_T(C_m)} w_{std}(a_w(C_m, n), t) \quad (42)$$

Figure 12:
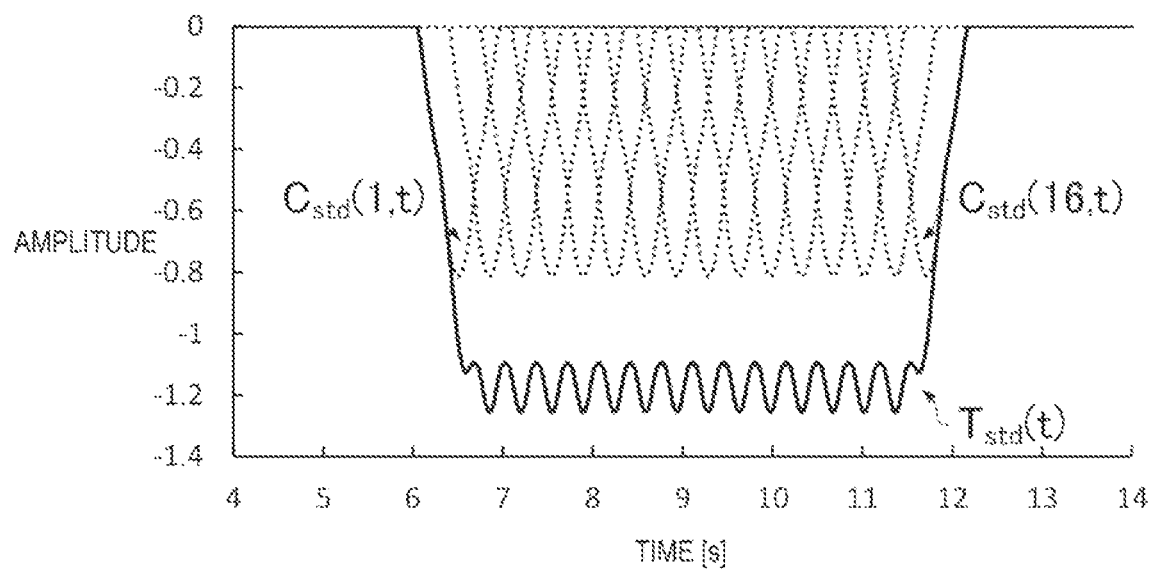
FIG. 12 is a diagram showing an example of a deflection amount $T_{std}(t)$.

The measurement device 1 further calculates a deflection amount $T_{std}(t)$ caused by the railway vehicle 6 according to Equation (43). FIG. 12 shows an example of the deflection amount $T_{std}(t)$ caused by the railway vehicle 6 with the number of vehicles $C_T=16$. In FIG. 12, the broken line indicates 16 deflection amounts $C_{std}(1,t)$ to $C_{std}(16,t)$.

$$T_{std}(t) = \sum_{C_m=1}^{C_T} C_{std}(C_m, t) \quad (43)$$

Next, the measurement device 1 generates a deflection amount $T_{std\_lp}(t)$, obtained by performing filter processing on the deflection amount $T_{std}(t)$, in order to reduce the vibration component having a fundamental frequency $F_M$ included in the deflection amount $T_{std}(t)$ and a harmonic of the vibration component. The filter processing may be, for example, low-pass filter processing or band-pass filter processing.

Specifically, first, the measurement device 1 calculates a power spectrum density by performing fast Fourier transform processing on the deflection amount $T_{std}(t)$ and calculates a peak of the power spectrum density as the fundamental frequency $F_M$. Then, the measurement device 1 calculates a basic cycle $T_M$ based on the fundamental frequency $F_M$ according to Equation (44), and calculates a moving average interval $k_{mM}$, adjusted to a time resolution of the data, by dividing the basic cycle $T_M$ by $\Delta T$ as in Equation (45). The basic cycle $T_M$ is a cycle corresponding to the fundamental frequency $F_M$, and $T_M > 2\Delta T$.

$$T_M = \frac{1}{f_M} \tag{44}$$

$$k_{mM} = 2\left\lfloor \frac{T_M}{2\Delta T} \right\rfloor + 1 \tag{45}$$

Figure 13:
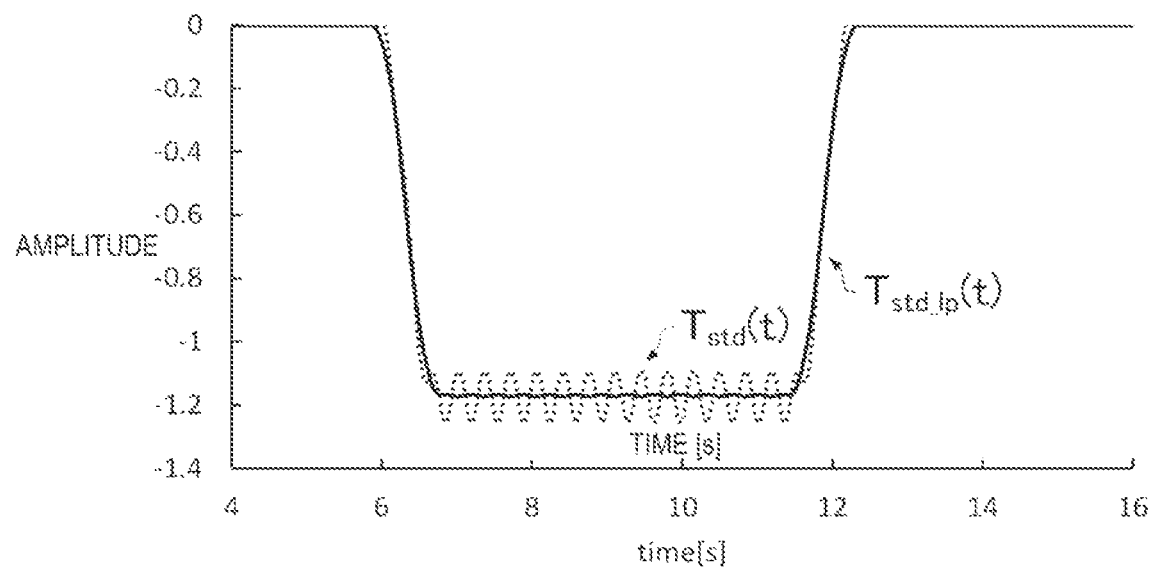
FIG. 13 is a diagram showing an example of a deflection amount $T_{std\_lp}(t)$.

Then, the measurement device 1 performs, as the filter processing, moving average processing on the deflection amount $T_{std}(t)$ in the basic cycle $T_M$ according to Equation (46) to calculate the deflection amount $T_{std\_lp}(t)$ in which the vibration component included in the deflection amount $T_{std}(t)$ is reduced. In the moving average processing, not only a necessary calculation amount is small, but also an attenuation amount of the signal component of the fundamental frequency $F_M$ and the harmonic component of the signal component is very large, so that the deflection amount $T_{std\_lp}(t)$ in which the vibration component is effectively reduced is obtained. FIG. 13 shows an example of the deflection amount $T_{std\_lp}(t)$. As shown in FIG. 13, the deflection amount $T_{std\_lp}(t)$ from which the vibration component included in the deflection amount $T_{std}(t)$ is almost removed is obtained.

$$T_{std\_lp}(k) = \frac{1}{k_{mM}} \sum_{n=k-\frac{k_{mM}-1}{2}}^{k+\frac{k_{mM}-1}{2}} T_{std}(n) \tag{46}$$

The measurement device 1 may generate the deflection amount $T_{std\_lp}(t)$ by performing, as the filter processing, FIR filter processing for attenuating a signal component having a frequency equal to or higher than the fundamental frequency $F_M$, on the deflection amount $T_{std}(t)$. In the FIR filter processing, although a calculation amount is larger than that of the moving average processing, all signal components having a frequency equal to or higher than the fundamental frequency $F_f$ can be attenuated.

Figure 14:
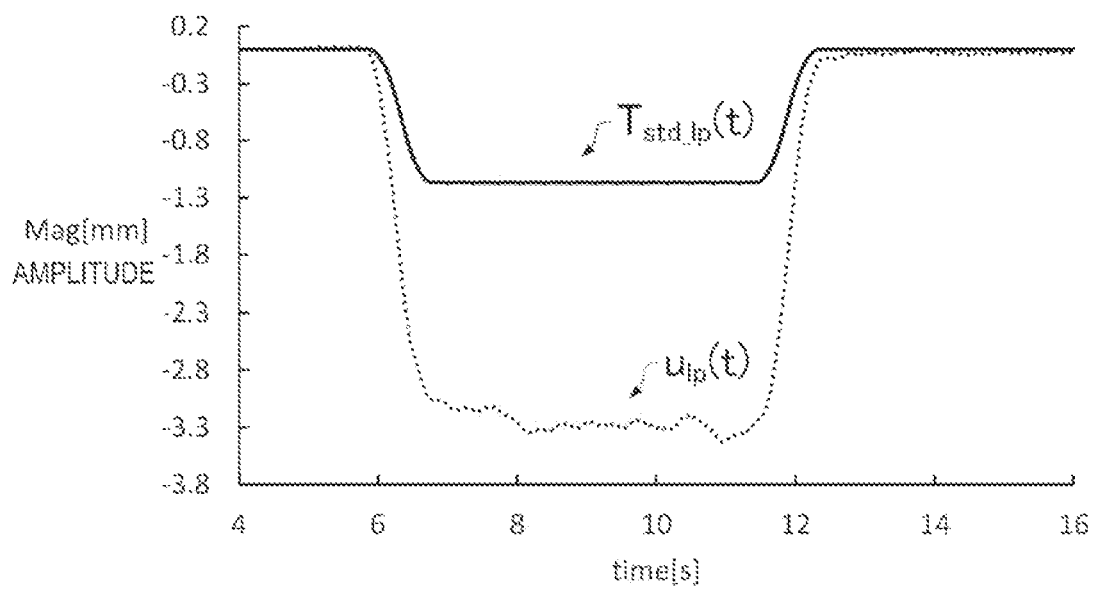
FIG. 14 is a diagram showing the measurement data $u_{lp}(t)$ and the deflection amount $T_{std\_lp}(t)$ in an overlapping manner.

FIG. 14 shows the measurement data $u_{lp}(t)$ shown in FIG. 6 and the deflection amount $T_{std\_lp}(t)$ shown in FIG. 13 in an overlapping manner. The deflection amount $T_{std\_lp}(t)$ is considered to be a deflection amount proportional to the load of the railway vehicle 6 passing through the superstructure 7, and it is assumed that a linear function of the deflection amount $T_{std\_lp}(t)$ is substantially equal to the measurement data $u_{lp}(t)$. That is, the measurement device 1 approximates the measurement data $u_{lp}(t)$ by the linear function of the deflection amount $T_{std\_lp}(t)$ as in Equation (47). An approximate time interval is a time interval between the entry time point $t_i$ and the exit time point $t_o$ or a time interval in which the amplitude of the deflection amount $T_{std\_lp}(t)$ is 0.

$$u_{lp}(t) \cong c_1 T_{std\_lp}(t) + c_0 \tag{47}$$

Then, the measurement device 1 calculates a first-order coefficient $c_1$ and a zero-order coefficient $c_0$ of the linear function represented by Equation (47). For example, the measurement device 1 calculates, using a least-squares method, the first-order coefficient $c_1$ and the zero-order coefficient $c_0$ at which an error $e(t)$ represented by Equation (48), that is, a difference between the measurement data $u_{lp}(t)$ and the linear function of Equation (47) is minimized.

$$e(t) = u_{lp}(t) - c_1 T_{std\_lp}(t) + c_0 \tag{48}$$

$$t_i \leq t \leq t_o$$

The first-order coefficient $c_1$ and the zero-order coefficient $c_0$ are calculated according to Equation (49) and Equation (50), respectively. A data section corresponding to the approximate time interval is set as $k_a \leq k \leq k_b$.

$$c_1 = \left\{ n \sum_{k=k_a}^{k_b} u_{lp}(k) T_{std\_lp}(k) - \sum_{k=k_a}^{k_b} T_{std\_lp}(k) \sum_{k=k_a}^{k_b} u_{lp}(k) \right\} / \left\{ n \sum_{k=k_a}^{k_b} T_{std\_lp}(k)^2 - \sum_{k=k_a}^{k_b} T_{std\_lp}(k)^2 \right\} \tag{49}$$

$$n = \sum_{k=k_a}^{k_b} 1$$

$$c_0 = \left\{ \sum_{k=k_a}^{k_b} u_{lp}(k) - c_1 \sum_{k=k_a}^{k_b} T_{std\_lp}(k) \right\} / n \tag{50}$$

$$n = \sum_{k=k_a}^{k_b} 1$$

Figure 15:
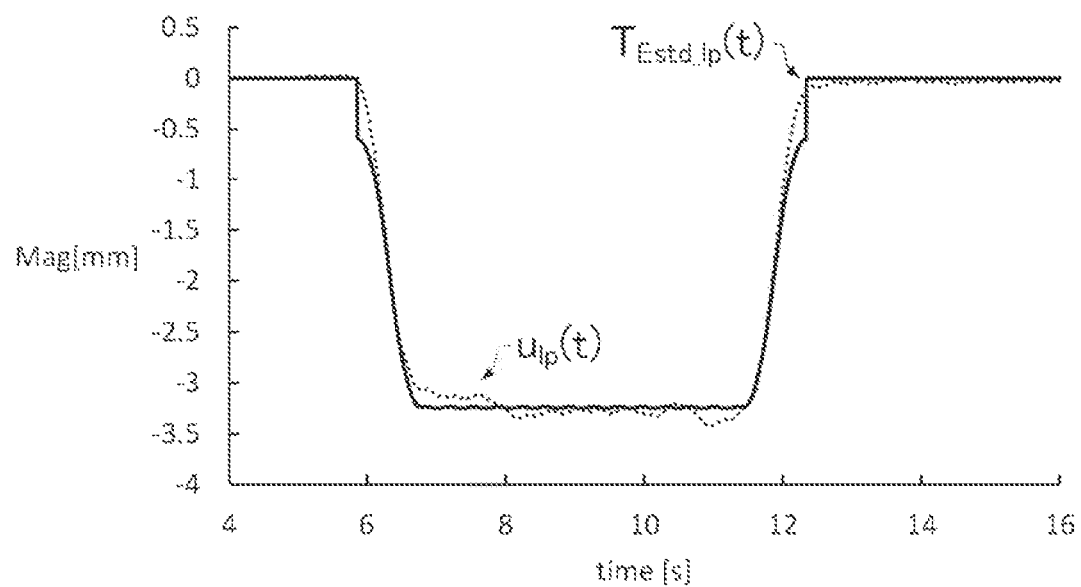
FIG. 15 is a diagram showing an example of a deflection amount $T_{Estd\_lp}(t)$.

Then, the measurement device 1 calculates a deflection amount $T_{Estd\_lp}(t)$ in which the deflection amount $T_{std\_lp}(t)$ is adjusted using the first-order coefficient $c_1$ and the zero-order coefficient $c_0$, as in Equation (51). As shown in Equation (51), the deflection amount $T_{Estd\_lp}(t)$ basically corresponds to a right side of Equation (47), and the zero-order coefficient $c_0$ is set to 0 in an interval before the entry time point $t_i$ and an interval after the exit time point $t_o$. FIG. 15 shows an example of the deflection amount $T_{Estd\_lp}(t)$.

$$T_{Estd\_lp}(t) = \begin{cases} t < t_i & c_1 T_{std\_lp}(t) \\ t_i \leq t \leq t_o & c_1 T_{std\_lp}(t) + c_0 \\ t_o < t & c_1 T_{std\_lp}(t) \end{cases} \tag{51}$$

As in Equation (52), it is assumed that a linear function of the deflection amount $T_{std}(t)$ using the first-order coefficient $c_1$ calculated according to Equation (49) and the zero-order coefficient $c_0$ calculated according to Equation (50) is substantially equal to the measurement data $u(t)$.

$$u(t) \cong c_1 T_{std}(t) + c_0 \tag{52}$$

$$t_i \leq t \leq t_o$$

Figure 16:
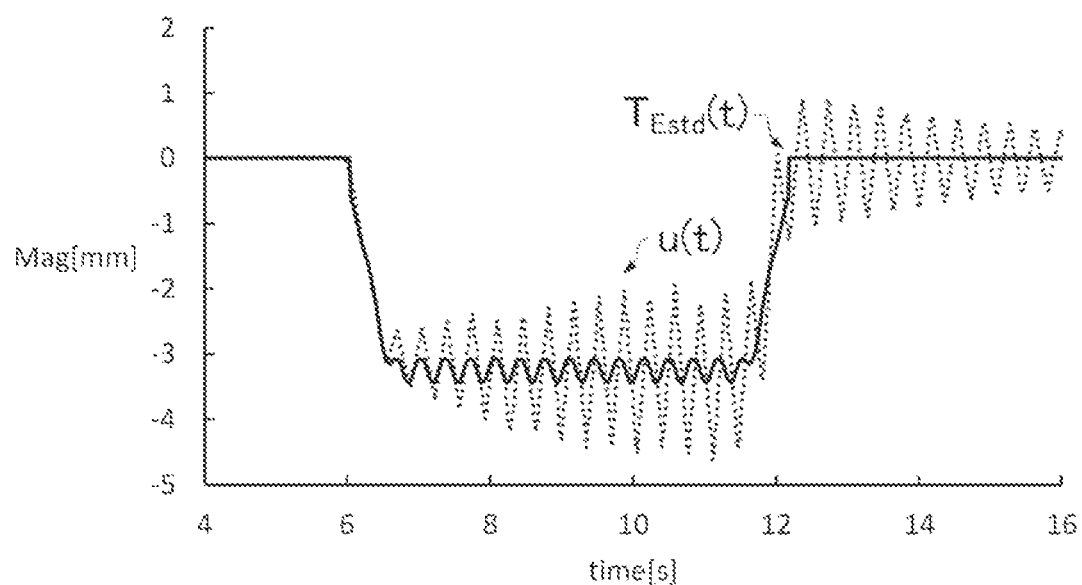
FIG. 16 is a diagram showing an example of a deflection amount $T_{Estd}(t)$.

A deflection amount $T_{Estd}(t)$ obtained by adjusting the deflection amount $T_{std}(t)$ using the first-order coefficient $c_1$ and the zero-order coefficient $c_0$ is calculated according to Equation (53). A right side of Equation (53) is obtained by replacing $T_{std\_lp}(t)$ on a right side of Equation (51) with $T_{std}(t)$. FIG. 16 shows an example of the deflection amount $T_{Estd}(t)$.

$$T_{Estd}(t) = \begin{cases} t < t_i & c_1 T_{std}(t) \\ t_i \leq t \leq t_o & c_1 T_{std}(t) + c_0 \\ t_o < t & c_1 T_{std}(t) \end{cases} \tag{53}$$

Figure 17:
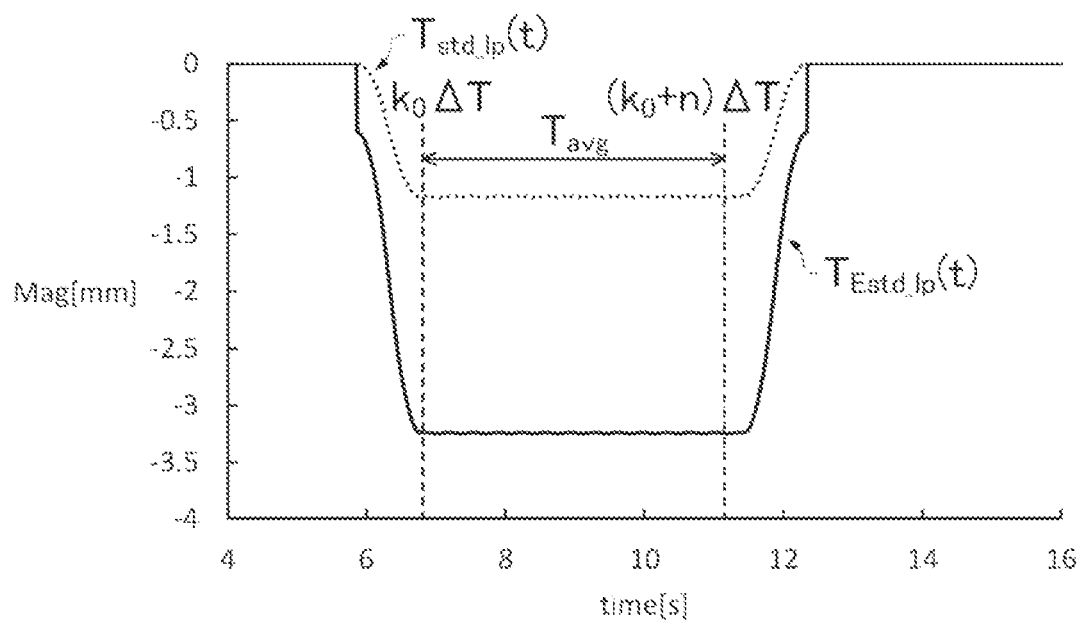
FIG. 17 is a diagram showing an example of a relation between the deflection amount $T_{Estd\_lp}(t)$ and the deflection amount $T_{std\_lp}(t)$ and a predetermined interval $T_{avg}$ for calculating average values thereof.

Next, the measurement device 1 calculates an amplitude ratio $R_T$ between the deflection amount $T_{Estd\_lp}(t)$ and the deflection amount $T_{std\_lp}(t)$ in a predetermined interval according to Equation (54) with $t=k\Delta T$. In Equation (54), a numerator is an average value of $n+1$ samples of the deflection amount $T_{Estd\_lp}(t)$ included in a predetermined interval which is a part of an interval in which the waveform of the deflection amount $T_{Estd\_lp}(t)$ and the waveform of the deflection amount $T_{std\_lp}(t)$ are shifted, and a denominator is an average value of $n+1$ samples of the deflection amount $T_{std\_lp}(t)$ included in the predetermined interval. FIG. 17 shows an example of a relation between the deflection amount $T_{Estd\_lp}(t)$ and the deflection amount $T_{std\_lp}(t)$ and a predetermined interval $T_{avg}$ for calculating the average values thereof.

$$R_T = \left(\frac{1}{n+1}\sum_{k=k_0}^{k_0+n} T_{Estd\_lp}(k)\right) \bigg/ \left(\frac{1}{n+1}\sum_{k=k_0}^{k_0+n} T_{std\_lp}(k)\right) \quad (54)$$

Figure 18:
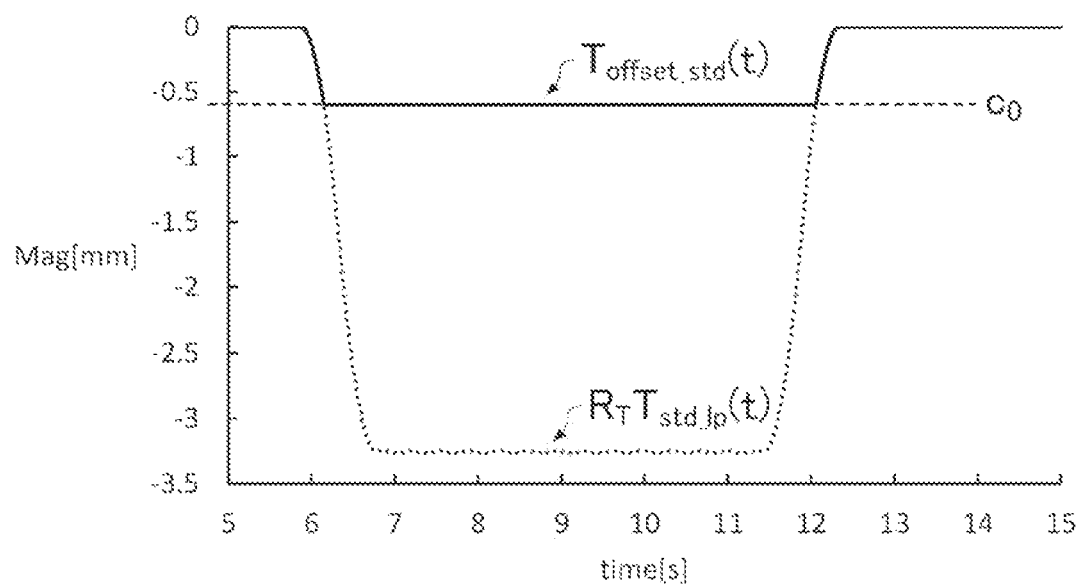
FIG. 18 is a diagram showing an example of an offset $T_{offset\_std}(t)$.

Next, the measurement device 1 compares a product $R_T T_{std\_lp}(t)$ of the amplitude ratio RT and the deflection amount $T_{std\_lp}(t)$ with the zero-order coefficient $c_0$ to calculate an offset $T_{offset\_std}(t)$. Specifically, the measurement device 1 calculates the offset $T_{offset\_std}(t)$ by replacing, with the zero-order coefficient $c_0$, an interval of the product $R_T T_{std\_lp}(t)$ in which an absolute value of the product $R_T T_{std\_lp}(t)$ of the amplitude ratio RT and the deflection amount $T_{std\_lp}(t)$ is bigger than an absolute value of the zero-order coefficient $c_0$, as in Equation (55). FIG. shows an example of the offset $T_{offset\_std}(t)$. In the example of FIG. 18, since the amplitude of the deflection amount $T_{std\_lp}(t)$ is 0 or negative, the measurement device 1 calculates the offset $T_{offset\_std}(t)$ by replacing, with the zero-order coefficient $c_0$, an interval in which the product $R_T T_{std\_lp}(t)$ is smaller than the zero-order coefficient $c_0$.

$$T_{offset\_std}(t) = \begin{cases} R_T T_{std\_lp}(t) \geq c_0 & R_T T_{std\_lp}(t) \\ R_T T_{std\_lp}(t) < c_0 & c_0 \end{cases} \quad (55)$$

Figure 19:
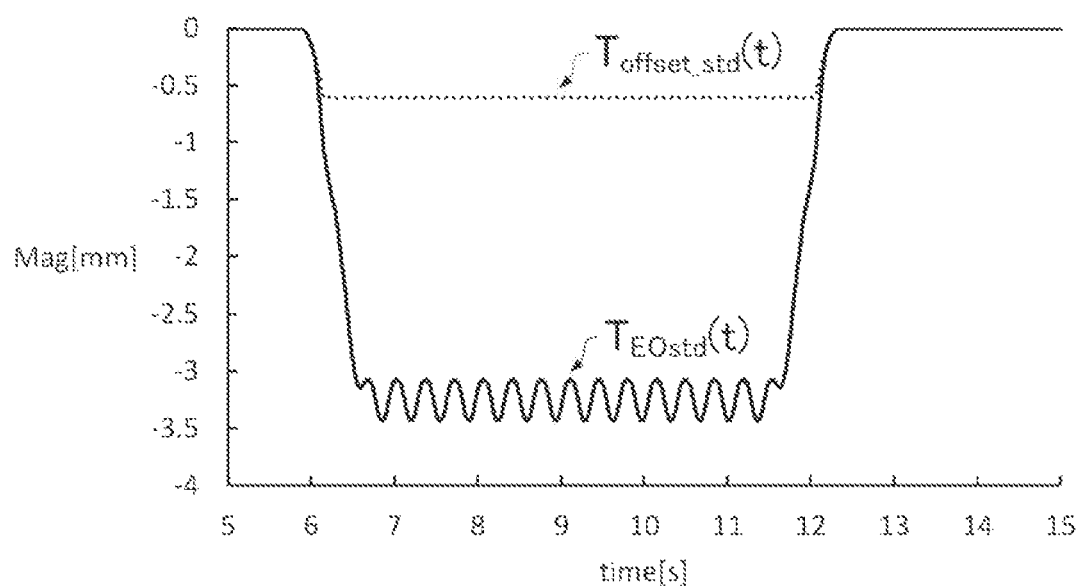
FIG. 19 is a diagram showing an example of a deflection amount $T_{EOstd}(t)$.
Figure 20:
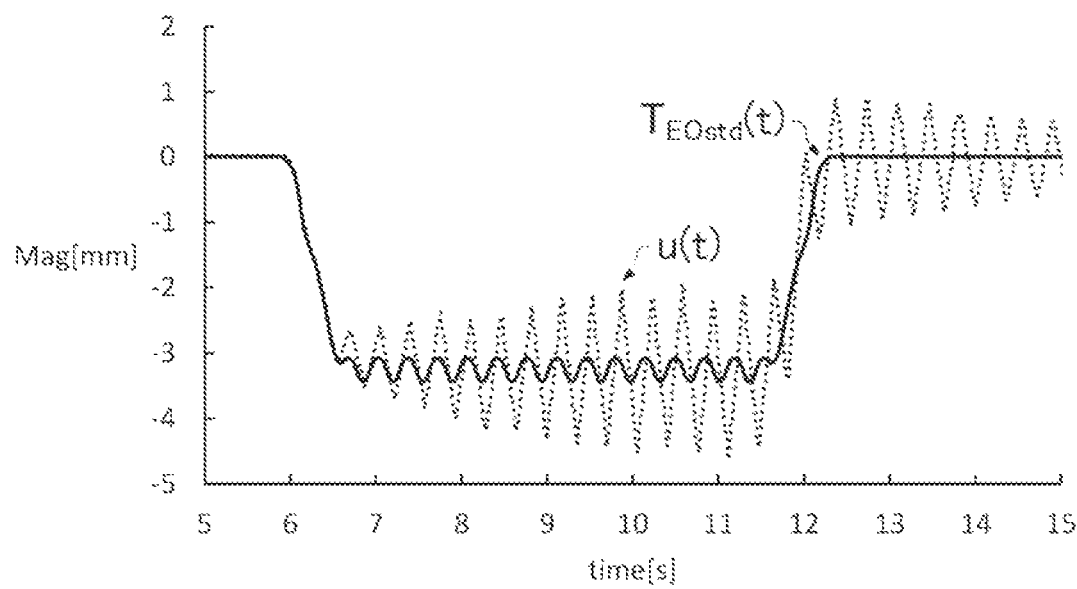
FIG. 20 is a diagram showing a relation between the measurement data u(t) and the deflection amount $T_{EOstd}(t)$.

Next, the measurement device 1 calculates a deflection amount $T_{EOstd}(t)$ by adding a product $c_1 T_{std}(t)$ of the first-order coefficient $c_1$ and the deflection amount $T_{std}(t)$ and the offset $T_{offset\_std}(t)$, as in Equation (56). The deflection amount $T_{EOstd}(t)$ corresponds to the static response when the railway vehicle 6 passes through the superstructure 7. FIG. 19 shows an example of the deflection amount $T_{EOstd}(t)$. FIG. 20 shows a relation between the measurement data $u(t)$ and the deflection amount $T_{EOstd}(t)$.

$$T_{EOstd}(t) = c_1 T_{std}(t) + T_{offset\_std}(t) \quad (56)$$

Figure 21:
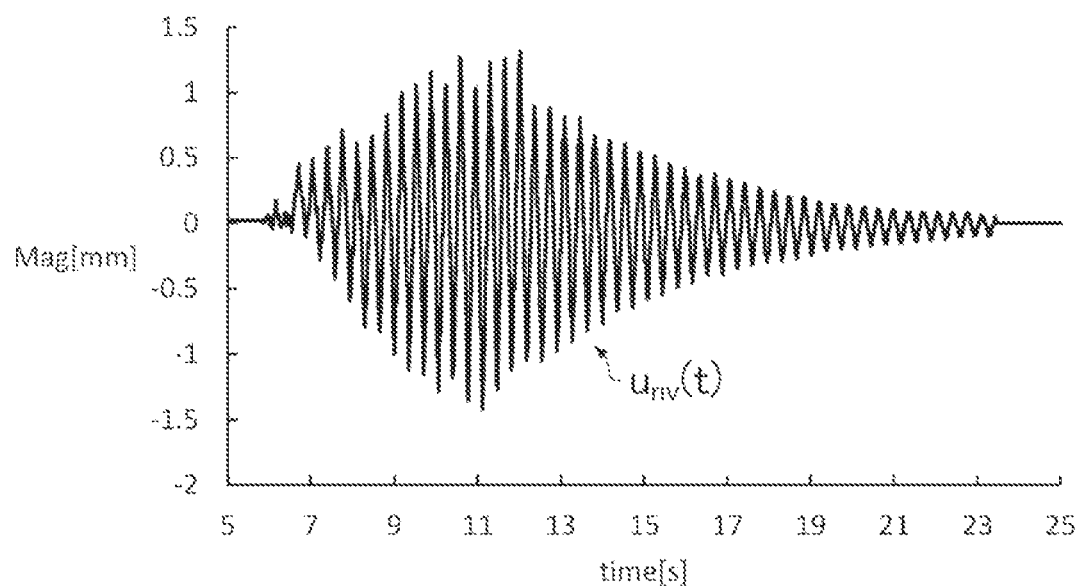
FIG. 21 is a diagram showing an example of natural vibration $u_{nv}(t)$.

Then, the measurement device 1 calculates natural vibration $u_{nv}(t)$ by subtracting the deflection amount $T_{EOstd}(t)$ from the measurement data $u(t)$ as in Equation (57). The natural vibration $u_{nv}(t)$ corresponds to the dynamic response when the railway vehicle 6 passes through the superstructure 7. FIG. 21 shows an example of the natural vibration $u_{nv}(t)$.

$$u_{nv}(t) = u(t) - T_{EOstd}(t) \quad (57)$$

The natural vibration $u_{nv}(t)$ as a first dynamic response calculated according to Equation (57) includes an unnecessary signal in addition to a fundamental wave. Therefore, in order to extract the fundamental wave of the natural vibration $u_{nv}(t)$, the measurement device 1 performs filter processing for attenuating the unnecessary signal from the natural vibration $u_{nv}(t)$ which is the first dynamic response, to calculate natural vibration $u_{nv\_3lp}(t)$ as a second dynamic response. The unnecessary signal is, for example, a signal component having a frequency lower than a frequency $F_N$ of the fundamental wave or a harmonic component of the fundamental wave.

The filter processing for attenuating the unnecessary signal from the natural vibration $u_{nv}(t)$ includes low-pass filter processing for attenuating a harmonic component of a vibration component having the fundamental frequency $F_N$ included in the natural vibration $u_{nv}(t)$ and correcting a gain at the fundamental frequency $F_N$. Further, the filter processing for attenuating the unnecessary signal from the natural vibration $u_{nv}(t)$ may include high-pass filter processing for attenuating a signal component having a frequency lower than the fundamental frequency $F_N$.

For example, after performing high-pass filter processing on the natural vibration $u_{nv}(t)$, the measurement device 1 may further perform low-pass filter processing. Specifically, first, the measurement device 1 calculates the natural vibration $u_{nv\_hp}(t)$ by performing, on the natural vibration $u_{nv}(t)$, the high-pass filter processing for attenuating a signal component having a frequency lower than the fundamental frequency $F_N$ of the natural vibration $u_{nv}(t)$.

Figure 22:
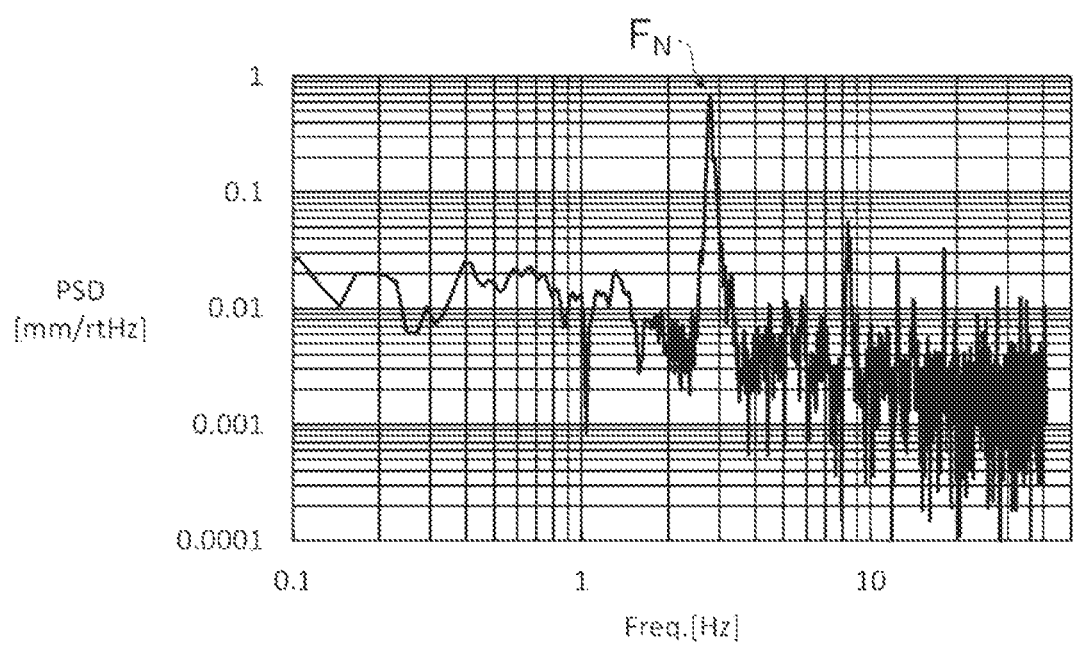
FIG. 22 is a diagram showing a power spectrum density of the natural vibration $u_{nv}(t)$.

Specifically, first, the measurement device 1 calculates a power spectrum density by performing fast Fourier transform processing on the natural vibration $u_{nv}(t)$, and calculates a peak of the power spectrum density as the fundamental frequency $F_N$. FIG. 22 shows a power spectrum density obtained by performing fast Fourier transform processing on the natural vibration $u_{nv}(t)$ of FIG. 21. In the example of FIG. 22, the fundamental frequency $F_N$ is calculated as about 3 Hz. Then, the measurement device 1 calculates a basic cycle $T_N$ based on the fundamental frequency $F_N$ according to Equation (58), and calculates a moving average interval $k_{mN}$ adjusted to a time resolution of the data by dividing the basic cycle $T_N$ by $\Delta T$ as in Equation (59). The basic cycle $T_N$ is a cycle corresponding to the fundamental frequency $F_N$, and $T_N > 2\Delta T$.

$$T_N = \frac{1}{F_N} \quad (58)$$

$$k_{mN} = 2\left\lfloor \frac{T_N}{2\Delta T} \right\rfloor + 1 \quad (59)$$

Figure 23:
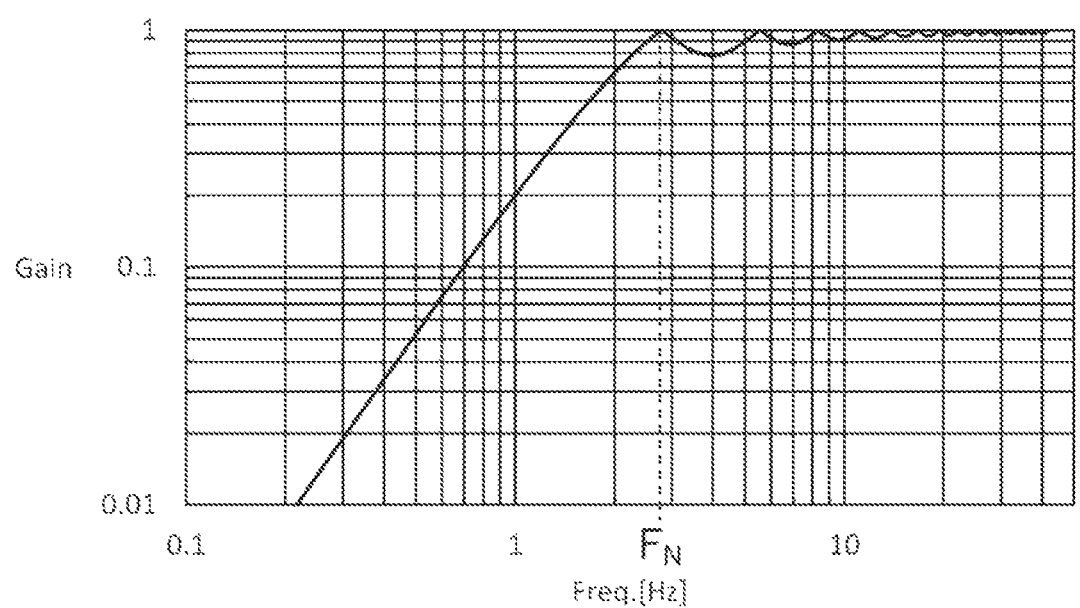
FIG. 23 is a diagram showing a frequency characteristic of a high-pass filter.
Figure 24:
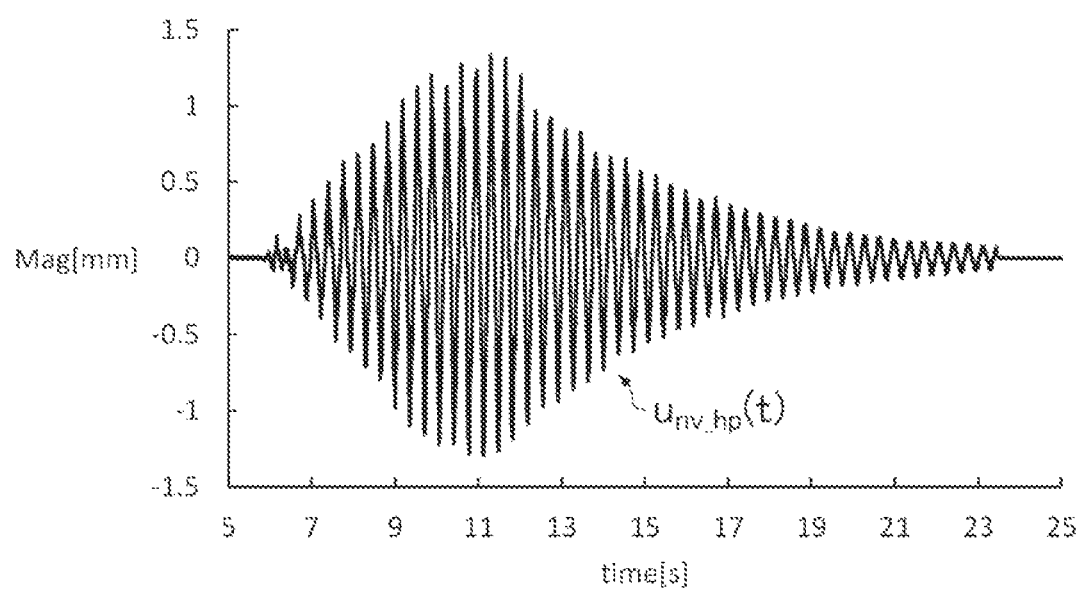
FIG. 24 is a diagram showing an example of natural vibration $u_{nv\_hp}(t)$.

Then, the measurement device 1 calculates the natural vibration $u_{nv\_hp}(t)$ according to Equation (60) by performing high-pass filter processing for subtracting, from the natural vibration $u_{nv}(t)$, a low-frequency signal component in which a vibration component is reduced by performing moving average processing on the natural vibration $u_{nv}(t)$ in the basic cycle $T_N$. In the moving average processing, not only the necessary calculation amount is small, but also an attenuation amount of a signal component of the fundamental frequency $F_N$ and a harmonic component of the signal component is very large, so that a low-frequency signal component in which the vibration component is effectively reduced can be obtained. Therefore, the natural vibration $u_{nv\_hp}(t)$ in which the low-frequency signal component is effectively reduced can be obtained according to Equation (60). FIG. 23 shows a frequency characteristic of a high-pass filter according to Equation (60). FIG. 24 shows an example of the natural vibration $u_{nv\_hp}(t)$.

$$u_{nv\_hp}(k) = u_{nv}(k) - \frac{1}{k_{mN}} \sum_{n=k-\frac{k_{mN}-1}{2}}^{k+\frac{k_{mN}-1}{2}} u_{nv}(n) \qquad (60)$$

The measurement device 1 may calculate the natural vibration $u_{nv\_hp}(t)$ by performing, as the high-pass filter processing, FIR filter processing for attenuating a signal component having a frequency lower than the fundamental frequency $F_N$ on the natural vibration $u_{nv}(t)$.

Further, the measurement device 1 calculates the natural vibration $u_{nv\_31p}(t)$ as the second dynamic response by performing the low-pass filter processing for attenuating the harmonic component of the vibration component having the fundamental frequency FN included in the natural vibration $u_{nv\_hp}(t)$ and correcting the gain at the fundamental frequency FN. For example, in the power spectrum density of the natural vibration $u_{nv}(t)$ shown in FIG. 22, a third harmonic component is large. Therefore, in order to attenuate the third harmonic component, the measurement device 1 calculates a moving average interval $k_{mL}$, adjusted to a time resolution of the data, by dividing a cycle three times the basic cycle $T_N$ by $\Delta T$, as in Equation (61). $3T_N > 2\Delta T$.

$$k_{mL} = 2 \left\lfloor \frac{3T_N}{2\Delta T} \right\rfloor + 1 \qquad (61)$$

Figure 25:
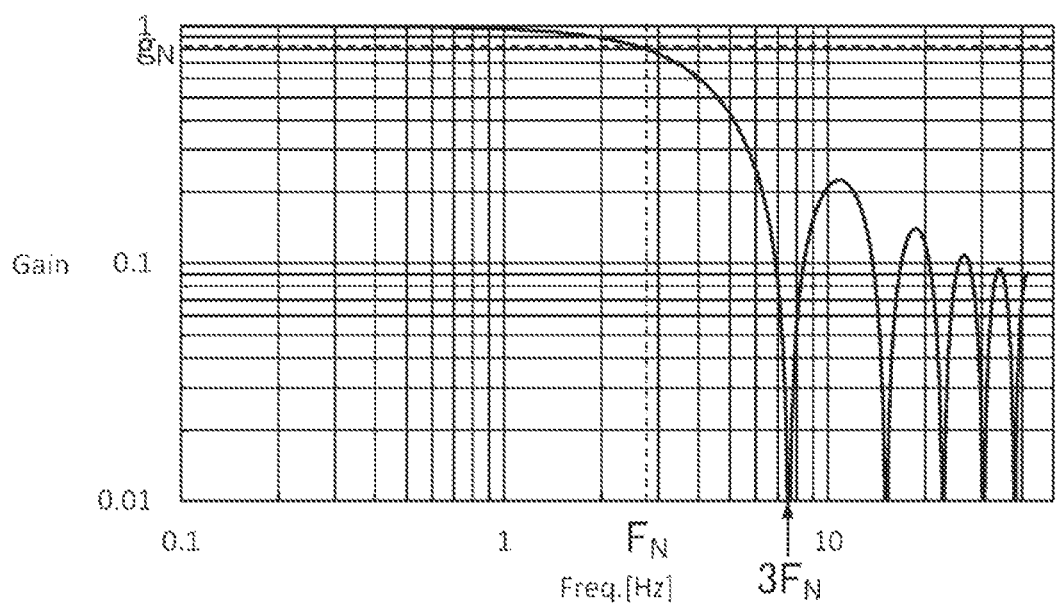
FIG. 25 is a diagram showing a transfer characteristic of a moving average filter.

When the natural vibration $u_{nv\_hp}(t)$ is subjected to the moving average processing in the moving average interval $k_{mL}$, since a frequency interval between the fundamental frequency $F_N$ and a frequency $3F_N$ that is three times the fundamental frequency $F_N$ is small, a gain $g_N$ of the fundamental frequency $F_N$ is smaller than 1, as shown in FIG. 25. Since a transfer characteristic of a moving average filter is expressed by Equation (62), the measurement device 1 can calculate the gain $g_N$ when $\omega = 2\pi F_N$ according to Equation (62).

$$H(z) = \frac{1-z^{-N}}{1-z^{-1}} \left( N = k_{mf} - 1, z = e^{-i\omega \Delta T} \right) \qquad (62)$$

Figure 26:
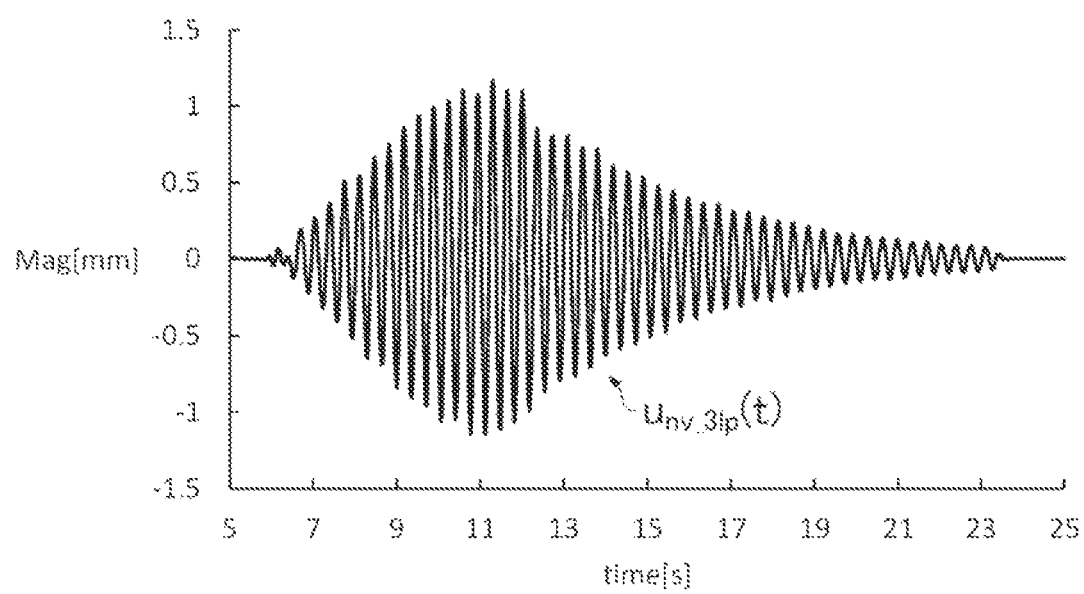
FIG. 26 is a diagram showing an example of natural vibration $u_{nv\_31p}(t)$.

Therefore, assuming that a correction coefficient for correcting the gain of the fundamental frequency $F_N$ to 1 is $g_N^{-1}$, the measurement device 1 calculates, according to Equation (63), the natural vibration $u_{nv\_31p}(t)$ as the second dynamic response by performing low-pass filter processing for attenuating the third harmonic component included in the natural vibration $u_{nv}(t)$ and correcting the gain at the fundamental frequency $F_N$ to 1. The natural vibration $u_{nv\_31p}(t)$ calculated as described above can be basically regarded as a vibration component having the fundamental frequency FN included in the natural vibration $u_{nv}(t)$. FIG. 26 shows an example of the natural vibration $u_{nv\_31p}(t)$.

$$u_{nv\_3lp}(t) = g_f^{-1} f_{lp}(u_{nv\_hp}(t)) = g_f^{-1} \frac{1}{k_{mL}} \sum_{n=k-\frac{k_{mL}-1}{2}}^{k+\frac{k_{mL}-1}{2}} u_{nv\_hp}(n) \qquad (63)$$

When a second harmonic component included in the natural vibration $u_{nv}(t)$ is large, the measurement device 1 performs moving average processing for attenuating the second harmonic component. When both the second harmonic component and the third harmonic component included in the natural vibration $u_{nv}(t)$ are large, the measurement device 1 may perform both moving average processing for attenuating the second harmonic component and moving average processing for attenuating the third harmonic component. In general, when an n-th harmonic component included in the natural vibration $u_{nv}(t)$ is large, the measurement device 1 may perform moving average processing for attenuating the n-th harmonic component.

The measurement device 1 may calculate the natural vibration $u_{nv\_31p}(t)$ by performing, as the low-pass filter processing, FIR filter processing for attenuating a signal component having a frequency higher than the fundamental frequency $F_N$ on the natural vibration $u_{nv\_hp}(t)$.

Although a case where the measurement device 1 performs the low-pass filter processing after performing the high-pass filter processing on the natural vibration $u_{nv}(t)$ is described, the measurement device 1 may perform the high-pass filter processing after performing the low-pass filter processing on the natural vibration $u_{nv}(t)$. When a signal component having a frequency lower than the fundamental frequency $F_N$ included in the natural vibration $u_{nv}(t)$ is small, the measurement device 1 may not perform the high-pass filter processing.

Figure 27:
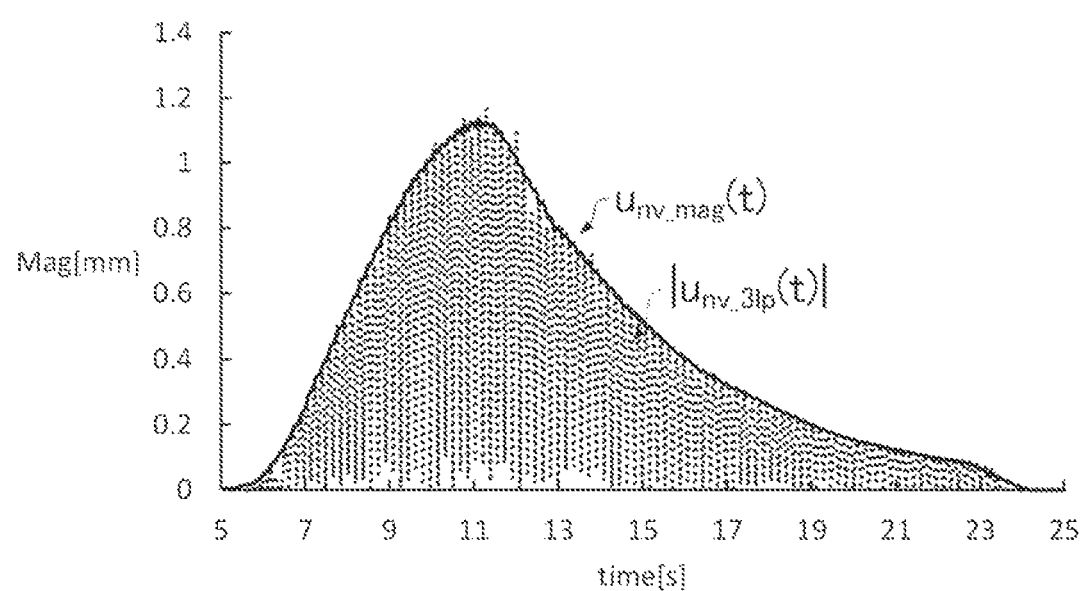
FIG. 27 is a diagram showing an example of an envelope amplitude $u_{nv\_mag}(t)$.

Next, the measurement device 1 calculates an envelope amplitude $u_{nv\_mag}(t)$ of the natural vibration $u_{nv\_31p}(t)$. Specifically, since the natural vibration $u_{nv\_31p}(t)$ can be substantially regarded as a vibration component having the fundamental frequency $F_N$, the measurement device 1 calculates the envelope amplitude $u_{nv\_mag}(t)$ by performing low-pass filter processing on an absolute value of the natural vibration $u_{nv\_31p}(t)$ according to Equation (64) with a crest factor set to $\pi/2$. FIG. 27 shows an example of the envelope amplitude $u_{nv\_mag}(t)$.

$$u_{nv\_mag}(t) = \frac{\pi}{2} f_{lp}(|u_{nv\_3lp}(t)|) = \frac{\pi}{2} \sum_{s=t-\frac{k}{F_N}}^{t+\frac{k}{F_N}} |u_{nv\_3lp}(t)| \qquad (64)$$

Since the absolute value of the natural vibration $u_{nv\_31p}(t)$ includes a signal component having a frequency twice the fundamental frequency $F_N$, a pass band of the low-pass filter processing is preferably in a range lower than $2F_N$. For example, in a case where the low-pass filter processing is moving average processing as in Equation (64), assuming that a moving average interval length $t_{MA}$ is a value obtained by dividing an integer k by the fundamental frequency $F_N$, and when k=4, $F_N$=2.7917 Hz, and $\Delta T$=0.012 second, $t_{MA}$ may be set to $t_{MA}$=118$\Delta T$ as in Equation (65).

$$t_{MA} = \frac{k}{F_N} = \frac{4}{2.7917} \cong 1.416 = 118\Delta T \qquad (65)$$

Next, the measurement device 1 approximates the envelope amplitude $u_{nv\_mag}(t)$ by an exponential function in a first interval $T_1$ which is at least a part of an interval in which a vibration component included in the natural vibration $u_{nv\_31p}(t)$ attenuates. The first interval $T_1$ is an interval from a time point $t_{e0}$ to a time point $t_{e1}$, and the start time point $t_{e0}$ of the first interval $T_1$ is a time point after the exit time point $t_o$. For example, the measurement device 1 may calculate an exit time point $t_{out}$ of the rearmost axle of the railway vehicle 6 from the superstructure 7 according to Equation (66), and may set a range of the time point t satisfying Equation (67) as the first interval $T_1$. Since the exit time point $t_{out}$ is equal to the exit time point $t_o$ according to a relation between Equation (7), Equation (12), and Equation (66), the start time point $t_{e0}$ of the first interval $T_1$ satisfying Equation (67) is after the exit time point $t_o$.

$$t_{out} = t_i + \frac{L_B}{v_\alpha} + \frac{D_{wa}(a_w(C_T, a_T(C_T)))}{v_a} \quad (66)$$

$$t_{out} < t_{e0} \le t \le t_{e1} \quad (67)$$

Figure 28:
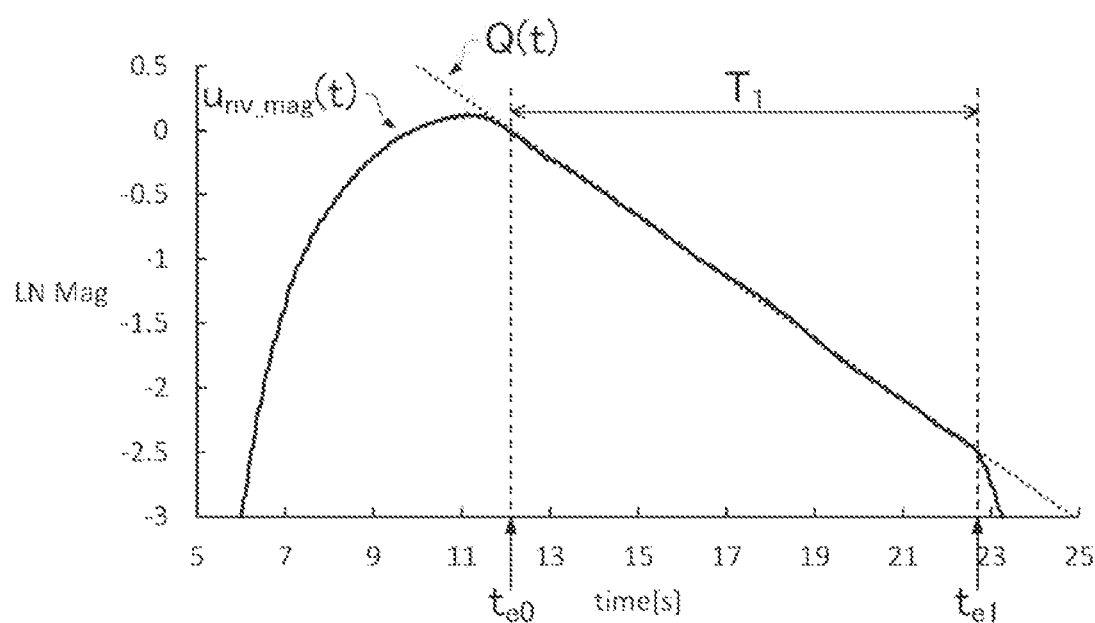
FIG. 28 is a diagram showing an example of a logarithm y(t) of the envelope amplitude $u_{nv\_mag}(t)$ and a first interval $T_1$.

The start time point $t_{e0}$ and the end time point $t_{e1}$ of the first interval $T_1$ are selected, for example, within a range in which a logarithm y(t) of the envelope amplitude $u_{nv\_mag}(t)$ represented by Equation (68) is approximately a straight line. FIG. 28 shows an example of the logarithm y(t) of the envelope amplitude $u_{nv\_mag}(t)$ and the first interval $T_1$.

$$y(t) = \ln\{u_{nv\_mag}(t)\} \quad (68)$$

As shown in FIG. 28, after the railway vehicle 6 passes, the logarithm y(t) in the first interval $T_1$ in which the vibration of the superstructure 7 attenuates is substantially a straight line. The logarithm y(t) in the first interval $T_1$ is approximated by a linear function Q(t) represented by Equation (69).

$$Q(t) = q_1 t + q_0 \quad (69)$$

The measurement device 1 calculates, using a least-squares method, a first-order coefficient $q_1$ and a zero-order coefficient $q_0$ at which an error e(t) represented by Equation (70), that is, a difference between the logarithm y(t) and the linear function Q(t) of Equation (69) is minimized.

$$e(t) = y(t) - (q_1 t + q_0) \quad (70)$$

The first-order coefficient $q_1$ and the zero-order coefficient $q_0$ are calculated according to Equation (71) and Equation (72), respectively. Here, it is assumed that a data interval corresponding to the approximate time interval is set as $t_{e0} \le t \le t_{e1}$.

$$q_1 = \left\{\sum_{t=t_{e0}}^{t_{e1}} 1 \sum_{t=t_{e0}}^{t_{e1}} y(t)t - \sum_{t=t_{e0}}^{t_{e1}} t \sum_{t=t_{e0}}^{t_{e1}} y(t)\right\} \bigg/ \left\{\sum_{t=y_{e0}}^{t_{e1}} 1 \sum_{t=t_{e0}}^{t_{e1}} t^2 - \sum_{t=t_{e0}}^{t_{e1}} t \sum_{t=t_{e0}}^{t_{e1}} t\right\} \quad (71)$$

$$q_0 = \left\{\sum_{t=t_{e0}}^{t_{e1}} y(t) - q_1 \sum_{t=t_{e0}}^{t_{e1}} t\right\} \bigg/ \sum_{t=t_{e0}}^{t_{e1}} 1 \quad (72)$$

Assuming that an exponential function that approximates the envelope amplitude $u_{nv\_mag}(t)$ in the first interval $T_1$ is an attenuation vibration curve $u_{env\_b}(t)$, the attenuation vibration curve $u_{env\_b}(t)$ is calculated according to Equation (73) using the first-order coefficient $q_1$ and the zero-order coefficient $q_0$.

$$u_{env\_b}(t) = e^{q_1 t + q_0} \quad (73)$$

On the other hand, based on an equation of motion, attenuation vibration $u_b(t)$ is expressed by Equation (74). In Equation (74), $\zeta$ is an attenuation rate, and $\omega$ is a natural frequency.

$$u_b(t) = \frac{1}{\omega\sqrt{1-\zeta^2}} e^{-\zeta\omega t} \sin\left(\omega\sqrt{1-\zeta^2}\, t\right) \quad (74)$$

By making an envelope part of the attenuation vibration $u_b(t)$ correspond to the attenuation vibration curve $u_{env\_b}(t)$, Equation (75) is obtained.

$$\frac{1}{\omega\sqrt{1-\zeta^2}} e^{-\zeta\omega t} = e^{q_1 t + q_0} \quad (75)$$

Based on Equation (75), the attenuation rate $\zeta$ is calculated according to Equation (76).

$$\zeta = -\frac{q_1}{\omega} = -\frac{q_1}{2\pi F_f} \quad (76)$$

By making a value at the start of the envelope part of the attenuation vibration $u_b(t)$ correspond to an amplitude of the attenuation vibration curve $u_{env\_b}(t)$ at the start time point $t_{e0}$ of the first interval $T_1$, Equation (77) and Equation (78) are obtained.

$$\frac{1}{\omega\sqrt{1-\zeta^2}} = e^{q_1 t_{e0} + q_0} \quad (77)$$

$$\omega\sqrt{1-\zeta^2} = \sqrt{\omega^2 - q_1^2} \approx \omega_M \quad (78)$$

Figure 29:
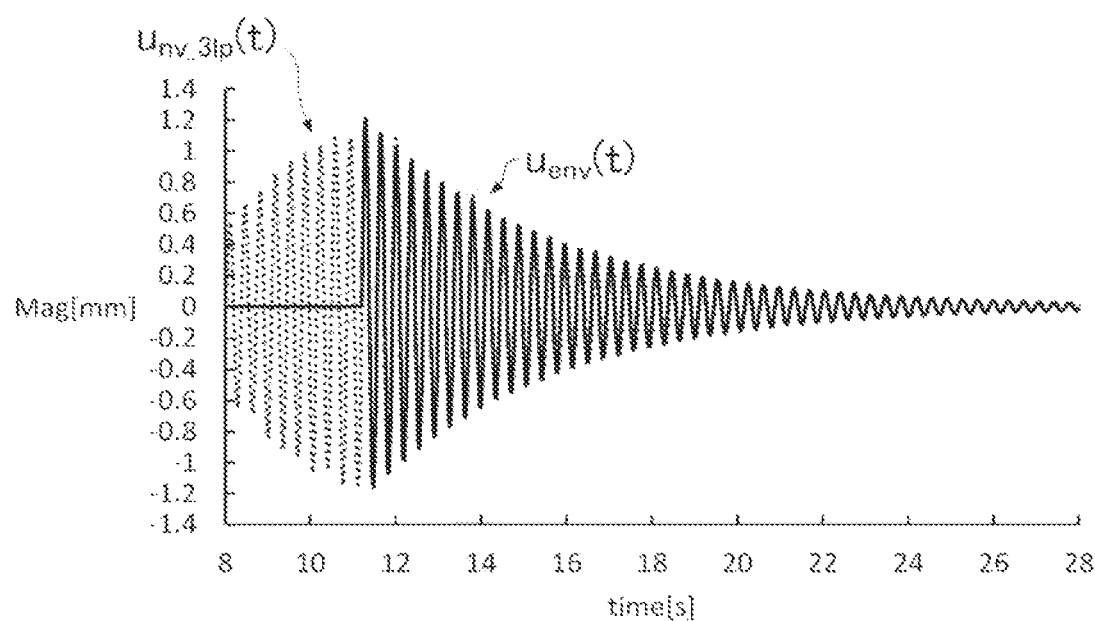
FIG. 29 is a diagram showing attenuation vibration $u_{env}(t)$ and the natural vibration $u_{nv\_31p}(t)$ in an overlapping manner.

Attenuation vibration $u_{env}(t)$ is expressed by Equation (79). FIG. 29 shows the attenuation vibration $u_{env}(t)$ and the natural vibration $u_{nv\_31p}(t)$, which is the second dynamic response, in an overlapping manner. As shown in FIG. 29, the attenuation vibration $u_{env}(t)$ and the natural vibration $u_{nv\_31p}(t)$ are accurately approximated.

$$u_{env}(t) = \begin{cases} t < t_{e0} & 0 \\ t \ge t_{e0} & e^{q_1 t_{e0} + q_0} e^{-\zeta\omega(t-t_{e0})} \sin(\omega_M(t-t_{e0})) \end{cases} \quad (79)$$

3. Procedure of Measurement Method

Figure 30:
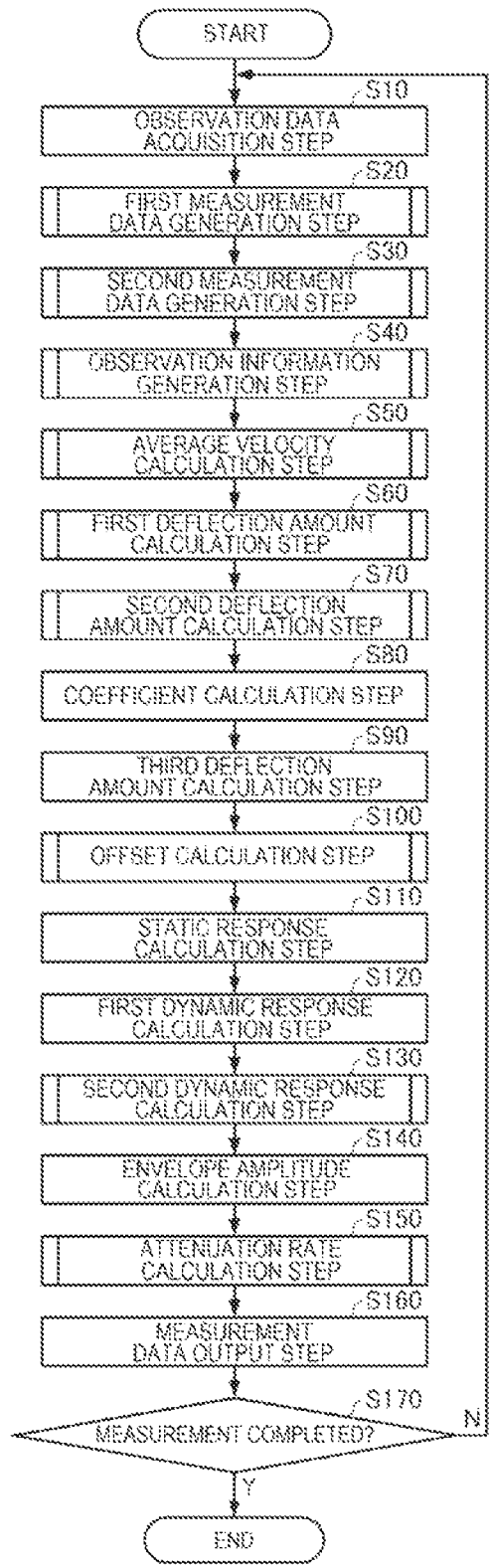
FIG. 30 is a flowchart showing an example of a procedure of a measurement method according to an embodiment.

FIG. 30 is a flowchart showing an example of a procedure of the measurement method according to the present embodiment. In the present embodiment, the measurement device 1 executes the procedure shown in FIG. 30.

As shown in FIG. 30, first, in an observation data acquisition step S10, the measurement device 1 acquires acceleration data a(k) which is observation data output from the sensor 2 which is an observation device.

Next, in a first measurement data generation step S20, the measurement device 1 generates, based on the acceleration data a(k) which is the observation data acquired in step S10, the measurement data u(t) which is first measurement data based on the acceleration as the physical quantity, which is the response to the actions of the plurality of axles of the railway vehicle 6 moving on the superstructure 7 on the observation point R. An example of a procedure of the first measurement data generation step S20 will be described later.

Next, in a second measurement data generation step S30, the measurement device 1 generates the measurement data $u_{lp}(t)$, which is second measurement data in which a vibration component is reduced by the measurement device 1 performing filter processing on the measurement data u(t) generated in step S20. For example, the measurement device 1 performs, as the filter processing, low-pass filter processing for attenuating the vibration component having a frequency equal to or higher than the fundamental frequency $F_f$ of the measurement data u(t). An example of a procedure of the second measurement data generation step S30 will be described later.

Next, in an observation information generation step S40, the measurement device 1 generates the observation information including the entry time point $t_i$ and the exit time point $t_o$ of the railway vehicle 6 with respect to the superstructure 7. The entry time point $t_i$ is the time point at which the leading axle of the plurality of axles of the railway vehicle 6 passes through the entry end of the superstructure 7, and the exit time point $t_o$ is the time point at which the rearmost axle of the plurality of axles of the railway vehicle 6 passes through the exit end of the superstructure 7. In the present embodiment, the measurement device 1 calculates the entry time point $t_i$ and the exit time point $t_o$ based on the measurement data $u_{lp}(t)$ generated in step S30. Further, the measurement device 1 generates the number of vehicles $C_T$. An example of a procedure of the observation information generation step S40 will be described later.

Next, in an average velocity calculation step S50, the measurement device 1 calculates the average velocity $v_a$ of the railway vehicle 6 based on the observation information generated in step S40 and the environment information which is created in advance and includes the dimension of the railway vehicle 6 and the dimension of the superstructure 7. The environment information includes the length $L_B$ of the superstructure 7, the position $L_x$ of the observation point R, the length $L_C(C_m)$ of each vehicle of the railway vehicle 6, the number of axles $a_T(C_m)$ of each vehicle, and the distance $La(a_w(C_m,n))$ between the axles corresponding to the position of each of the plurality of axles of the railway vehicle 6. An example of a procedure of the average velocity calculation step S50 will be described later.

Next, in a first deflection amount calculation step S60, the measurement device 1 calculates the deflection amount $T_{std}(t)$, which is a first deflection amount of the superstructure 7 caused by the railway vehicle 6, based on the approximate equation of the deflection of the superstructure 7, which is Equation (35), the observation information generated in step S40, the environment information, and the average velocity $v_a$ of the railway vehicle 6 calculated in step S50. Specifically, the measurement device 1 calculates the deflection amount $w_{std}(a_w(C_m,n),t)$ of the superstructure 7 caused by each of the plurality of axles based on the approximate equation of the deflection of the superstructure 7, the observation information, the environment information, and the average velocity $v_a$, and calculates the deflection amount $T_{std}(t)$ by adding the deflection amount $w_{std}(a_w(C_m,n),t)$ of the superstructure 7 caused by each of the plurality of axles. An example of a procedure of the first deflection amount calculation step S60 will be described later.

Next, in a second deflection amount calculation step S70, the measurement device 1 calculates the deflection amount $T_{std\_lp}(t)$, which is a second deflection amount in which a vibration component is reduced by the measurement device 1 performing filter processing on the deflection amount $T_{std}(t)$ calculated in step S60. For example, the measurement device 1 performs, as the filter processing, low-pass filter processing for attenuating the vibration component having a frequency equal to or higher than the fundamental frequency $F_M$ of the deflection amount $T_{std}(t)$. An example of a procedure of the second deflection amount calculation step S70 will be described later.

Next, in a coefficient calculation step S80, the measurement device 1 approximates the measurement data $u_{lp}(t)$ generated in step S30 with the linear function of the deflection amount $T_{std\_lp}(t)$ calculated in step S70, and calculates the first-order coefficient $c_1$ and the zero-order coefficient $c_0$ of the linear function. Specifically, the measurement device 1 approximates the measurement data $u_{lp}(t)$ with the linear function of the deflection amount $T_{std\_lp}(t)$ as in Equation (47), and calculates the first-order coefficient $c_1$ and the zero-order coefficient $c_0$ according to Equation (49) and Equation (50) using the least-squares method.

Next, in a third deflection amount calculation step S90, the measurement device 1 calculates the deflection amount $T_{Estd\_lp}(t)$, which is a third deflection amount, based on the first-order coefficient $c_1$ and the zero-order coefficient $c_0$ calculated in step S80 and the deflection amount $T_{std\_lp}(t)$ calculated in step S70. Specifically, the measurement device 1 calculates the deflection amount $T_{Estd\_lp}(t)$, which is a product $c_1 T_{std\_lp}(t)$ of the first-order coefficient $c_1$ and the deflection amount $T_{std\_lp}(t)$ in the interval before the entry time point $t_i$ and the interval after the exit time point $t_o$, and is a sum of the product $c_1 T_{std\_lp}(t)$ and the zero-order coefficient $c_0$ in an interval from the entry time point $t_i$ to the exit time point $t_o$, as in Equation (51).

Next, in an offset calculation step S100, the measurement device 1 calculates the offset $T_{offset\_std}(t)$ based on the zero-order coefficient $c_0$ calculated in step S80, the deflection amount $T_{std\_lp}(t)$ calculated in step S70, and the deflection amount $T_{Estd\_lp}(t)$ calculated in step S90. An example of a procedure of the offset calculation step S100 will be described later.

Next, in a static response calculation step S110, the measurement device 1 calculates the deflection amount $T_{EOstd}(t)$ as the static response by adding the product $c_1 T_{std}(t)$ of the first-order coefficient $c_1$ calculated in step S80 and the deflection amount $T_{std}(t)$ calculated in step S60 and the offset $T_{offset\_std}(t)$ calculated in step S100, as in Equation (56).

Next, in a first dynamic response calculation step S120, the measurement device 1 calculates, as in Equation (57), the natural vibration $u_{nv}(t)$ as the first dynamic response by subtracting the deflection amount $T_{EOstd}(t)$ as the first static response calculated in step S110 from the measurement data u(t) generated in step S20.

Next, in a second dynamic response calculation step S130, the measurement device 1 calculates the natural vibration $u_{nv\_31p}(t)$ as the second dynamic response by performing filter processing for attenuating an unnecessary signal from the natural vibration $u_{nv}(t)$ which is the first dynamic response calculated in step S120. The filter processing may include low-pass filter processing for attenuating a harmonic component of a vibration component having the fundamental frequency $F_N$ included in the natural vibration $u_{nv}(t)$ and correcting a gain at the fundamental frequency $F_N$. Further, the filter processing may include high-pass filter processing for attenuating a signal component having a frequency lower than the fundamental frequency $F_N$. An example of a procedure of the second dynamic response calculation step S130 will be described later.

Next, in an envelope amplitude calculation step S140, the measurement device 1 calculates the envelope amplitude $u_{nv\_mag}(t)$ of the natural vibration $u_{nv\_31p}(t)$ which is the second dynamic response calculated in step S130. Specifically, the measurement device 1 calculates, as in Equation (64), the envelope amplitude $u_{nv\_mag}(t)$ by performing low-pass filter processing on the absolute value of the natural vibration $u_{nv\_31p}(t)$ and multiplying the result by $\pi/2$.

Next, in an attenuation rate calculation step S150, the measurement device 1 calculates the attenuation rate $\zeta$ of the vibration component included in the natural vibration $u_{nv\_31p}(t)$, which is the second dynamic response, based on the envelope amplitude $u_{nv\_mag}(t)$ calculated in step S140. An example of a procedure of the attenuation rate calculation step S150 will be described later.

Next, in a measurement data output step S160, the measurement device 1 outputs the measurement data including the attenuation rate $\zeta$ calculated in step S150 to the monitoring device 3. Specifically, the measurement device 1 transmits the measurement data to the monitoring device 3 via the communication network 4. The measurement data may include the measurement data $u(t)$ and $u_{lp}(t)$, the deflection amounts $T_{std}(t)$, $T_{std\_lp}(t)$, $T_{Estd\_lp}(t)$, and $T_{EOstd}(t)$, the natural vibrations $u_{nv}(t)$ and $u_{nv\_31p}(t)$, the envelope amplitude $u_{nv\_mag}(t)$, and the like, in addition to the attenuation rate $\zeta$.

Then, the measurement device 1 repeats the processing of steps S10 to S160 until the measurement is completed in step S170.

Figure 31:
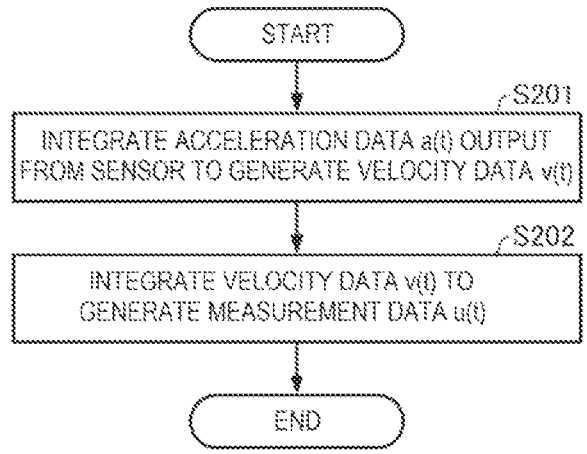
FIG. 31 is a flowchart showing an example of a procedure of a first measurement data generation step.

FIG. 31 is a flowchart showing an example of the procedure of the first measurement data generation step S20 of FIG. 30.

As shown in FIG. 31, in step S201, the measurement device 1 integrates the acceleration data $a(t)$ output from the sensor 2 to generate the velocity data $v(t)$ as in Equation (1).

Then, in step S202, the measurement device 1 integrates the velocity data $v(t)$ generated in step S201 to generate the measurement data $u(t)$, as in Equation (2).

As described above, in the present embodiment, the measurement data $u(t)$ is data of the displacement of the superstructure 7 caused by the railway vehicle 6 which is a moving object moving on the superstructure 7 which is a structure, and is data obtained by integrating twice the acceleration in the direction intersecting the surface of the superstructure 7 on which the railway vehicle 6 moves. Therefore, the measurement data $u(t)$ includes data having a waveform projecting in a positive direction or a negative direction, specifically, a rectangular waveform, a trapezoidal waveform, or a sine half-wave waveform. The rectangular waveform includes not only an accurate rectangular waveform but also a waveform approximate to the rectangular waveform. Similarly, the trapezoidal waveform includes not only an accurate trapezoidal waveform but also a waveform approximate to the trapezoidal waveform. Similarly, the sine half-wave waveform includes not only an accurate sine half-wave waveform but also a waveform approximate to the sine half-wave waveform.

Figure 32:
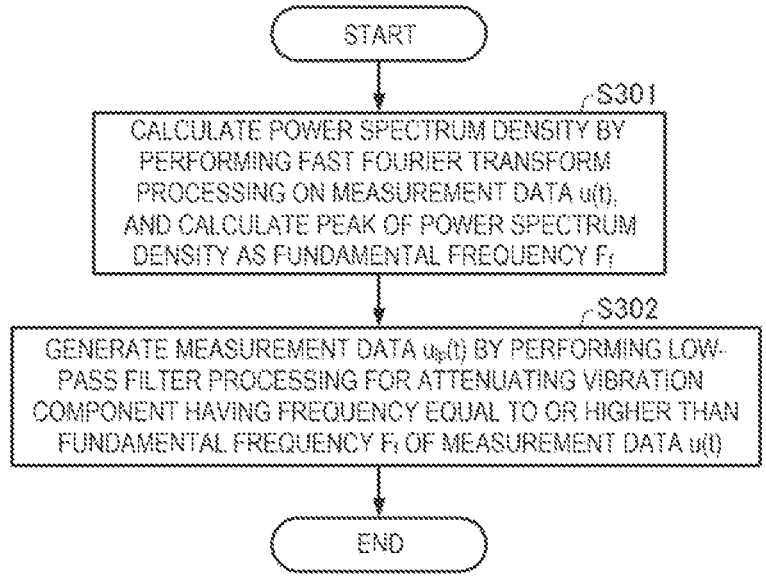
FIG. 32 is a flowchart showing an example of a procedure of a second measurement data generation step.

FIG. 32 is a flowchart showing an example of the procedure of the second measurement data generation step S30 of FIG. 30.

As shown in FIG. 32, in step S301, the measurement device 1 calculates the power spectrum density by performing fast Fourier transform processing on the measurement data $u(t)$ calculated in step S202 of FIG. 31, and calculates the peak of the power spectrum density as the fundamental frequency $F_f$.

Then, in step S302, the measurement device 1 generates the measurement data $u_{lp}(t)$ by performing low-pass filter processing for attenuating the vibration component having a frequency equal to or higher than the fundamental frequency $F_f$ of the measurement data $u(t)$. The measurement device 1 may generate the measurement data $u_{lp}(t)$ by performing, as the low-pass filter processing, moving average processing on the measurement data $u(t)$ in the basic cycle $T_f$ corresponding to the fundamental frequency $F_f$, as in Equation (5). Alternatively, the measurement device 1 may generate the measurement data $u_{lp}(t)$ by performing, as the low-pass filter processing, FIR filter processing for attenuating the signal component having a frequency equal to or higher than the fundamental frequency $F_f$ on the measurement data $u(t)$.

Figure 33:
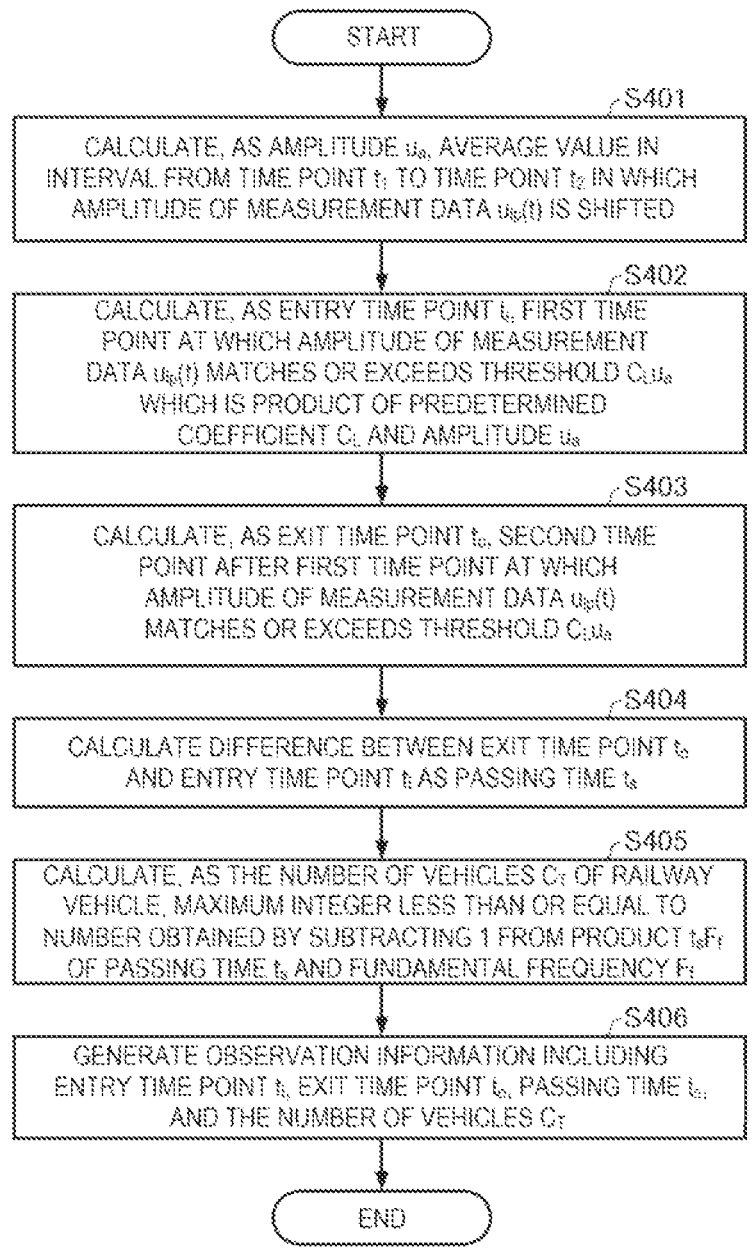
FIG. 33 is a flowchart showing an example of a procedure of an observation information generation step.

FIG. 33 is a flowchart showing an example of the procedure of the observation information generation step S40 of FIG. 30.

As shown in FIG. 33, first, in step S401, the measurement device 1 calculates, as the amplitude $u_a$, the average value in the interval from a time point $t_1$ to a time point $t_2$ in which the amplitude of the measurement data $u_{lp}(t)$ generated in step S302 of FIG. 32 is shifted, according to Equation (6).

Then, in step S402, the measurement device 1 calculates, as the entry time point $t_i$, a first time point at which the amplitude of the measurement data $u_{lp}(t)$ matches or exceeds the threshold $C_L u_a$ which is the product of the predetermined coefficient $C_L$ and the amplitude $u_a$ calculated in step S401.

In step S403, the measurement device 1 calculates, as the exit time point $t_o$, a second time point after the first time point at which the amplitude of the measurement data $u_{lp}(t)$ matches or exceeds the threshold $C_L u_a$.

In step S404, the measurement device 1 calculates the difference between the exit time point $t_o$ and the entry time point $t_i$ as the passing time $t_s$ as in Equation (7).

Then, in step S405, the measurement device 1 calculates, as the number of vehicles $C_T$ of the railway vehicle 6, the maximum integer less than or equal to the number obtained by subtracting 1 from the product $t_s F_f$ of the passing time $t_s$ calculated in step S404 and the fundamental frequency $F_f$ calculated in step S301 of FIG. 32, as in Equation (8).

Then, in step S406, the measurement device 1 generates the observation information including the entry time point $t_i$ calculated in step S402, the exit time point $t_o$ calculated in step S403, the passing time $t_s$ calculated in step S404, and the number of vehicles CT calculated in step S405.

Figure 34:
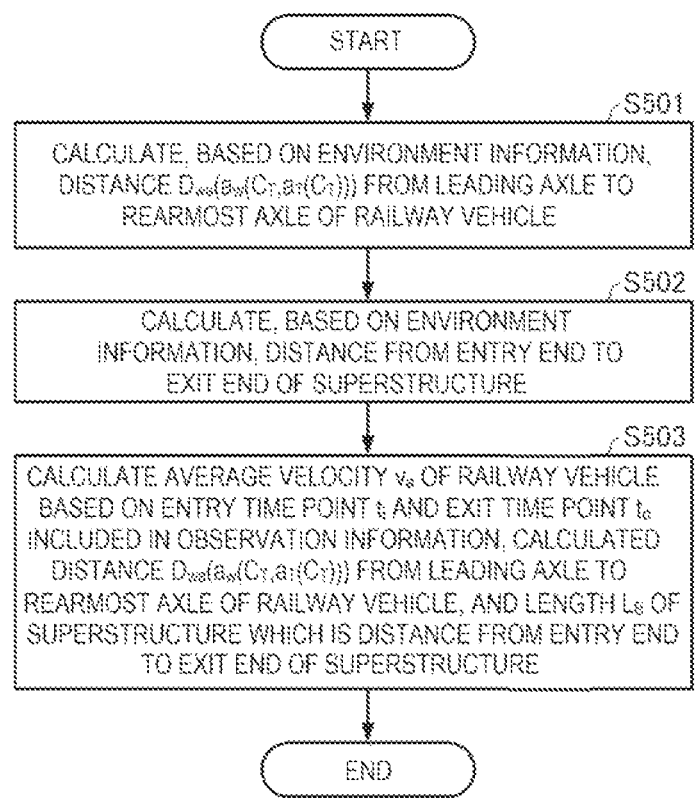
FIG. 34 is a flowchart showing an example of a procedure of an average velocity calculation step.

FIG. 34 is a flowchart showing an example of the procedure of the average velocity calculation step S50 of FIG. 30.

In step S501, the measurement device 1 calculates, based on the environment information, the distance $D_{wa}(a_w(C_T, a_T(C_T)))$ from the leading axle to the rearmost axle of the railway vehicle 6 according to Equation (11).

In step S502, the measurement device 1 calculates, based on the environment information, the distance from the entry end to the exit end of the superstructure 7. In the present embodiment, the distance from the entry end to the exit end of the superstructure 7 is the length $L_B$ of the superstructure 7 included in the environment information.

Then, in step S503, the measurement device 1 calculates the average velocity $v_a$ of the railway vehicle 6 according to Equation (12) based on the entry time point $t_i$ and the exit time point $t_o$ included in the observation information generated in step S406 of FIG. 33, the distance $D_{wa}(a_w(C_T, a_T(C_T)))$ from the leading axle to the rearmost axle of the railway vehicle 6 calculated in step S501, and the length $L_B$ of the superstructure 7 which is the distance from the entry end to the exit end of the superstructure 7 calculated in step S502.

Figure 35:
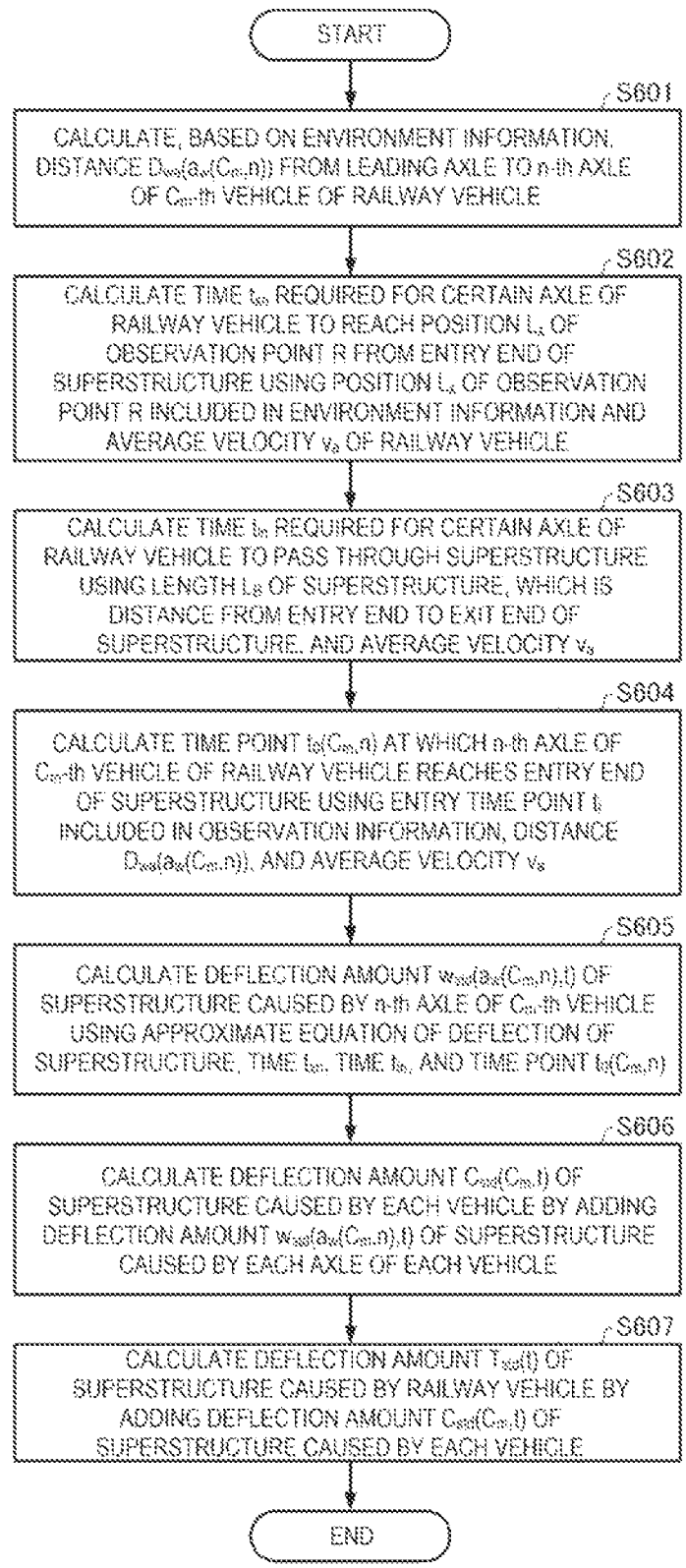
FIG. 35 is a flowchart showing an example of a procedure of a first deflection amount calculation step.

FIG. 35 is a flowchart showing an example of the procedure of the first deflection amount calculation step S60 of FIG. 30.

First, in step S601, the measurement device 1 calculates, based on the environment information, each distance $D_{wa}$ ($a_w(C_m,n)$) from the leading axle to the n-th axle of the $C_m$-th vehicle of the railway vehicle 6, according to Equation (10).

Next, in step S602, the measurement device 1 calculates, according to Equation (37), the time $t_{xn}$ required for a certain axle of the railway vehicle 6 to reach the position $L_x$ of the observation point R from the entry end of the superstructure 7 using the position $L_x$ of the observation point R included in the environment information and the average velocity $v_a$ calculated in step S503 of FIG. 34.

In step S603, the measurement device 1 calculates, according to Equation (38), the time $t_{ln}$ required for a certain axle of the railway vehicle 6 to pass through the superstructure 7 using the length $L_B$ of the superstructure 7, which is the distance from the entry end to the exit end of the superstructure 7 calculated in step S502 of FIG. 34, and the average velocity $v_a$.

In step S604, the measurement device 1 calculates, according to Equation (39), the time point $t_0(C_m,n)$ at which the n-th axle of the $C_m$-th vehicle of the railway vehicle 6 reaches the entry end of the superstructure 7 using the entry time point $t_i$ included in the observation information generated in step S406 of FIG. 33, the distance $D_{wa}(a_w(C_m,n))$ calculated in step S601, and the average velocity $v_a$.

Next, in step S605, the measurement device 1 calculates the deflection amount $w_{std}(a_w(C_m,n),t)$ of the superstructure 7 caused by the n-th axle of the $C_m$-th vehicle using the approximate equation of the deflection of the superstructure 7, which is Equation (35), the time $t_{xn}$ calculated in step S602, the time $t_{ln}$ calculated in step S603, and the time point $t_0(C_m,n)$ calculated in step S604, according to Equation (40).

Next, in step S606, the measurement device 1 calculates, according to Equation (42), the deflection amount $C_{std}(C_m,t)$ of the superstructure 7 caused by each vehicle by adding the deflection amount $w_{std}(a_w(C_m,n),t)$ of the superstructure 7 caused by each axle of each vehicle calculated in step S605.

Then, in step S607, the measurement device 1 calculates, according to Equation (43), the deflection amount $T_{std}(t)$ of the superstructure 7 caused by the railway vehicle 6 by adding the deflection amount $C_{std}(C_m, t)$ of the superstructure 7 caused by each vehicle, which is calculated in step S606.

Figure 36:
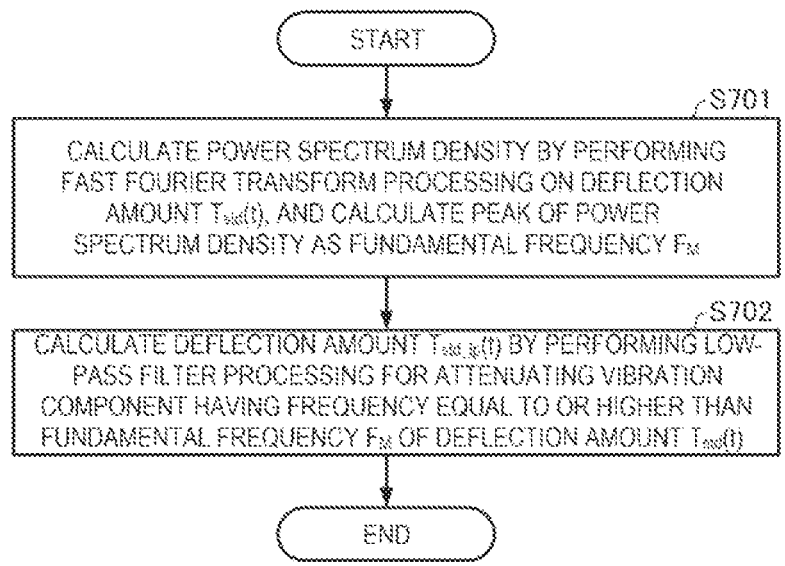
FIG. 36 is a flowchart showing an example of a procedure of a second deflection amount calculation step.

FIG. 36 is a flowchart showing an example of the procedure of the second deflection amount calculation step S70 of FIG. 30.

As shown in FIG. 36, in step S701, the measurement device 1 calculates the power spectrum density by performing fast Fourier transform processing on the deflection amount $T_{std}(t)$ calculated in step S607 of FIG. 35, and calculates the peak of the power spectrum density as the fundamental frequency $F_M$.

Then, in step S702, the measurement device 1 calculates the deflection amount $T_{std\_lp}(t)$ by performing low-pass filter processing for attenuating the vibration component having a frequency equal to or higher than the fundamental frequency $F_M$ of the deflection amount $T_{std}(t)$. The measurement device 1 may calculate the deflection amount $T_{std\_lp}(t)$ by performing, as the low-pass filter processing, moving average processing on the deflection amount $T_{std}(t)$ in the basic cycle $T_M$ corresponding to the fundamental frequency $F_M$, according to Equation (46). Alternatively, the measurement device 1 may calculate the deflection amount $T_{std\_lp}(t)$ by performing, as the low-pass filter processing, FIR filter processing for attenuating the signal component having a frequency equal to or higher than the fundamental frequency $F_M$ on the deflection amount $T_{std}(t)$.

Figure 37:
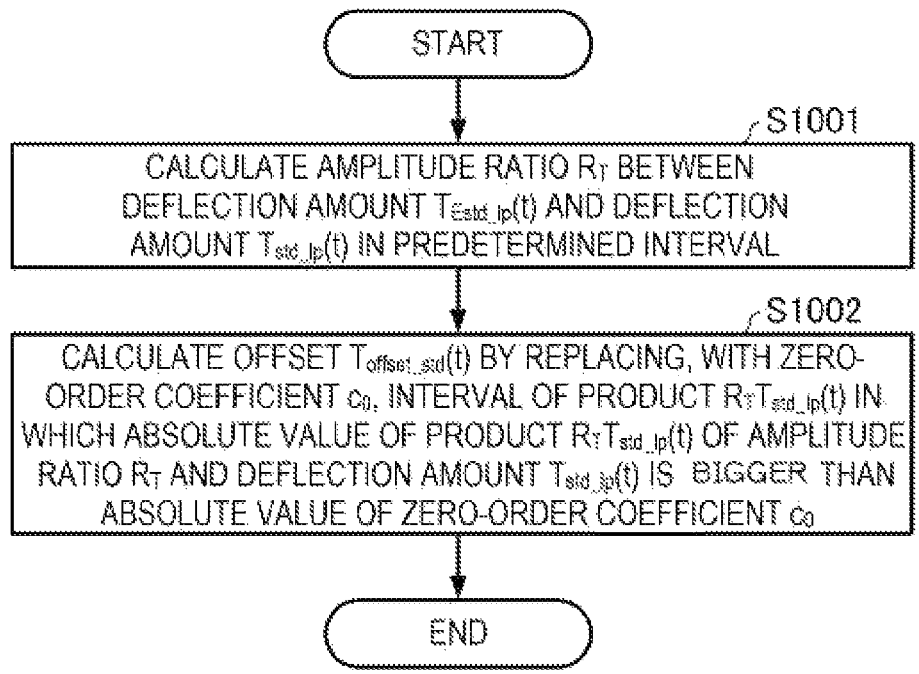
FIG. 37 is a flowchart showing an example of a procedure of an offset calculation step.

FIG. 37 is a flowchart showing an example of the procedure of the offset calculation step S100 of FIG. 30.

As shown in FIG. 37, in step S1001, the measurement device 1 calculates, according to Equation (54), the amplitude ratio $R_T$ in a predetermined interval between the deflection amount $T_{Estd\_lp}(t)$ calculated in step S90 of FIG. 30 and the deflection amount $T_{std\_lp}(t)$ calculated in step S702 of FIG. 36.

Then, in step S1002, the measurement device 1 calculates, as in Equation (55), the offset $T_{offset\_std}(t)$ by replacing, with the zero-order coefficient $c_0$, the interval of the product $R_T T_{std\_lp}(t)$ in which the absolute value of the product $R_T T_{std\_lp}(t)$ of the amplitude ratio $R_T$ calculated in step S1001 and the deflection amount $T_{std\_lp}(t)$ is bigger than the absolute value of the zero-order coefficient $c_0$ calculated in step S80 of FIG. 30.

Figure 38:
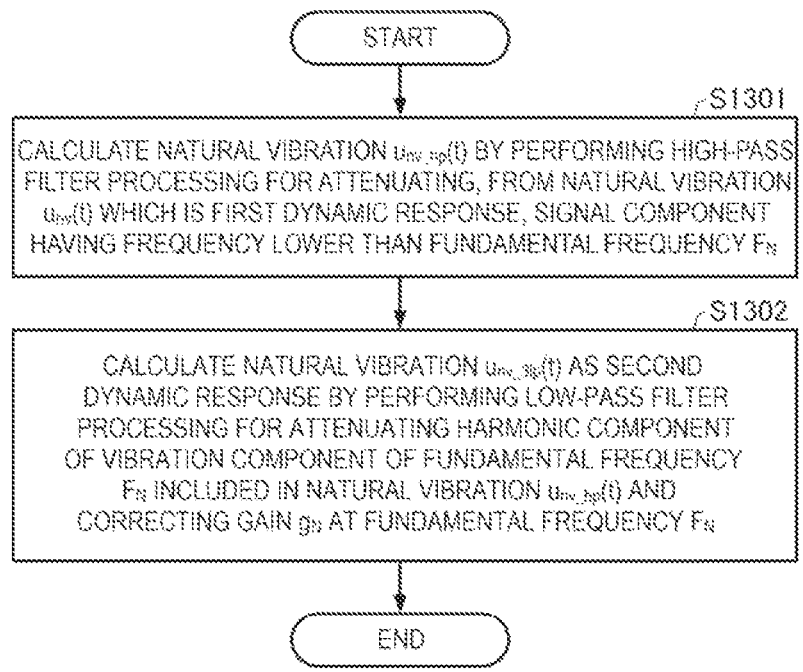
FIG. 38 is a flowchart showing an example of a procedure of a second dynamic response calculation step.

FIG. 38 is a flowchart showing an example of the procedure of the second dynamic response calculation step S130 of FIG. 30.

As shown in FIG. 38, in step S1301, the measurement device 1 calculates the natural vibration $u_{nv\_hp}(t)$ according to Equation (60) by performing high-pass filter processing for subtracting, from the natural vibration $u_{nv}(t)$ calculated in step S120 of FIG. 30, a low-frequency signal component in which the vibration component is reduced by performing moving average processing on the natural vibration $u_{nv}(t)$ in the basic cycle TN.

Further, in step S1302, the measurement device 1 calculates, according to Equation (63), the natural vibration $u_{nv\_31p}(t)$ as the second dynamic response by performing the low-pass filter processing for attenuating the harmonic component having the vibration component of the fundamental frequency FN included in the natural vibration $u_{nv\_hp}(t)$ calculated in step S1301 and correcting the gain at the fundamental frequency $F_N$.

Figure 39:
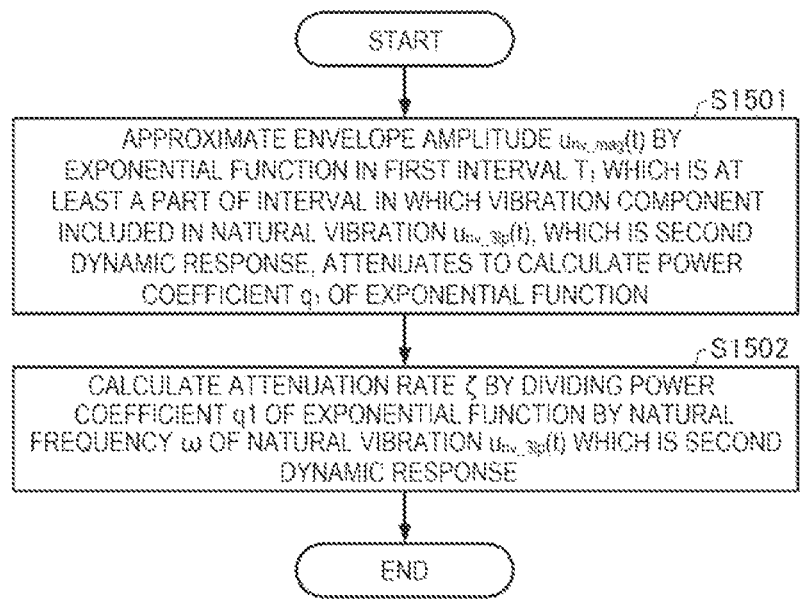
FIG. 39 is a flowchart showing an example of a procedure of an attenuation rate calculation step.

FIG. 39 is a flowchart showing an example of the procedure of the attenuation rate calculation step S150 of FIG. 30.

As shown in FIG. 39, in step S1501, the measurement device 1 approximates the envelope amplitude $u_{nv\_mag}(t)$ calculated in step S140 of FIG. 30 by an exponential function in the first interval $T_1$ which is at least a part of an interval in which the vibration component included in the natural vibration $u_{nv\_31p}(t)$, which is the second dynamic response calculated in step S1302 of FIG. 38, attenuates to calculate a power coefficient $q_1$ of the exponential function. The start time point $t_{e0}$ of the first interval $T_1$ is after the exit time point $t_o$. For example, the measurement device 1 approximates the logarithm y(t) of the envelope amplitude $u_{nv\_mag}(t)$ in the first interval $T_1$ by the linear function Q(t) as in Equation (69), and calculates the power coefficient $q_1$ according to Equation (71).

Then, in step S1502, the measurement device 1 calculates, as in Equation (76), the attenuation rate $\zeta$ by dividing the power coefficient $q_1$ calculated in step S1501 by the natural frequency $\omega=2\pi F_N$ of the natural vibration $u_{nv\_31p}(t)$ which is the second dynamic response.

4. Configuration of Observation Device, Measurement Device, and Monitoring Device FIG. 40 is a diagram showing a configuration example of the sensor 2 which is the observation device, the measurement device 1, and the monitoring device 3.

Figure 40:
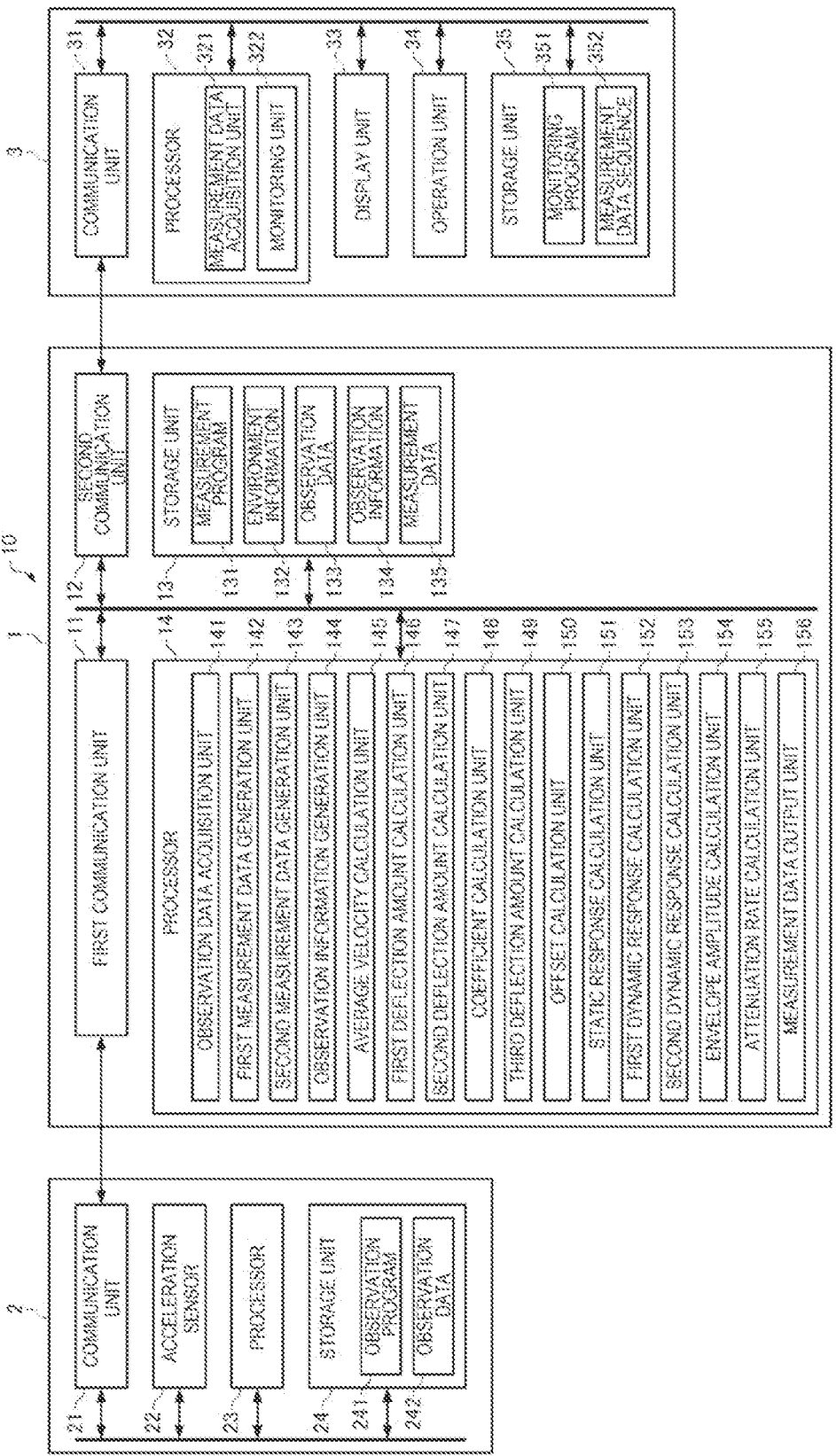
FIG. 40 is a diagram showing a configuration example of a sensor, a measurement device, and a monitoring device.

As shown in FIG. 40, the sensor 2 includes a communication unit 21, an acceleration sensor 22, a processor 23, and a storage unit 24.

The storage unit 24 is a memory that stores various programs, data, and the like for the processor 23 to perform calculation processing and control processing. Further, the storage unit 24 stores programs, data, and the like for the processor 23 to implement predetermined application functions.

The acceleration sensor 22 detects an acceleration generated in each axial direction of the three axes.

The processor 23 controls the acceleration sensor 22 by executing an observation program 241 stored in the storage unit 24, generates observation data 242 based on the acceleration detected by the acceleration sensor 22, and stores the generated observation data 242 in the storage unit 24. In the present embodiment, the observation data 242 is the acceleration data a(k).

The communication unit 21 transmits the observation data 242 stored in the storage unit 24 to the measurement device 1 under the control of the processor 23.

As shown in FIG. 40, the measurement device 1 includes a first communication unit 11, a second communication unit 12, a storage unit 13, and a processor 14.

The first communication unit 11 receives the observation data 242 from the sensor 2, and outputs the received observation data 242 to the processor 14. As described above, the observation data 242 is the acceleration data a(k).

The storage unit 13 is a memory that stores programs, data, and the like for the processor 14 to perform calculation processing and control processing. The storage unit 13 stores programs, data, and the like for the processor 14 to implement predetermined application functions. The processor 14 may receive various programs, data, and the like via the communication network 4 and store the programs, data, and the like in the storage unit 13.

The processor 14 generates measurement data 135 based on the observation data 242 received by the first communication unit 11 and environment information 132 stored in advance in the storage unit 13, and stores the generated measurement data 135 in the storage unit 13.

In the present embodiment, the processor 14 functions as an observation data acquisition unit 141, a first measurement data generation unit 142, a second measurement data generation unit 143, an observation information generation unit 144, an average velocity calculation unit 145, a first deflection amount calculation unit 146, a second deflection amount calculation unit 147, a coefficient calculation unit 148, a third deflection amount calculation unit 149, an offset calculation unit 150, a static response calculation unit 151, a first dynamic response calculation unit 152, a second dynamic response calculation unit 153, an envelope amplitude calculation unit 154, an attenuation rate calculation unit 155, and a measurement data output unit 156 by executing a measurement program 131 stored in the storage unit 13. That is, the processor 14 includes the observation data acquisition unit 141, the first measurement data generation unit 142, the second measurement data generation unit 143, the observation information generation unit 144, the average velocity calculation unit 145, the first deflection amount calculation unit 146, the second deflection amount calculation unit 147, the coefficient calculation unit 148, the third deflection amount calculation unit 149, the offset calculation unit 150, the static response calculation unit 151, the first dynamic response calculation unit 152, the second dynamic response calculation unit 153, the envelope amplitude calculation unit 154, the attenuation rate calculation unit 155, and the measurement data output unit 156.

The observation data acquisition unit 141 acquires the observation data 242 received by the first communication unit 11, and stores the observation data 242 in the storage unit 13 as observation data 133. That is, the observation data acquisition unit 141 performs the processing of the observation data acquisition step S10 in FIG. 30.

The first measurement data generation unit 142 reads the observation data 133 stored in the storage unit 13, and generates, based on the acceleration data a(t) which is the observation data 133, the measurement data u(t) which is the first measurement data based on the acceleration as the physical quantity, which is the response to the actions of the plurality of axles of the railway vehicle 6 moving on the superstructure 7 on the observation point R. Specifically, the first measurement data generation unit 142 integrates the acceleration data a(t), which is the observation data 133, to generate the velocity data v(t) as in Equation (1), and further integrates the velocity data v(t) to generate the measurement data u(t) as in Equation (2). That is, the first measurement data generation unit 142 performs the processing of the first measurement data generation step S20 in FIG. 30, specifically, the processing of steps S201 and S202 in FIG. 31.

The second measurement data generation unit 143 generates the measurement data $u_{lp}(t)$, which is the second measurement data in which the vibration component is reduced by performing filter processing on the measurement data u(t) generated by the first measurement data generation unit 142. For example, the second measurement data generation unit 143 performs, as the filter processing, low-pass filter processing for attenuating the vibration component having a frequency equal to or higher than the fundamental frequency $F_f$ of the measurement data u(t). Specifically, the second measurement data generation unit 143 calculates the power spectrum density by performing fast Fourier transform processing on the measurement data u(t), calculates the peak of the power spectrum density as the fundamental frequency $F_f$, and generates the measurement data $u_{lp}(t)$ by performing low-pass filter processing for attenuating the vibration component having a frequency equal to or higher than the fundamental frequency $F_f$ of the measurement data u(t). The second measurement data generation unit 143 may generate the measurement data $u_{lp}(t)$ by performing, as the low-pass filter processing, moving average processing on the measurement data u(t) in the basic cycle Tf corresponding to the fundamental frequency $F_f$, as in Equation (5). Alternatively, the second measurement data generation unit 143 may generate the measurement data $u_{lp}(t)$ by performing, as the low-pass filter processing, FIR filter processing for attenuating the signal component having a frequency equal to or higher than the fundamental frequency $F_f$ on the measurement data u(t). That is, the second measurement data generation unit 143 performs the processing of the second measurement data generation step S30 in FIG. 30, specifically, the processing of steps S301 and S302 in FIG. 32.

Based on the measurement data $u_{lp}(t)$ generated by the second measurement data generation unit 143, the observation information generation unit 144 generates observation information 134 including the entry time point $t_i$ and the exit time point $t_o$ of the railway vehicle 6 with respect to the superstructure 7, and stores the observation information 134 in the storage unit 13. Specifically, first, the observation information generation unit 144 calculates, as the amplitude $u_a$, the average value of the interval from the time point $t_1$ to the time point $t_2$ in which the amplitude of the measurement data $u_{lp}(t)$ is shifted, according to Equation (6). Next, the observation information generation unit 144 calculates, as the entry time point $t_i$, the first time point at which the amplitude of the measurement data $u_{lp}(t)$ matches or exceeds the threshold $C_L u_a$ which is the product of the predetermined coefficient $C_L$ and the amplitude $u_a$. The observation information generation unit 144 calculates, as the exit time point $t_o$, the second time point after the first time point at which the amplitude of the measurement data $u_{lp}(t)$ matches or exceeds the threshold $C_L u_a$. The observation information generation unit 144 calculates the difference between the exit time point $t_o$ and the entry time point $t_i$ as the passing time $t_s$ as in Equation (7). Next, the observation information generation unit 144 calculates, as the number of vehicles $C_T$ of the railway vehicle 6, a maximum integer less than or equal to the number obtained by subtracting 1 from the product $t_s F_f$ of the passing time $t_s$ and the fundamental frequency $F_f$, as in Equation (8). Then, the observation information generation unit 144 generates the observation information 134 including the entry time point $t_i$, the exit time point $t_o$, the passing time $t_s$, and the number of vehicles $C_T$. That is, the observation information generation unit 144 performs the processing of the observation information generation step S40 in FIG. 30, specifically, the processing of steps S401 to S406 in FIG. 33.

The average velocity calculation unit 145 calculates the average velocity $v_a$ of the railway vehicle 6 based on the observation information 134 stored in the storage unit 13 and the environment information 132 which is created in advance and stored in the storage unit 13 and includes the dimensions of the railway vehicle 6 and the dimensions of the superstructure 7. Specifically, the average velocity calculation unit 145 calculates, based on the environment information 132, the distance $D_{wa}(a_w(C_T, a_T(C_T)))$ from the leading axle to the rearmost axle of the railway vehicle 6 according to Equation (11). The average velocity calculation unit 145 calculates the length $L_B$ of the superstructure 7, which is the distance from the entry end to the exit end of the superstructure 7, based on the environment information 132. Then, the average velocity calculation unit 145 calculates the average velocity $v_a$ of the railway vehicle 6 according to Equation (12), based on the entry time point $t_i$ and the exit time point $t_o$ included in the observation information 134, the distance $D_{wa}(a_w(C_T, a_T(C_T)))$, and the length $L_B$ of the superstructure 7. That is, the average velocity calculation unit 145 performs the processing of the average velocity calculation step S50 in FIG. 30, specifically, the processing of steps S501, S502, and S503 in FIG. 34.

The first deflection amount calculation unit 146 calculates the deflection amount $T_{std}(t)$, which is the first deflection amount of the superstructure 7 caused by the railway vehicle 6, based on the approximate equation of the deflection of the superstructure 7, which is Equation (35), the observation information 134 stored in the storage unit 13, the environment information 132 stored in the storage unit 13, and the average velocity $v_a$ of the railway vehicle 6 calculated by the average velocity calculation unit 145. Specifically, first, the first deflection amount calculation unit 146 calculates, based on the environment information 132, the distance $D_{wa}(a_w(C_m,n))$ from the leading axle to the n-th axle of the $C_m$-th vehicle of the railway vehicle 6, according to Equation (10). Next, the first deflection amount calculation unit 146 calculates the time $t_{xn}$ required for a certain axle of the railway vehicle 6 to reach the position $L_x$ of the observation point R from the entry end of the superstructure 7 using the position $L_x$ of the observation point R included in the environment information 132 and the average velocity $v_a$, according to Equation (37). The first deflection amount calculation unit 146 calculates the time $t_{ln}$ required for a certain axle of the railway vehicle 6 to pass through the superstructure 7 using the length $L_B$ of the superstructure 7, which is the distance from the entry end to the exit end of the superstructure 7, and the average velocity $v_a$, according to Equation (38). Further, the first deflection amount calculation unit 146 calculates the time point $t_0(C_m,n)$ at which the n-th axle of the $C_m$-th vehicle of the railway vehicle 6 reaches the entry end of the superstructure 7 using the entry time point $t_i$ included in the observation information 134, the distance $D_{wa}(a_w(C_m,n))$, and the average velocity $v_a$, according to Equation (39). Next, the first deflection amount calculation unit 146 calculates the deflection amount $w_{std}(a_w(C_m,n),t)$ of the superstructure 7 caused by the n-th axle of the $C_m$-th vehicle using the approximate equation of the deflection of the superstructure 7, which is Equation (35), the time $t_{xn}$, the time $t_{ln}$, and the time point $t_0(C_m,n)$, according to Equation (40). Next, the first deflection amount calculation unit 146 calculates the deflection amount $C_{std}(C_m,t)$ of the superstructure 7 caused by the $C_m$-th vehicle using the deflection amount $w_{std}(a_w(C_m,n),t)$, according to Equation (42). Then, the first deflection amount calculation unit 146 calculates the deflection amount $T_{std}(t)$ of the superstructure 7 caused by the railway vehicle 6 using the deflection amount $C_{std}(C_m,t)$, according to Equation (43). That is, the first deflection amount calculation unit 146 performs the processing of the first deflection amount calculation step S60 in FIG. 30, specifically, the processing of steps S601 to S607 in FIG. 35.

The second deflection amount calculation unit 147 calculates the deflection amount $T_{std\_lp}(t)$, which is the second deflection amount in which the vibration component is reduced by performing filter processing on the deflection amount $T_{std}(t)$ calculated by the first deflection amount calculation unit 146. For example, the second deflection amount calculation unit 147 performs, as the filter processing, low-pass filter processing for attenuating the vibration component having a frequency equal to or higher than the fundamental frequency $F_M$ of the deflection amount $T_{std}(t)$. Specifically, the second deflection amount calculation unit 147 calculates the deflection amount $T_{std}(t)$ as the fundamental frequency $F_M$ by performing fast Fourier transform processing on the deflection amount $T_{std}(t)$, and calculates the deflection amount $T_{std\_lp}(t)$ by performing low-pass filter processing for attenuating the vibration component having a frequency equal to or higher than the fundamental frequency $F_M$ of the deflection amount $T_{std}(t)$. The second deflection amount calculation unit 147 may calculate the deflection amount $T_{std\_lp}(t)$ by performing, as the low-pass filter processing, moving average processing on the deflection amount $T_{std}(t)$ in the basic cycle $T_M$ corresponding to the fundamental frequency $F_M$, according to Equation (46). Alternatively, the second deflection amount calculation unit 147 may calculate the deflection amount $T_{std\_lp}(t)$ by performing, as the low-pass filter processing, FIR filter processing for attenuating the signal component having a frequency equal to or higher than the fundamental frequency $F_M$ on the deflection amount $T_{std}(t)$. That is, the second deflection amount calculation unit 147 performs the processing of the second deflection amount calculation step S70 in FIG. 30, specifically, the processing of steps S701 and S702 in FIG. 36.

The coefficient calculation unit 148 approximates the measurement data $u_{lp}(t)$ generated by the second measurement data generation unit 143 with the linear function of the deflection amount $T_{std\_lp}(t)$ calculated by the second deflection amount calculation unit 147, and calculates the first-order coefficient $c_1$ and the zero-order coefficient $c_0$ of the linear function. Specifically, the coefficient calculation unit 148 approximates the measurement data $u_{lp}(t)$ with the linear function of the deflection amount $T_{std\_lp}(t)$ as in Equation (47), and calculates the first-order coefficient $c_1$ and the zero-order coefficient $c_0$ according to Equation (49)

and Equation (50) using the least-squares method. That is, the coefficient calculation unit 148 performs the processing of the coefficient calculation step S80 in FIG. 30.

The third deflection amount calculation unit 149 calculates the deflection amount $T_{Estd\_lp}(t)$, which is the third deflection amount, based on the first-order coefficient $c_1$ and the zero-order coefficient $c_0$ calculated by the coefficient calculation unit 148 and the deflection amount $T_{std\_lp}(t)$ calculated by the second deflection amount calculation unit 147. Specifically, the third deflection amount calculation unit 149 calculates the deflection amount $T_{Estd\_lp}(t)$, which is the product $c_1 T_{std\_lp}(t)$ of the first-order coefficient $c_1$ and the deflection amount $T_{std\_lp}(t)$ in the interval before the entry time point $t_i$ and the interval after the exit time point $t_o$, and is the sum of the product $c_1 T_{std\_lp}(t)$ and the zero-order coefficient $c_0$ in the interval from the entry time point $t_i$ to the exit time point $t_o$, as in Equation (51). That is, the third deflection amount calculation unit 149 performs the processing of the third deflection amount calculation step S90 in FIG. 30.

The offset calculation unit 150 calculates the offset $T_{offset\_std}(t)$ based on the zero-order coefficient $c_0$ calculated by the coefficient calculation unit 148, the deflection amount $T_{std\_lp}(t)$ calculated by the second deflection amount calculation unit 147, and the deflection amount $T_{Estd\_lp}(t)$ calculated by the third deflection amount calculation unit 149. Specifically, the offset calculation unit 150 calculates the amplitude ratio $R_T$ between the deflection amount $T_{Estd\_lp}(t)$ and the deflection amount $T_{std\_lp}(t)$ in a predetermined interval, according to Equation (54). Then, the offset calculation unit 150 calculates the offset $T_{offset\_std}(t)$ by replacing, with the zero-order coefficient $c_0$, the interval in which the product $R_T T_{std\_lp}(t)$ the amplitude ratio $R_T$ and the deflection amount $T_{std\_lp}(t)$ is smaller than the zero-order coefficient $c_0$, as in Equation (55). That is, the offset calculation unit 150 performs the processing of the offset calculation step S100 in FIG. 30, specifically, the processing of steps S1001 and S1002 in FIG. 37.

The static response calculation unit 151 calculates the deflection amount $T_{EOstd}(t)$ as the static response by adding the product $c_1 T_{std}(t)$ of the first-order coefficient $c_1$ calculated by the coefficient calculation unit 148 and the deflection amount $T_{std}(t)$ calculated by the first deflection amount calculation unit 146, and the offset $T_{offset\_std}(t)$ calculated by the offset calculation unit 150, as in Equation (56). That is, the static response calculation unit 151 performs the processing of the static response calculation step S110 in FIG. 30.

The first dynamic response calculation unit 152 calculates, as in Equation (56), the natural vibration $u_{nv}(t)$ as the first dynamic response by subtracting the deflection amount $T_{EOstd}(t)$ as the static response calculated by the static response calculation unit 151 from the measurement data u(t) generated by the first measurement data generation unit 142. That is, the first dynamic response calculation unit 152 performs the processing of the first dynamic response calculation step S120 in FIG. 30.

The second dynamic response calculation unit 153 calculates the natural vibration $u_{nv\_31p}(t)$ as the second dynamic response by performing filter processing for attenuating an unnecessary signal from the natural vibration $u_{nv}(t)$ which is the first dynamic response calculated by the first dynamic response calculation unit 152. The filter processing may include low-pass filter processing for attenuating a harmonic component of a vibration component having the fundamental frequency $F_N$ included in the natural vibration $u_{nv}(t)$ and correcting a gain at the fundamental frequency $F_N$. Further, the filter processing may include high-pass filter processing for attenuating a signal component having a frequency lower than the fundamental frequency $F_N$. For example, the second dynamic response calculation unit 153 calculates the natural vibration $u_{nv\_hp}(t)$ according to Equation (60) by performing high-pass filter processing for subtracting, from the natural vibration $u_{nv}(t)$, a low-frequency signal component in which the vibration component is reduced by performing moving average processing on the natural vibration $u_{nv}(t)$ in the basic cycle $T_N$. Further, the second dynamic response calculation unit 153 calculates, according to Equation (63), the natural vibration $u_{nv\_31p}(t)$ as the second dynamic response by performing the low-pass filter processing for attenuating the harmonic component of the vibration component having the fundamental frequency $F_N$ included in the natural vibration $u_{nv\_hp}(t)$ and correcting the gain at the fundamental frequency $F_N$. That is, the second dynamic response calculation unit 153 performs the processing of the second dynamic response calculation step S130 in FIG. 30, specifically, the processing of steps S1301 and S1302 in FIG. 38.

The envelope amplitude calculation unit 154 calculates the envelope amplitude $u_{nv\_mag}(t)$ of the natural vibration $u_{nv\_31p}(t)$ which is the second dynamic response calculated by the second dynamic response calculation unit 153. Specifically, the envelope amplitude calculation unit 154 calculates, as in Equation (64), the envelope amplitude $u_{nv\_mag}(t)$ by performing low-pass filter processing on the absolute value of the natural vibration $u_{nv\_31p}(t)$ and multiplying the result by $\pi/2$. That is, the envelope amplitude calculation unit 154 performs the processing of the envelope amplitude calculation step S140 in FIG. 30.

The attenuation rate calculation unit 155 calculates the attenuation rate $\zeta$ of the vibration component included in the natural vibration $u_{nv\_31p}(t)$, which is the second dynamic response calculated by the second dynamic response calculation unit 153, based on the envelope amplitude $u_{nv\_mag}(t)$ calculated by the envelope amplitude calculation unit 154. Specifically, the attenuation rate calculation unit 155 approximates the envelope amplitude $u_{nv\_mag}(t)$ by an exponential function in the first interval $T_1$ which is at least a part of an interval in which the vibration component included in the natural vibration $u_{nv\_31p}(t)$, which is the second dynamic response, attenuates to calculate the power coefficient $q_1$ of the exponential function. The start time point $t_{e0}$ of the first interval $T_1$ is after the exit time point $t_o$. For example, the attenuation rate calculation unit 155 approximates the logarithm y(t) of the envelope amplitude $u_{nv\_mag}(t)$ in the first interval $T_1$ by the linear function Q(t) as in Equation (69), and calculates the power coefficient $q_1$ according to Equation (71). Then, the attenuation rate calculation unit 155 calculates, as in Equation (76), the attenuation rate $\zeta$ by dividing the power coefficient q1 by the natural frequency $\omega = 2\pi F_N$ of the natural vibration $u_{nv\_31p}(t)$. That is, the attenuation rate calculation unit 155 performs the processing of the attenuation rate calculation step S150 in FIG. 30, specifically, the processing of steps S1501 and S1502 in FIG. 39.

The attenuation rate $\zeta$ is stored in the storage unit 13 as at least a part of the measurement data 135. The measurement data 135 may include the measurement data u(t) and $u_{lp}(t)$, the deflection amounts $T_{std}(t)$, $T_{std\_lp}(t)$, $T_{Estd\_lp}(t)$, and $T_{EOstd}(t)$, the natural vibrations $u_{nv}(t)$ and $u_{nv\_31p}(t)$, the envelope amplitude $u_{nv\_mag}(t)$, and the like, in addition to the attenuation rate $\zeta$.

The measurement data output unit 156 reads the measurement data 135 stored in the storage unit 13 and outputs the measurement data 135 to the monitoring device 3.

Specifically, the second communication unit 12 transmits the measurement data 135 stored in the storage unit 13 to the monitoring device 3 via the communication network 4 under the control of the measurement data output unit 156. That is, the measurement data output unit 156 performs the processing of the measurement data output step S160 in FIG. 30.

As described above, the measurement program 131 is a program that causes the measurement device 1, which is a computer, to execute each procedure of the flowchart shown in FIG. 30.

As shown in FIG. 40, the monitoring device 3 includes a communication unit 31, a processor 32, a display unit 33, an operation unit 34, and a storage unit 35.

The communication unit 31 receives the measurement data 135 from the measurement device 1 and outputs the received measurement data 135 to the processor 32.

The display unit 33 displays various types of information under the control of the processor 32. The display unit 33 may be, for example, a liquid crystal display or an organic EL display. EL is an abbreviation for electro luminescence.

The operation unit 34 outputs operation data corresponding to an operation of a user to the processor 32. The operation unit 34 may be, for example, an input device such as a mouse, a keyboard, or a microphone.

The storage unit 35 is a memory that stores various programs, data, and the like for the processor 32 to perform calculation processing and control processing. The storage unit 35 stores programs, data, and the like for the processor 32 to implement predetermined application functions.

The processor 32 acquires the measurement data 135 received by the communication unit 31, generates evaluation information by evaluating a temporal change in the displacement of the superstructure 7 based on the acquired measurement data 135, and displays the generated evaluation information on the display unit 33.

In the present embodiment, the processor 32 functions as a measurement data acquisition unit 321 and a monitoring unit 322 by executing a monitoring program 351 stored in the storage unit 35. That is, the processor 32 includes the measurement data acquisition unit 321 and the monitoring unit 322.

The measurement data acquisition unit 321 acquires the measurement data 135 received by the communication unit 31, and adds the acquired measurement data 135 to a measurement data sequence 352 stored in the storage unit 35.

The monitoring unit 322 statistically evaluates a temporal change in the deflection amount of the superstructure 7 based on the measurement data sequence 352 stored in the storage unit 35. Then, the monitoring unit 322 generates evaluation information indicating the evaluation result, and displays the generated evaluation information on the display unit 33. The user can monitor a state of the superstructure 7 based on the evaluation information displayed on the display unit 33.

The monitoring unit 322 may perform processing such as monitoring of the railway vehicle 6 and abnormality determination of the superstructure 7 based on the measurement data sequence 352 stored in the storage unit 35.

The processor 32 transmits, based on the operation data output from the operation unit 34, information for adjusting operation states of the measurement device 1 and the sensor 2 to the measurement device 1 via the communication unit 31. The operation state of the measurement device 1 is adjusted according to the information received via the second communication unit 12. The measurement device 1 transmits information for adjusting the operation state of the sensor 2 received via the second communication unit 12 to the sensor 2 via the first communication unit 11. The operation state of the sensor 2 is adjusted according to the information received via the communication unit 21.

In the processors 14, 23, and 32, for example, the functions of the respective units may be implemented by individual hardware, or the functions of the respective units may be implemented by integrated hardware. For example, the processors 14, 23, and 32 include hardware, and the hardware may include at least one of a circuit that processes a digital signal and a circuit that processes an analog signal. The processors 14, 23, and 32 may be a CPU, a GPU, a DSP, or the like. CPU is an abbreviation for central processing unit, GPU is an abbreviation for graphics processing unit, and DSP is an abbreviation for digital signal processor. The processors 14, 23, and 32 may be configured as custom ICs such as ASICs so as to implement the functions of the respective units, or may implement the functions of the respective units by a CPU and an ASIC. ASIC is an abbreviation for application specific integrated circuit, and IC is an abbreviation for integrated circuit.

The storage units 13, 24, and 35 are configured by, for example, various IC memories such as a ROM, a flash ROM, and a RAM, and a recording medium such as a hard disk, a memory card, and the like. ROM is an abbreviation for read only memory, RAM is an abbreviation for random access memory, and IC is an abbreviation for integrated circuit. The storage units 13, 24, and 35 include a non-volatile information storage device that is a computer-readable device or a medium, and various programs, data, and the like may be stored in the information storage device. The information storage device may be an optical disk such as an optical disk DVD or a CD, a hard disk drive, or various memories such as a card type memory or a ROM.

Although only one sensor 2 is shown in FIG. 40, each of a plurality of sensors 2 may generate the observation data 242 and transmit the observation data 242 to the measurement device 1. In this case, the measurement device 1 receives a plurality of pieces of the observation data 242 transmitted from the plurality of sensors 2, generates a plurality of pieces of measurement data 135, and transmits the plurality of pieces of measurement data 135 to the monitoring device 3. The monitoring device 3 receives the plurality of pieces of measurement data 135 transmitted from the measurement device 1, and monitors a plurality of states of the superstructures 7 based on the plurality of pieces of received measurement data 135.

5. Function and Effect

According to the measurement method of the present embodiment described above, by approximating the measurement data $u_{lp}(t)$, in which the vibration component is reduced by performing filter processing on the measurement data $u(t)$, with the linear function of the deflection amount $T_{std\_lp}(t)$ in which the vibration component is reduced by performing filter processing on the deflection amount $T_{std}(t)$, the measurement device 1 can calculate the static response separately from the static response and the dynamic response included in the measurement data $u(t)$.

According to the measurement method of the present embodiment, since the product $c_1 T_{std}(t)$ of the first-order coefficient $c_1$, which is a first-order term of the linear function for approximating the measurement data $u_{lp}(t)$, and the deflection amount $T_{std}(t)$ corresponds to the displacement of the superstructure 7 that is proportional to the load of the railway vehicle 6, and the offset $T_{offset\_std}(t)$ corresponds to the displacement of the superstructure 7 that is not proportional to the load of the railway vehicle 6, such as play or floating, the measurement device 1 can accurately calculate the static response by adding the product $c_1 T_{std}(t)$ and the offset $T_{offset\_std}(t)$.

According to the measurement method of the present embodiment, the measurement device 1 approximates the measurement data $u_{lp}(t)$, in which the vibration component having a frequency equal to or higher than the fundamental frequency $F_f$ included in the measurement data u(t) is attenuated, by the linear function of the deflection amount $T_{std\_lp}(t)$, and thus the calculation accuracy of the first-order coefficient $c_1$ and the zero-order coefficient $c_0$ of the linear function is improved, so that the static response can be accurately calculated.

According to the measurement method of the present embodiment, the measurement device 1 calculates, according to Equation (55), the offset $T_{offset\_std}(t)$ which reflects that in an interval where the railway vehicle 6 passes through the superstructure 7, a displacement of the superstructure 7 such as play and floating that are not proportional to the load of the railway vehicle 6 occur, and that the displacement of the superstructure 7 does not occur in other intervals, and thus the static response can be accurately calculated.

According to the measurement method of the present embodiment, since the measurement device 1 can calculate the number of vehicles $C_T$ of the railway vehicle 6 based on the entry time point $t_i$ of the railway vehicle 6 to the superstructure 7 and the exit time point $t_o$ of the railway vehicle 6 from the superstructure 7 according to Equation (8), the static response when the railway vehicle 6 of which the number of vehicles $C_T$ is unknown moves on the superstructure 7 can be accurately calculated.

According to the measurement method of the present embodiment, since the measurement device 1 can accurately calculate the entry time point $t_i$ of the railway vehicle 6 to the superstructure 7 and the exit time point $t_o$ of the railway vehicle 6 from the superstructure 7 based on the measurement data $u_{lp}(t)$ in which the vibration component is reduced, the static response can be accurately calculated.

According to the measurement method of the present embodiment, the measurement device 1 calculates, according to Equation (57), the natural vibration $u_{nv}(t)$, which is the first dynamic response, by subtracting the accurately calculated deflection amount $T_{EOstd}(t)$, which is the static response, from the measurement data u(t), then performs filter processing for attenuating an unnecessary signal, and thus the natural vibration $u_{nv\_31p}(t)$ which is the second dynamic response can be accurately calculated.

In particular, the measurement device 1 performs high-pass filter processing for attenuating a signal component having a frequency lower than the fundamental frequency $F_N$ on the natural vibration $u_{nv}(t)$, and thus the natural vibration $u_{nv\_hp}(t)$ in which a signal component caused by low-frequency noise, environmental vibration, and the like is reduced can be obtained. Further, the measurement device 1 performs, on the natural vibration $u_{nv\_hp}(t)$, low-pass filter processing for attenuating a harmonic component of a vibration component having the fundamental frequency $F_N$ and correcting a gain at the fundamental frequency $F_N$, and thus the natural vibration $u_{nv\_31p}(t)$ in which the harmonic component is reduced and the signal component of the fundamental frequency is emphasized can be obtained. Therefore, according to the measurement method of the present embodiment, the measurement device 1 can accurately calculate the attenuation rate of the dynamic response based on the envelope amplitude $u_{nv\_mag}(t)$ of the accurately calculated natural vibration $u_{nv\_31p}(t)$ which is the second dynamic response.

According to the measurement method of the present embodiment, the measurement device 1 generates the measurement data u(t) based on the acceleration data a(t) output from the sensor 2, and calculates the deflection amount $T_{std}(t)$ of the superstructure 7 caused by the railway vehicle 6, based on the measurement data u(t) and Equation (35) which is an approximate equation of the deflection based on the structural model reflecting a structure of the superstructure 7 of the bridge 5. Then, the measurement device 1 calculates the attenuation rate of the dynamic response when the railway vehicle 6 moves on the superstructure 7 by relatively simple processing using the measurement data u(t) and the deflection amount $T_{std}(t)$. Therefore, according to the measurement method of the present embodiment, the measurement device 1 can calculate the attenuation rate of the dynamic response by processing with a relatively small calculation amount.

According to the measurement method of the present embodiment, since the velocity of the railway vehicle 6 actually changes slightly but hardly changes, the measurement device 1 calculates the deflection amount $T_{std}(t)$ based on the average velocity $v_a$ assuming that the railway vehicle 6 travels at a constant average velocity $v_a$, and thus it is possible to significantly reduce the calculation amount while maintaining the calculation accuracy of the deflection amount $T_{std}(t)$.

According to the measurement method of the present embodiment, the measurement device 1 can calculate the average velocity $v_a$ of the railway vehicle 6 by simple calculation according to Equation (13) based on the acceleration data a(t) output from the sensor 2 instead of directly measuring the average velocity $v_a$ of the railway vehicle 6.

6. Modification

The present disclosure is not limited to the above embodiments, and various modifications can be made within the scope of the gist of the present disclosure.

In the embodiments described above, the sensor 2, which is an observation device, is an acceleration sensor that outputs the acceleration data a(k), but the observation device is not limited to the acceleration sensor. For example, the observation device may be an impact sensor, a pressure-sensitive sensor, a strain gauge, an image measuring device, a load cell, or a displacement meter.

The impact sensor detects an impact acceleration as a response to an action of each axle of the railway vehicle 6 on the observation point R. The pressure-sensitive sensor, the strain gauge, and the load cell detect a stress change as a response to an action of each axle of the railway vehicle 6 on the observation point R. The image measuring device detects, by image processing, a displacement as a response to an action of each axle of the railway vehicle 6 on the observation point R. The displacement gauge is, for example, a contact-type displacement meter, a ring-type displacement meter, a laser displacement meter, a pressure-sensitive sensor, or a displacement measurement device using an optical fiber, and detects a displacement as a response to an action of each axle of the railway vehicle 6 on the observation point R.

Figure 41:
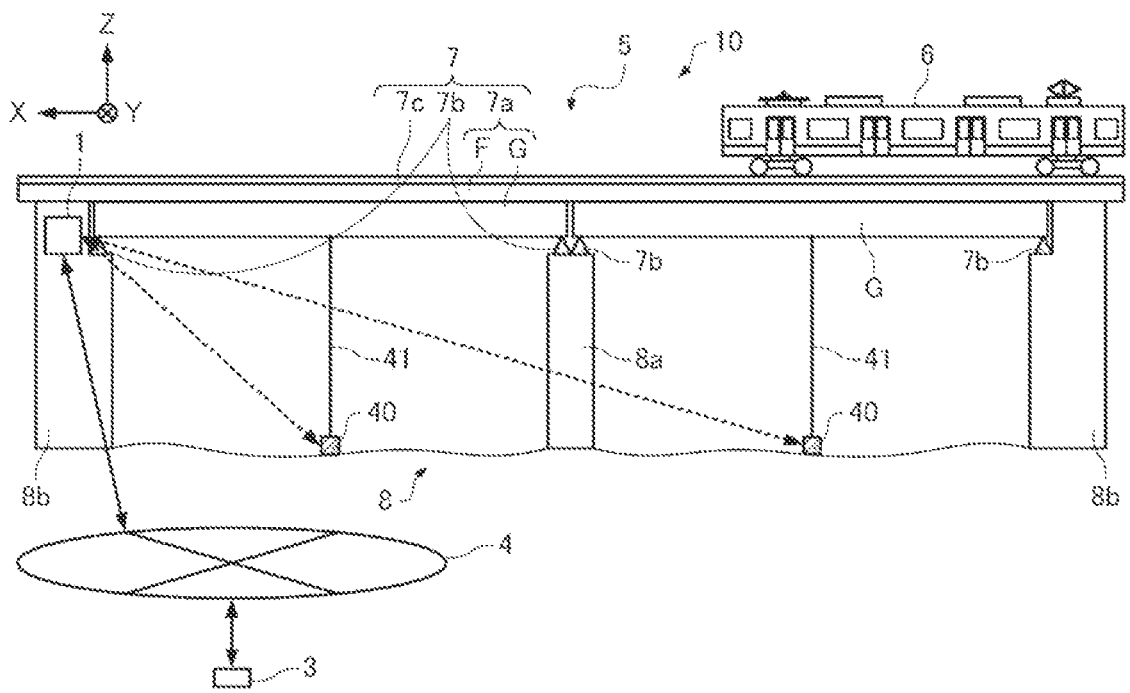
FIG. 41 is a diagram showing another configuration example of the measurement system.
Figure 42:
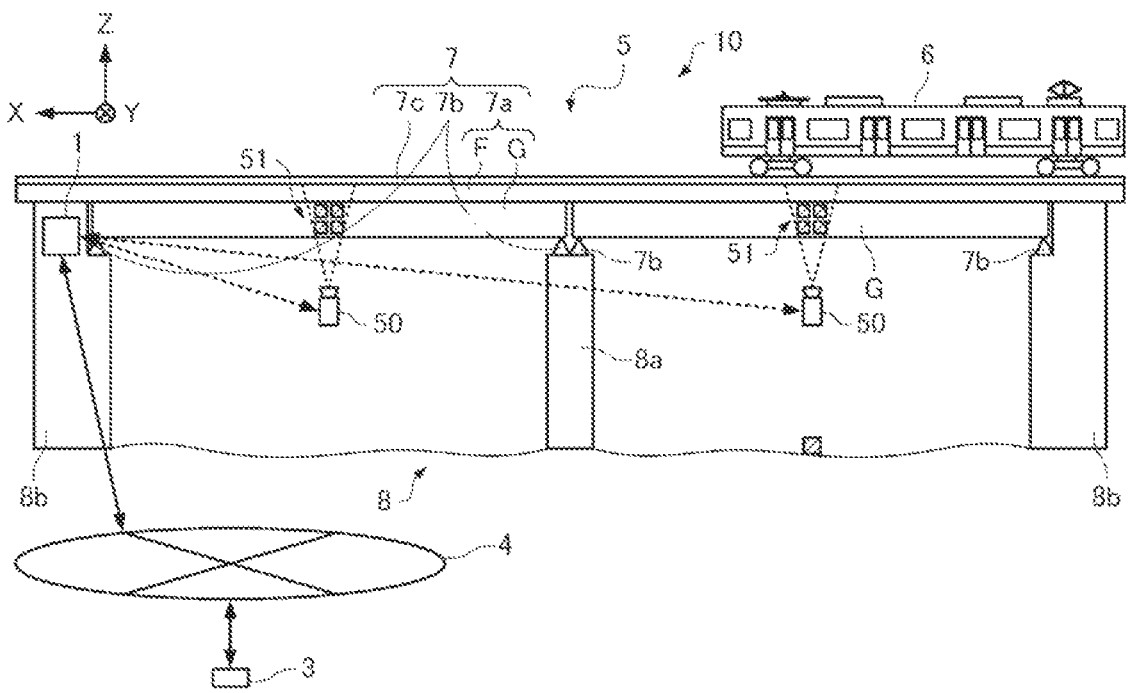
FIG. 42 is a diagram showing another configuration example of the measurement system.

As an example, FIG. 41 shows a configuration example of the measurement system 10 using a ring-type displacement meter as the observation device. FIG. 42 shows a configuration example of the measurement system 10 using an image measuring device as the observation device. In FIGS. 41 and 42, the same components as those in FIG. 1 are denoted by the same reference numerals, and description thereof will be omitted. In the measurement system 10 shown in FIG. 41, a piano wire 41 is fixed between an upper surface of a ring-type displacement meter 40 and a lower surface of the main girder G immediately above the ring-type displacement meter 40, and the ring-type displacement meter 40 measures a displacement of the piano wire 41 caused by bending of the superstructure 7 and transmits the measured displacement data to the measurement device 1. The measurement device 1 generates the measurement data 135 based on the displacement data transmitted from the ring-type displacement meter 40. In the measurement system 10 shown in FIG. 42, a camera 50 transmits, to the measurement device 1, an image obtained by imaging a target 51 provided on a side surface of the main girder G. The measurement device 1 processes the image transmitted from the camera 50, calculates a displacement of the target 51 caused by bending of the superstructure 7 to generate displacement data, and generates the measurement data 135 based on the generated displacement data. In the example of FIG. 42, the measurement device 1 generates the displacement data as an image measuring device, but the displacement data may be generated by an image measuring device (not shown) different from the measurement device 1 by image processing.

Figure 43:
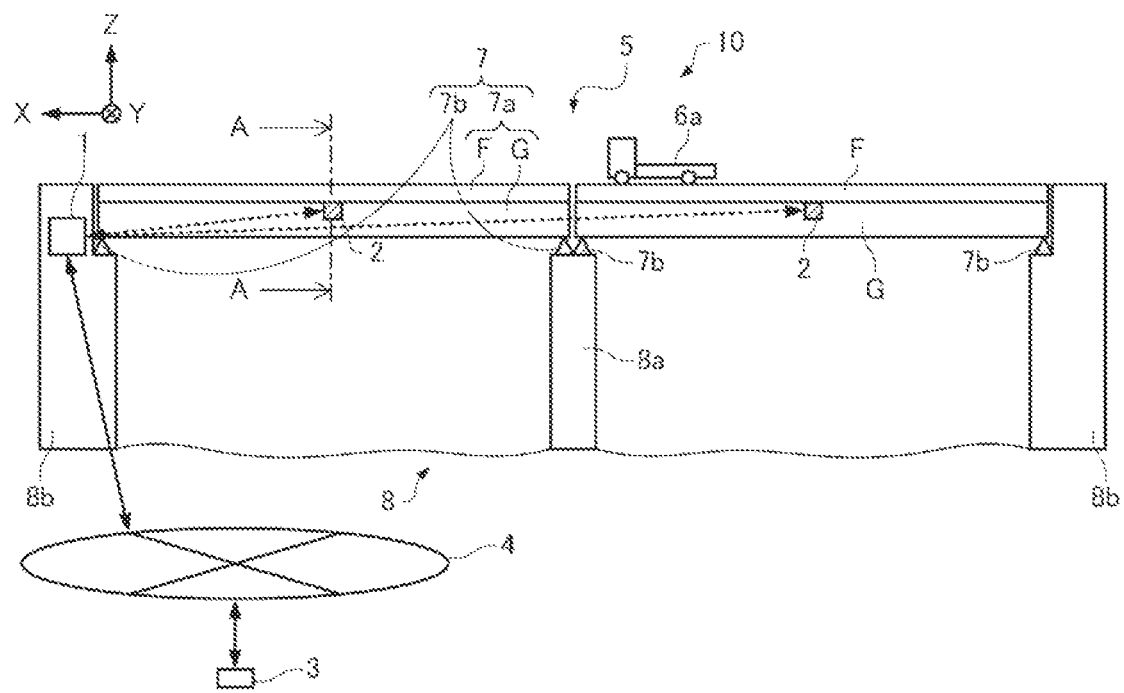
FIG. 43 is a diagram showing another configuration example of the measurement system.
Figure 44:
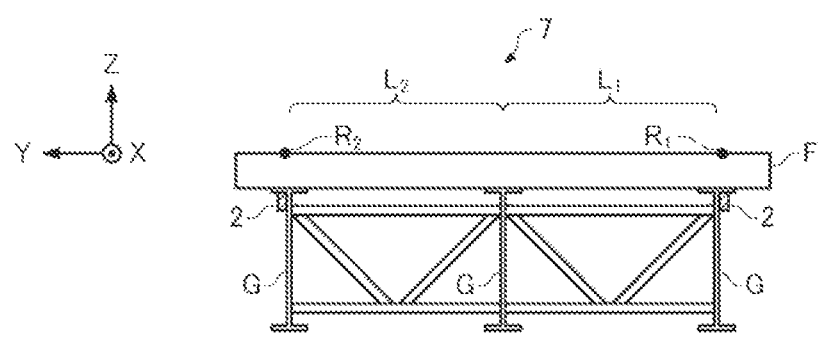
FIG. 44 is a cross-sectional view of a superstructure of FIG. 43 taken along line A-A.

In the embodiments described above, the bridge 5 is a railway bridge, and the moving object moving on the bridge 5 is the railway vehicle 6, but the bridge 5 may be a road bridge, and the moving object moving on the bridge 5 may be a vehicle such as an automobile, a road train, a truck, or a construction vehicle. FIG. 43 shows a configuration example of the measurement system 10 when the bridge 5 is a road bridge and a vehicle 6a moves on the bridge 5. In FIG. 43, the same components as those in FIG. 1 are denoted by the same reference numerals. As shown in FIG. 43, the bridge 5, which is a road bridge, includes the superstructure 7 and the substructure 8, similarly to the railway bridge. FIG. 44 is a cross-sectional view of the superstructure 7 taken along line A-A of FIG. 43. As shown in FIGS. 43 and 44, the superstructure 7 includes the bridge floor 7a and the support 7b, and the bridge floor 7a includes the floor plate F, the main girder G, and a cross girder (not shown). As shown in FIG. 43, the substructure 8 includes bridge piers 8a and bridge abutments 8b. The superstructure 7 is a structure across any one of the bridge abutment 8b and the bridge pier 8a adjacent to each other, two adjacent bridge abutments 8b, and two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a. The bridge 5 is, for example, a steel bridge, a girder bridge, or an RC bridge.

Each sensor 2 is installed at a central portion of the superstructure 7 in a longitudinal direction, specifically, at a central portion of the main girder G in the longitudinal direction. However, each sensor 2 is not limited to being installed at the central portion of the superstructure 7 as long as each sensor 2 can detect an acceleration for calculating the displacement of the superstructure 7. When each sensor 2 is provided on the floor plate F of the superstructure 7, the sensor 2 may be damaged due to traveling of the vehicle 6a, and the measurement accuracy may be affected by local deformation of the bridge floor 7a, so that in the example of FIGS. 43 and 44, each sensor 2 is provided at the main girder G of the superstructure 7.

As shown in FIG. 44, the superstructure 7 has two lanes $L_1$ and $L_2$ on which the vehicle 6a as a moving object can move and three main girders G. In the example of FIGS. 43 and 44, in the central portion of the superstructure 7 in the longitudinal direction, the sensors 2 are respectively provided at two main girders at two ends, an observation point $R_1$ is provided at a position of a surface of the lane $L_1$ vertically above one of the sensors 2, and an observation point $R_2$ is provided at a position of a surface of the lane $L_2$ vertically above the other of the sensors 2. That is, the two sensors 2 are observation devices for observing the observation points $R_1$ and $R_2$, respectively. The two sensors 2 for respectively observing the observation points $R_1$ and $R_2$ may be provided at positions where accelerations generated at the observation points $R_1$ and $R_2$ due to the traveling of the vehicle 6a can be detected, and are preferably provided at positions close to the observation points $R_1$ and $R_2$. The number and installation position of the sensor 2, and the number of lanes are not limited to the example shown in FIGS. 43 and 44, and various modifications can be made.

The measurement device 1 calculates displacements of bending of the lanes $L_1$ and $L_2$ caused by the traveling of the vehicle 6a based on the acceleration data output from the sensors 2, and transmits information on the displacements of the lanes $L_1$ and $L_2$ to the monitoring device 3 via the communication network 4. The monitoring device 3 may store the information in a storage device (not shown), and may perform processing such as monitoring of the vehicle 6a and abnormality determination of the superstructure 7 based on the information, for example.

In the embodiments described above, each sensor 2 is provided at the main girder G of the superstructure 7, but the sensor 2 may be provided on the surface of or inside the superstructure 7, at the lower surface of the floor plate F, at the bridge pier 8a, or the like. In the embodiments described above, the superstructure of the bridge is described as an example of the structure, but the present disclosure is not limited thereto, and any structure may be used as long as the structure is deformed due to the movement of the moving object.

In the embodiments described above, the measurement device 1 calculates the entry time point $t_i$ based on the observation data output from the observation device that observes the observation point R, but the measurement device 1 may calculate the entry time point $t_i$ based on observation data output from another observation device that observes the entry end of the superstructure 7. Similarly, in the embodiments described above, the measurement device 1 calculates the exit time point $t_o$ based on the observation data output from the observation device that observes the observation point R, but the measurement device 1 may calculate the exit time point $t_o$ based on observation data output from another observation device that observes the exit end of the superstructure 7.

The embodiments and the modifications described above are merely examples, and the present disclosure is not limited thereto. For example, the embodiments and modifications can be appropriately combined.

The present disclosure includes a configuration substantially the same as the configuration described in the embodiment, for example, a configuration having the same function, method, and result, or a configuration having the same object and effect. The present disclosure includes a configuration in which a non-essential portion of the configuration described in the embodiment is replaced. The present disclosure includes a configuration having the same function and effect as the configuration described in the embodiment, or a configuration capable of achieving the same object. Further, the present disclosure includes a configuration in which a known technique is added to the configuration described in the embodiment.

The following contents are derived from the embodiments and modifications described above.

A measurement method according to an aspect includes: a first measurement data generation step of generating, based on observation data output from an observation device configured to observe an observation point of a structure, first measurement data based on a physical quantity which is a response to actions of a plurality of parts of a moving object moving on the structure on the observation point; a second measurement data generation step of generating second measurement data in which a vibration component is reduced by performing filter processing on the first measurement data; an observation information generation step of generating observation information including an entry time point and an exit time point of the moving object with respect to the structure; an average velocity calculation step of calculating an average velocity of the moving object based on the observation information and environment information which is created in advance and includes a dimension of the moving object and a dimension of the structure; a first deflection amount calculation step of calculating, based on an approximate equation of deflection of the structure, the observation information, the environment information, and the average velocity, a first deflection amount of the structure caused by the moving object; a second deflection amount calculation step of calculating a second deflection amount in which a vibration component is reduced by performing filter processing on the first deflection amount; a coefficient calculation step of approximating the second measurement data with a linear function of the second deflection amount to calculate a first-order coefficient and a zero-order coefficient of the linear function; a third deflection amount calculation step of calculating a third deflection amount based on the first-order coefficient, the zero-order coefficient, and the second deflection amount; an offset calculation step of calculating an offset based on the zero-order coefficient, the second deflection amount, and the third deflection amount; a static response calculation step of calculating a static response by adding the offset and a product of the first-order coefficient and the first deflection amount; a first dynamic response calculation step of calculating a first dynamic response by subtracting the static response from the first measurement data; a second dynamic response calculation step of calculating a second dynamic response by performing filter processing for attenuating an unnecessary signal from the first dynamic response; an envelope amplitude calculation step of calculating an envelope amplitude of the second dynamic response; and an attenuation rate calculation step of calculating, based on the envelope amplitude, an attenuation rate of a vibration component included in the second dynamic response.

According to the measurement method, the second measurement data in which the vibration component is reduced by performing filter processing on the first measurement data is approximated with the linear function of the second deflection amount in which the vibration component is reduced by performing filter processing on the first deflection amount, and thus the static response can be calculated separately from the static response and the dynamic response included in the first measurement data.

According to the measurement method, since the product of the first-order coefficient, which is the first-order term of the linear function approximating the first deflection amount, and the first deflection amount corresponds to the displacement of the structure that is proportional to the load of the moving object, and the offset corresponds to the displacement of the structure that is not proportional to the load of the moving object, such as play or floating, it is possible to accurately calculate the static response by adding the offset and the product of the first-order coefficient and the first deflection amount.

According to the measurement method, the accurately calculated static response is subtracted from the first measurement data and filter processing for attenuating an unnecessary signal is performed, and thus the second dynamic response can be accurately calculated. Therefore, according to the measurement method, the attenuation rate of the dynamic response can be accurately calculated based on the envelope amplitude of the accurately calculated second dynamic response.

In the measurement method, the attenuation rate of the dynamic response when the moving object moves on the structure is calculated by relatively simple processing using the first measurement data generated based on the observation data and the first deflection amount generated based on the approximate equation of the deflection of the structure. Therefore, according to the measurement method, the attenuation rate of the dynamic response can be calculated by processing with a relatively small calculation amount.

According to the measurement method, since the velocity of the moving object actually changes slightly but hardly changes, it is possible to calculate the first deflection amount based on the average velocity assuming that the moving object moves at a constant average velocity, and thus it is possible to significantly reduce the calculation amount while maintaining the calculation accuracy of the first deflection amount.

In the measurement method according to the above aspect, in the attenuation rate calculation step, the attenuation rate may be calculated by approximating the envelope amplitude by an exponential function in a first interval which is at least a part of an interval in which the vibration component included in the second dynamic response attenuates to calculate a power coefficient of the exponential function, and dividing the power coefficient by a natural frequency of the second dynamic response.

In the measurement method according to the above aspect, the exit time point may be a time point at which a rearmost part among the plurality of parts of the moving object passes through an exit end of the structure, and a start time point of the first interval may be after the exit time point.

In the measurement method according to the above aspect, the filter processing for attenuating an unnecessary signal from the first dynamic response may include low-pass filter processing for attenuating a harmonic component of a vibration component having a fundamental frequency included in the first dynamic response and correcting a gain at the fundamental frequency.

According to the measurement method, since an envelope amplitude of the second dynamic response in which the harmonic component is reduced and the signal component of the fundamental frequency is emphasized can be obtained, the attenuation rate of the dynamic response can be calculated with high accuracy based on the envelope amplitude.

In the measurement method according to the above aspect, the filter processing for attenuating an unnecessary signal from the first dynamic response may include high-pass filter processing for attenuating a signal component having a frequency lower than the fundamental frequency.

According to the measurement method, since an envelope amplitude of the second dynamic response, in which the signal component caused by low-frequency noise, environmental vibration, and the like are reduced together with the harmonic component, and the signal component of the fundamental frequency is emphasized, can be obtained, the attenuation rate of the dynamic response can be calculated with high accuracy based on the envelope amplitude.

In the measurement method according to the above aspect, in the envelope amplitude calculation step, the envelope amplitude may be calculated by performing low-pass filter processing on an absolute value of the second dynamic response and multiplying the result by $\pi/2$.

In the measurement method according to the above aspect, the structure may be a superstructure of a bridge.

According to the measurement method, it is possible to calculate, by processing with a relatively small calculation amount, the attenuation rate of the vibration component included in the dynamic response when the moving object moves on the superstructure of the bridge.

In the measurement method according to the above aspect, the moving object may be a vehicle or a railway vehicle, and each of the plurality of parts may be an axle or a wheel.

According to the measurement method, it is possible to calculate, by processing with a relatively small calculation amount, the attenuation rate of the vibration component included in the dynamic response when the vehicle or the railway vehicle moves on the structure.

In the measurement method according to the above aspect, the approximate equation of the deflection of the structure may be an equation based on a structural model of the structure.

According to the measurement method, it is possible to calculate the first deflection amount reflecting a configuration of the structure on which the moving object moves, and it is possible to accurately calculate the attenuation rate of the vibration component included in the dynamic response.

In the measurement method according to the above aspect, the structural model may be a simple beam whose both ends are supported.

According to the measurement method, it is possible to accurately calculate the attenuation rate of the vibration component included in the dynamic response when the moving object moves on a structure having a configuration similar to the simple beam.

In the measurement method according to the above aspect, the observation device may be an acceleration sensor, an impact sensor, a pressure-sensitive sensor, a strain gauge, an image measuring device, a load cell, or a displacement meter.

According to the measurement method, it is possible to accurately measure the attenuation rate of the vibration component included in the dynamic response using data of acceleration, a stress change, or a displacement.

In the measurement method according to the above aspect, the structure may be a structure in which bridge weigh in motion (BWIM) functions.

A measurement device according to an aspect includes: a first measurement data generation unit configured to generate, based on observation data output from an observation device configured to observe an observation point of a structure, first measurement data based on a physical quantity which is a response to actions of a plurality of parts of a moving object moving on the structure on the observation point; a second measurement data generation unit configured to generate second measurement data in which a vibration component is reduced by performing filter processing on the first measurement data; an observation information generation unit configured to generate observation information including an entry time point and an exit time point of the moving object with respect to the structure; an average velocity calculation unit configured to calculate an average velocity of the moving object based on the observation information and environment information which is created in advance and includes a dimension of the moving object and a dimension of the structure; a first deflection amount calculation unit configured to calculate, based on an approximate equation of deflection of the structure, the observation information, the environment information, and the average velocity, a first deflection amount of the structure caused by the moving object; a second deflection amount calculation unit configured to calculate a second deflection amount in which a vibration component is reduced by performing filter processing on the first deflection amount; a coefficient calculation unit configured to approximate the second measurement data with a linear function of the second deflection amount to calculate a first-order coefficient and a zero-order coefficient of the linear function; a third deflection amount calculation unit configured to calculate a third deflection amount based on the first-order coefficient, the zero-order coefficient, and the second deflection amount; an offset calculation unit configured to calculate an offset based on the zero-order coefficient, the second deflection amount, and the third deflection amount; a static response calculation unit configured to calculate a static response by adding the offset and a product of the first-order coefficient and the first deflection amount; a first dynamic response calculation unit configured to calculate a first dynamic response by subtracting the static response from the first measurement data; a second dynamic response calculation unit configured to calculate a second dynamic response by performing filter processing for attenuating an unnecessary signal from the first dynamic response; an envelope amplitude calculation unit configured to calculate an envelope amplitude of the second dynamic response; and an attenuation rate calculation unit configured to calculate, based on the envelope amplitude, an attenuation rate of a vibration component included in the second dynamic response.

According to the measurement device, the second measurement data in which the vibration component is reduced by performing filter processing on the first measurement data is approximated with the linear function of the second deflection amount in which the vibration component is reduced by performing filter processing on the first deflection amount, and thus the static response can be calculated separately from the static response and the dynamic response included in the first measurement data.

According to the measurement device, since the product of the first-order coefficient, which is the first-order term of the linear function approximating the first deflection amount, and the first deflection amount corresponds to the displacement of the structure that is proportional to the load of the moving object, and the offset corresponds to the displacement of the structure that is not proportional to the load of the moving object, such as play or floating, it is possible to accurately calculate the static response by adding the offset and the product of the first-order coefficient and the first deflection amount.

According to the measurement device, the accurately calculated static response is subtracted from the first measurement data and filter processing for attenuating an unnecessary signal is performed, and thus the second dynamic response can be accurately calculated. Therefore, according to the measurement device, the attenuation rate of the dynamic response can be accurately calculated based on the envelope amplitude of the accurately calculated second dynamic response.

In the measurement device, the attenuation rate of the dynamic response when the moving object moves on the structure is calculated by relatively simple processing using the first measurement data generated based on the observation data and the first deflection amount generated based on the approximate equation of the deflection of the structure. Therefore, according to the measurement device, the attenuation rate of the dynamic response can be calculated by processing with a relatively small calculation amount.

According to the measurement device, since the velocity of the moving object actually changes slightly but hardly changes, it is possible to calculate the first deflection amount based on the average velocity assuming that the moving object moves at a constant average velocity, and thus it is possible to significantly reduce the calculation amount while maintaining the calculation accuracy of the first deflection amount.

A measurement system according to an aspect includes: the measurement device according to the above aspect; and the observation device.

According to an aspect of the present disclosure, a non-transitory computer-readable storage medium stores a measurement program, and the measurement program causes a computer to execute: a first measurement data generation step of generating, based on observation data output from an observation device configured to observe an observation point of a structure, first measurement data based on a physical quantity which is a response to actions of a plurality of parts of a moving object moving on the structure on the observation point; a second measurement data generation step of generating second measurement data in which a vibration component is reduced by performing filter processing on the first measurement data; an observation information generation step of generating observation information including an entry time point and an exit time point of the moving object with respect to the structure; an average velocity calculation step of calculating an average velocity of the moving object based on the observation information and environment information which is created in advance and includes a dimension of the moving object and a dimension of the structure; a first deflection amount calculation step of calculating, based on an approximate equation of deflection of the structure, the observation information, the environment information, and the average velocity, a first deflection amount of the structure caused by the moving object; a second deflection amount calculation step of calculating a second deflection amount in which a vibration component is reduced by performing filter processing on the first deflection amount; a coefficient calculation step of approximating the second measurement data with a linear function of the second deflection amount to calculate a first-order coefficient and a zero-order coefficient of the linear function; a third deflection amount calculation step of calculating a third deflection amount based on the first-order coefficient, the zero-order coefficient, and the second deflection amount; an offset calculation step of calculating an offset based on the zero-order coefficient, the second deflection amount, and the third deflection amount; a static response calculation step of calculating a static response by adding the offset and a product of the first-order coefficient and the first deflection amount; a first dynamic response calculation step of calculating a first dynamic response by subtracting the static response from the first measurement data; a second dynamic response calculation step of calculating a second dynamic response by performing filter processing for attenuating an unnecessary signal from the first dynamic response; an envelope amplitude calculation step of calculating an envelope amplitude of the second dynamic response; and an attenuation rate calculation step of calculating, based on the envelope amplitude, an attenuation rate of a vibration component included in the second dynamic response.

According to the measurement program, the second measurement data in which the vibration component is reduced by performing filter processing on the first measurement data is approximated with the linear function of the second deflection amount in which the vibration component is reduced by performing filter processing on the first deflection amount, and thus the static response can be calculated separately from the static response and the dynamic response included in the first measurement data.

According to the measurement program, since the product of the first-order coefficient, which is the first-order term of the linear function approximating the first deflection amount, and the first deflection amount corresponds to the displacement of the structure that is proportional to the load of the moving object, and the offset corresponds to the displacement of the structure that is not proportional to the load of the moving object, such as play or floating, it is possible to accurately calculate the static response by adding the offset and the product of the first-order coefficient and the first deflection amount.

According to the measurement program, it is possible to accurately calculate the first dynamic response by subtracting the accurately calculated static response from the first measurement data.

According to the measurement program, the accurately calculated static response is subtracted from the first measurement data and filter processing for attenuating an unnecessary signal is performed, and thus the second dynamic response can be accurately calculated. Therefore, according to the measurement program, the attenuation rate of the dynamic response can be accurately calculated based on the envelope amplitude of the accurately calculated second dynamic response.

In the measurement program, the attenuation rate of the dynamic response when the moving object moves on the structure is calculated by relatively simple processing using the first measurement data generated based on the observation data and the first deflection amount generated based on the approximate equation of the deflection of the structure. Therefore, according to the measurement program, the attenuation rate of the dynamic response can be calculated by processing with a relatively small calculation amount.

According to the measurement program, since the velocity of the moving object actually changes slightly but hardly changes, it is possible to calculate the first deflection amount based on the average velocity assuming that the moving object moves at a constant average velocity, and thus it is possible to significantly reduce the calculation amount while maintaining the calculation accuracy of the first deflection amount.

What is claimed is:

1. A measurement method for causing a processor to execute a process, the method comprising executing on the processor the steps of:
   a first measurement data generation step of generating, based on observation data output from a sensor configured to observe an observation point of a superstructure of a bridge, first measurement data based on a physical quantity which is a response to actions of a plurality of parts of a vehicle moving on the superstructure on the observation point;
a second measurement data generation step of generating second measurement data in which a vibration component is reduced by performing filter processing on the first measurement data;
an observation information generation step of generating observation information including an entry time point and an exit time point of the vehicle with respect to the superstructure;
an average velocity calculation step of calculating an average velocity of the vehicle based on the observation information and environment information which is created in advance and includes a dimension of the vehicle and a dimension of the superstructure;
a first deflection amount calculation step of calculating, based on an approximate equation of deflection of the superstructure, the observation information, the environment information, and the average velocity, a first deflection amount of the superstructure caused by the vehicle;
a second deflection amount calculation step of calculating a second deflection amount in which a vibration component is reduced by performing filter processing on the first deflection amount;
a coefficient calculation step of approximating the second measurement data with a linear function of the second deflection amount to calculate a first-order coefficient and a zero-order coefficient of the linear function;
a third deflection amount calculation step of calculating a third deflection amount based on the first-order coefficient, the zero-order coefficient, and the second deflection amount;
an offset calculation step of calculating an offset based on the zero-order coefficient, the second deflection amount, and the third deflection amount;
a static response calculation step of calculating a static response by adding the offset and a product of the first-order coefficient and the first deflection amount;
a first dynamic response calculation step of calculating a first dynamic response by subtracting the static response from the first measurement data;
a second dynamic response calculation step of calculating a second dynamic response by performing filter processing for attenuating an unnecessary signal from the first dynamic response;
an envelope amplitude calculation step of calculating an envelope amplitude of the second dynamic response; and;
an attenuation rate calculation step of calculating, based on the envelope amplitude, an attenuation rate of a vibration component included in the second dynamic response; and
an abnormality detection step of detecting or monitoring an abnormality state of the superstructure of the bridge based on the attenuation rate of the vibration component.

2. The measurement method according to claim 1, wherein
in the attenuation rate calculation step,
the attenuation rate is calculated by approximating the envelope amplitude by an exponential function in a first interval which is at least a part of an interval in which the vibration component included in the second dynamic response attenuates to calculate a power coefficient of the exponential function, and dividing the power coefficient by a natural frequency of the second dynamic response.

3. The measurement method according to claim 2, wherein
the exit time point is a time point at which a rearmost part among the plurality of parts of the vehicle passes through an exit end of the superstructure, and
a start time point of the first interval is after the exit time point.

4. The measurement method according to claim 1, wherein
the filter processing for attenuating an unnecessary signal from the first dynamic response includes low-pass filter processing for attenuating a harmonic component of a vibration component having a fundamental frequency included in the first dynamic response and correcting a gain at the fundamental frequency.

5. The measurement method according to claim 4, wherein
the filter processing for attenuating an unnecessary signal from the first dynamic response includes high-pass filter processing for attenuating a signal component having a frequency lower than the fundamental frequency.

6. The measurement method according to claim 1, wherein
in the envelope amplitude calculation step,
the envelope amplitude is calculated by performing low-pass filter processing on an absolute value of the second dynamic response and multiplying the result by π/2.

7. The measurement method according to claim 1, wherein
the vehicle includes a railway vehicle, and
each of the plurality of parts is an axle or a wheel.

8. The measurement method according to claim 1, wherein
the approximate equation of the deflection of the superstructure is an equation based on a structural model of the superstructure.

9. The measurement method according to claim 8, wherein
the structural model is a simple beam whose both ends are supported.

10. The measurement method according to claim 1, wherein
the sensor is an acceleration sensor, an impact sensor, a pressure-sensitive sensor, a strain gauge, an image measuring device, a load cell, or a displacement meter.

11. The measurement method according to claim 1, wherein
the superstructure is a structure in which bridge weigh in motion (BWIM) functions.

12. A measurement device, comprising:
a memory configured to store a program; and
a processor configured to execute the program so as to:
generate, based on observation data output from a sensor configured to observe an observation point of a superstructure, first measurement data based on a physical quantity which is a response to actions of a plurality of parts of a vehicle moving on the superstructure on the observation point;
generate second measurement data in which a vibration component is reduced by performing filter processing on the first measurement data;

generate observation information including an entry time point and an exit time point of the vehicle with respect to the superstructure;
calculate an average velocity of the vehicle based on the observation information and environment information which is created in advance and includes a dimension of the vehicle and a dimension of the superstructure;
calculate, based on an approximate equation of deflection of the superstructure, the observation information, the environment information, and the average velocity, a first deflection amount of the superstructure caused by the vehicle;
calculate a second deflection amount in which a vibration component is reduced by performing filter processing on the first deflection amount;
approximate the second measurement data with a linear function of the second deflection amount to calculate a first-order coefficient and a zero-order coefficient of the linear function;
calculate a third deflection amount based on the first-order coefficient, the zero-order coefficient, and the second deflection amount;
calculate an offset based on the zero-order coefficient, the second deflection amount, and the third deflection amount;
calculate a static response by adding the offset and a product of the first-order coefficient and the first deflection amount;
calculate a first dynamic response by subtracting the static response from the first measurement data;
calculate a second dynamic response by performing filter processing for attenuating an unnecessary signal from the first dynamic response;
calculate an envelope amplitude of the second dynamic response; and
calculate, based on the envelope amplitude, an attenuation rate of a vibration component included in the second dynamic response,
wherein an abnormality state of the superstructure of the bridge is detected or monitored based on the attenuation rate of the vibration component.

13. A measurement system, comprising:
the measurement device according to claim 12; and
the sensor.

14. A non-transitory computer-readable storage medium storing a measurement program, the measurement program causing a computer to execute a process by a processor so as to perform the steps of:
generating, based on observation data output from a sensor configured to observe an observation point of a superstructure of a bridge, first measurement data based on a physical quantity which is a response to actions of a plurality of parts of a vehicle moving on the superstructure on the observation point;
generating second measurement data in which a vibration component is reduced by performing filter processing on the first measurement data;
generating observation information including an entry time point and an exit time point of the vehicle with respect to the superstructure;
calculating an average velocity of the vehicle based on the observation information and environment information which is created in advance and includes a dimension of the vehicle and a dimension of the superstructure;
calculating, based on an approximate equation of deflection of the superstructure, the observation information, the environment information, and the average velocity, a first deflection amount of the superstructure caused by the vehicle;
calculating a second deflection amount in which a vibration component is reduced by performing filter processing on the first deflection amount;
approximating the second measurement data with a linear function of the second deflection amount to calculate a first-order coefficient and a zero-order coefficient of the linear function;
calculating a third deflection amount based on the first-order coefficient, the zero-order coefficient, and the second deflection amount;
calculating an offset based on the zero-order coefficient, the second deflection amount, and the third deflection amount;
calculating a static response by adding the offset and a product of the first-order coefficient and the first deflection amount;
calculating a first dynamic response by subtracting the static response from the first measurement data;
calculating a second dynamic response by performing filter processing for attenuating an unnecessary signal from the first dynamic response;
calculating an envelope amplitude of the second dynamic response; and
calculating, based on the envelope amplitude, an attenuation rate of a vibration component included in the second dynamic response,
wherein an abnormality state of the superstructure of the bridge is detected or monitored based on the attenuation rate of the vibration component.

* * * * *